United States Patent [19]

Cheung

[11] Patent Number: 4,509,140

[45] Date of Patent: Apr. 2, 1985

[54] DATA TRANSMITTING LINK

[75] Inventor: Kin L. Cheung, Lowell, Mass.

[73] Assignee: Wang Laboratories, Inc., Lowell, Mass.

[21] Appl. No.: 391,778

[22] Filed: Jun. 24, 1982

Related U.S. Application Data

[63] Continuation-in-part of Ser. No. 205,164, Nov. 10, 1980, abandoned.

[51] Int. Cl.³ .............................................. G06F 3/04
[52] U.S. Cl. ................................................... 364/900
[58] Field of Search ... 364/200 MS File, 900 MS File

[56] References Cited

U.S. PATENT DOCUMENTS

| | | | |
|---|---|---|---|
| 3,530,438 | 9/1970 | Mellen et al. | 364/200 |
| 4,071,887 | 1/1978 | Daly et al. | 364/200 |
| 4,124,891 | 11/1978 | Weller et al. | 364/200 |
| 4,164,787 | 8/1979 | Aranguren | 364/200 |

Primary Examiner—Harvey E. Springborn
Attorney, Agent, or Firm—Michael H. Shanahan

[57] ABSTRACT

A communication network (10) has a memory unit (20) accessable to all ports (16-0, 16-1, 16-2, 16-3) of the link with a plurality of local sections (62) each associated with one of the ports. Interconnections include a dual memory bus (28) with a common bus subsystem (36) providing access to a common memory section and a local bus subsystem (30) providing access to the local memory sections, the subsystems constructed to permit concurrent independent use. Memory access priority circuitry (68) designates for each memory operating cycle a port for current service and makes memory access available to other elements when not required by the designated port.

4 Claims, 29 Drawing Figures

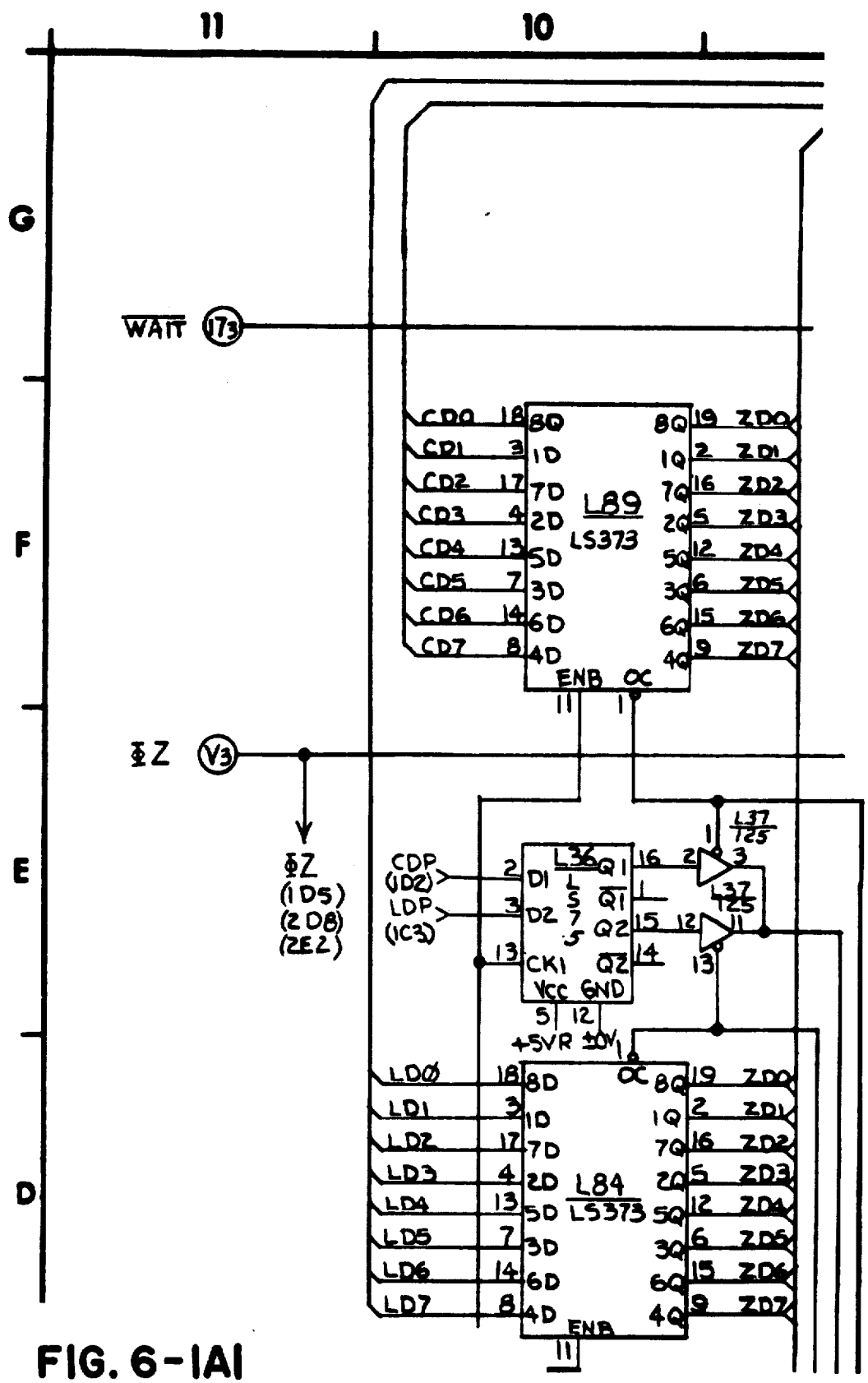
FIG. 6-1A1

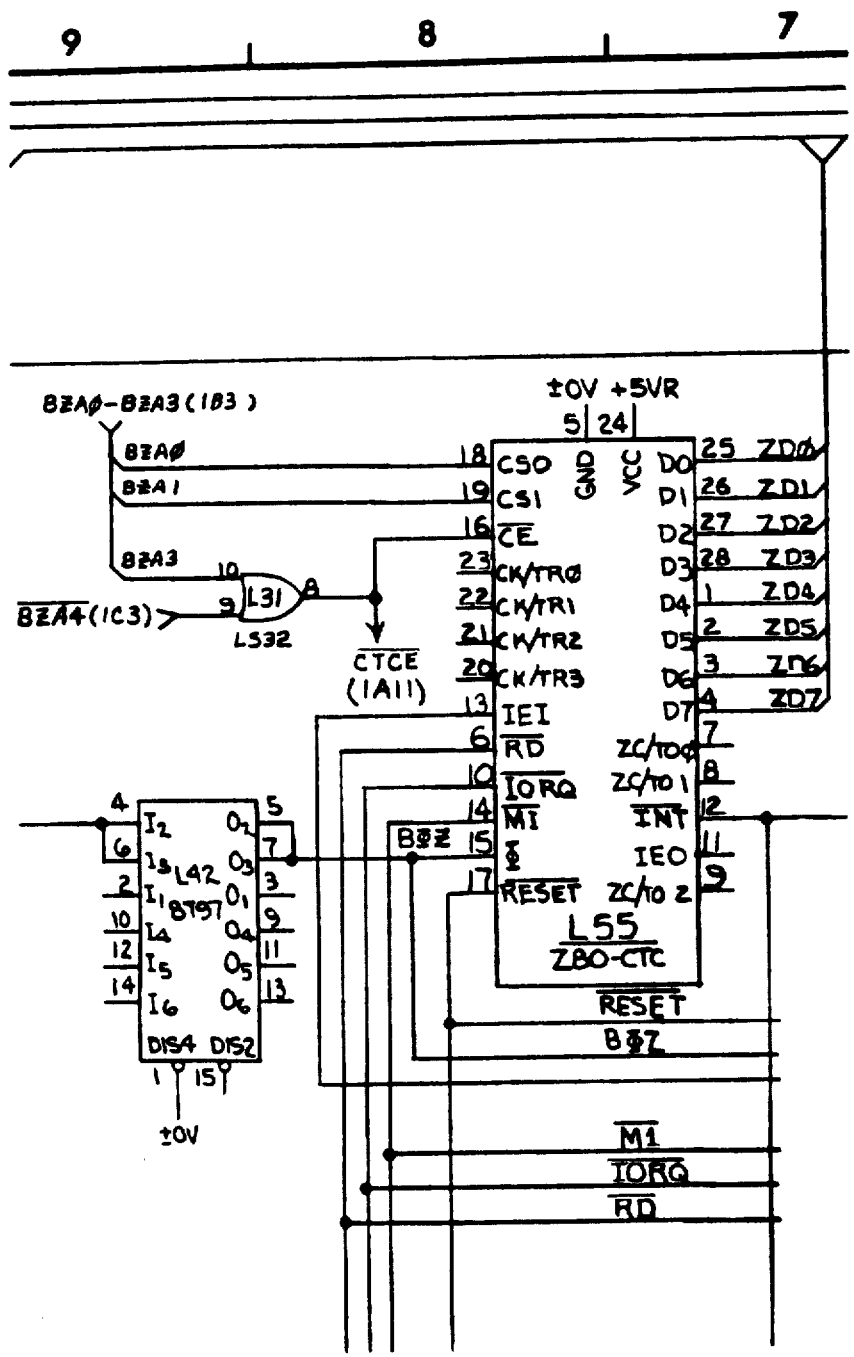
FIG. 6-1A2

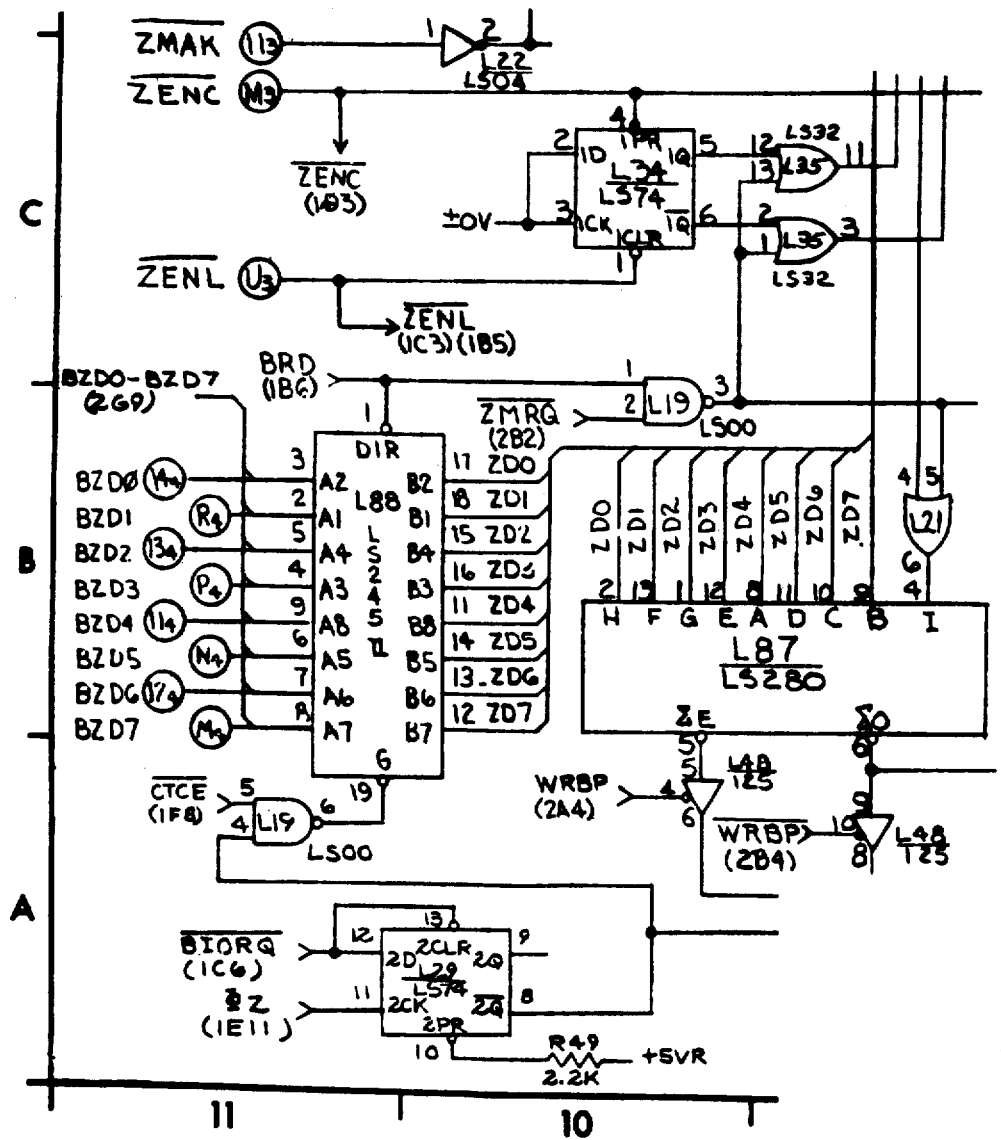
FIG. 6-1A3

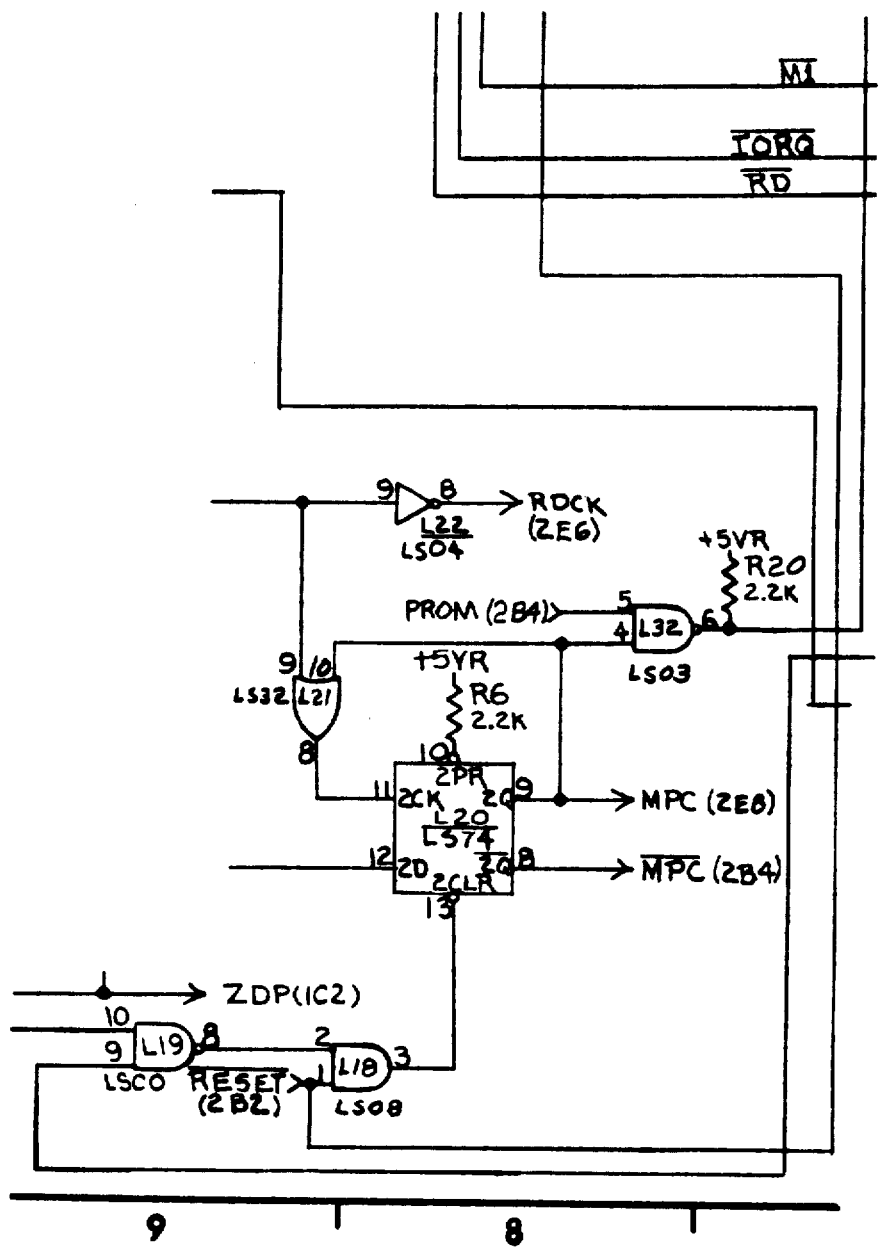
FIG. 6-1A4

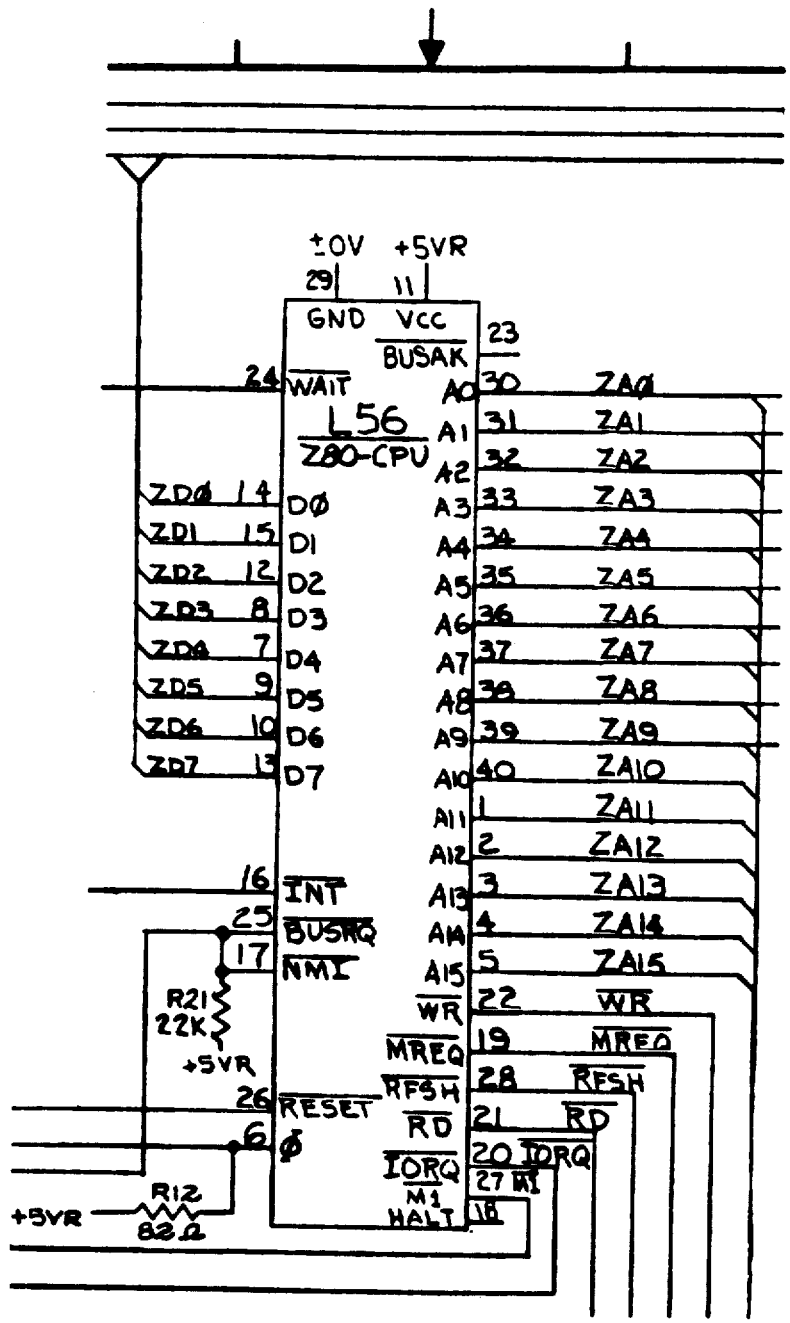
FIG. 6-1B1

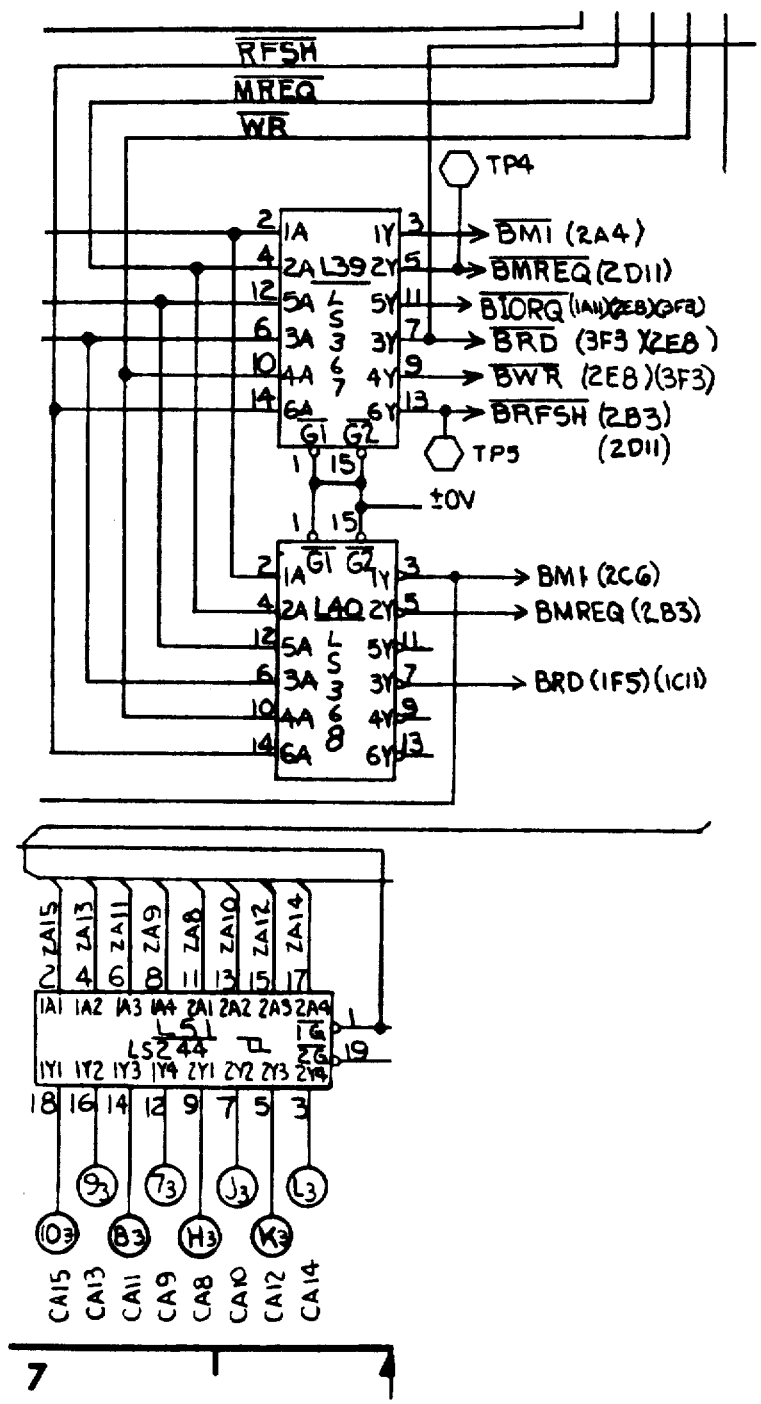
FIG. 6-1B2

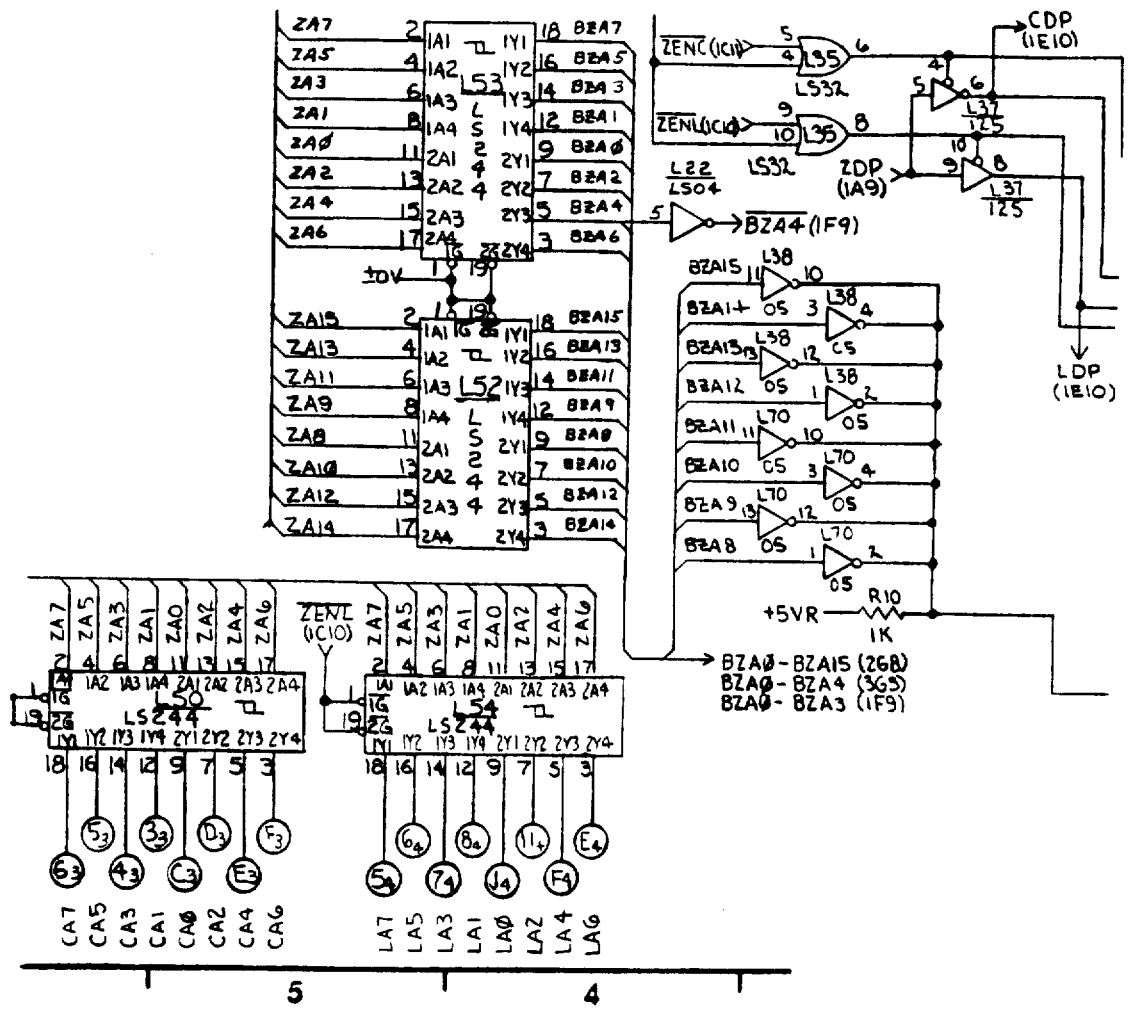
FIG. 6-1B3

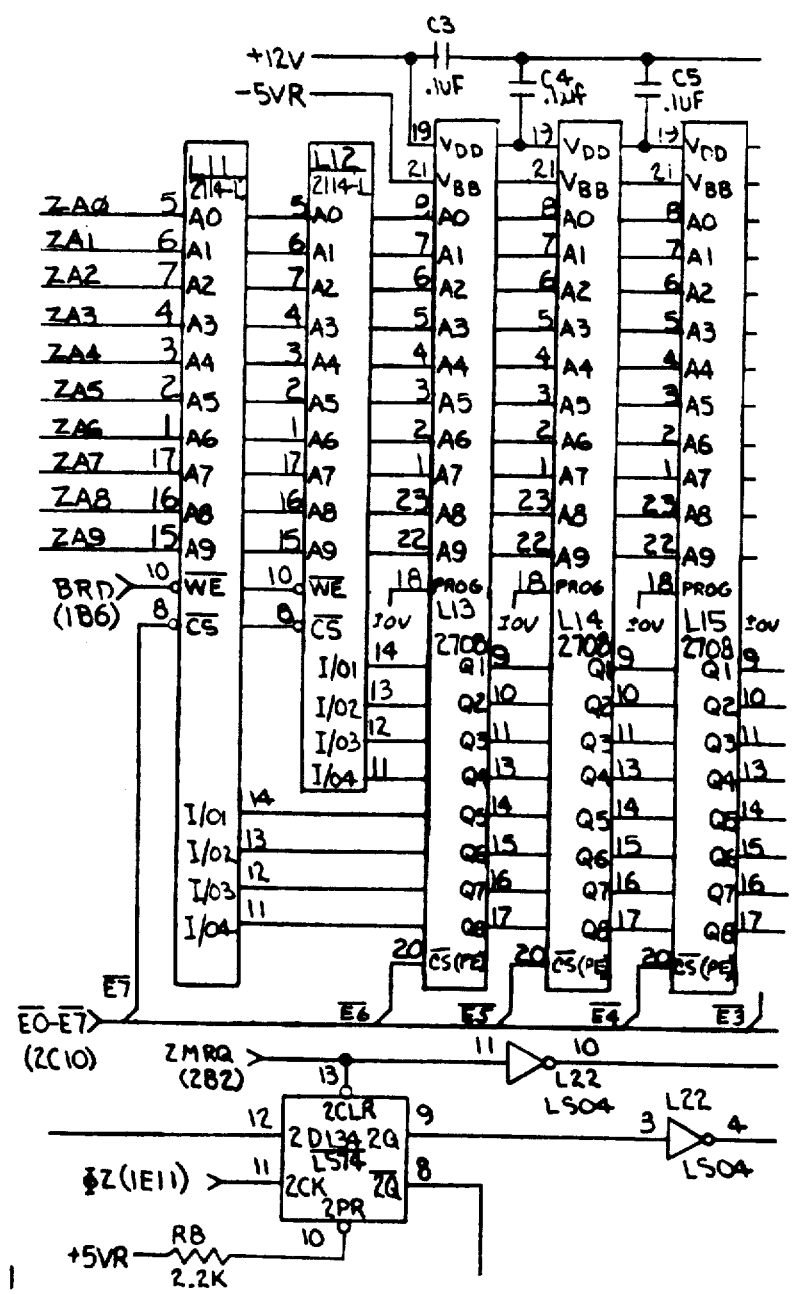
FIG. 6-1C1

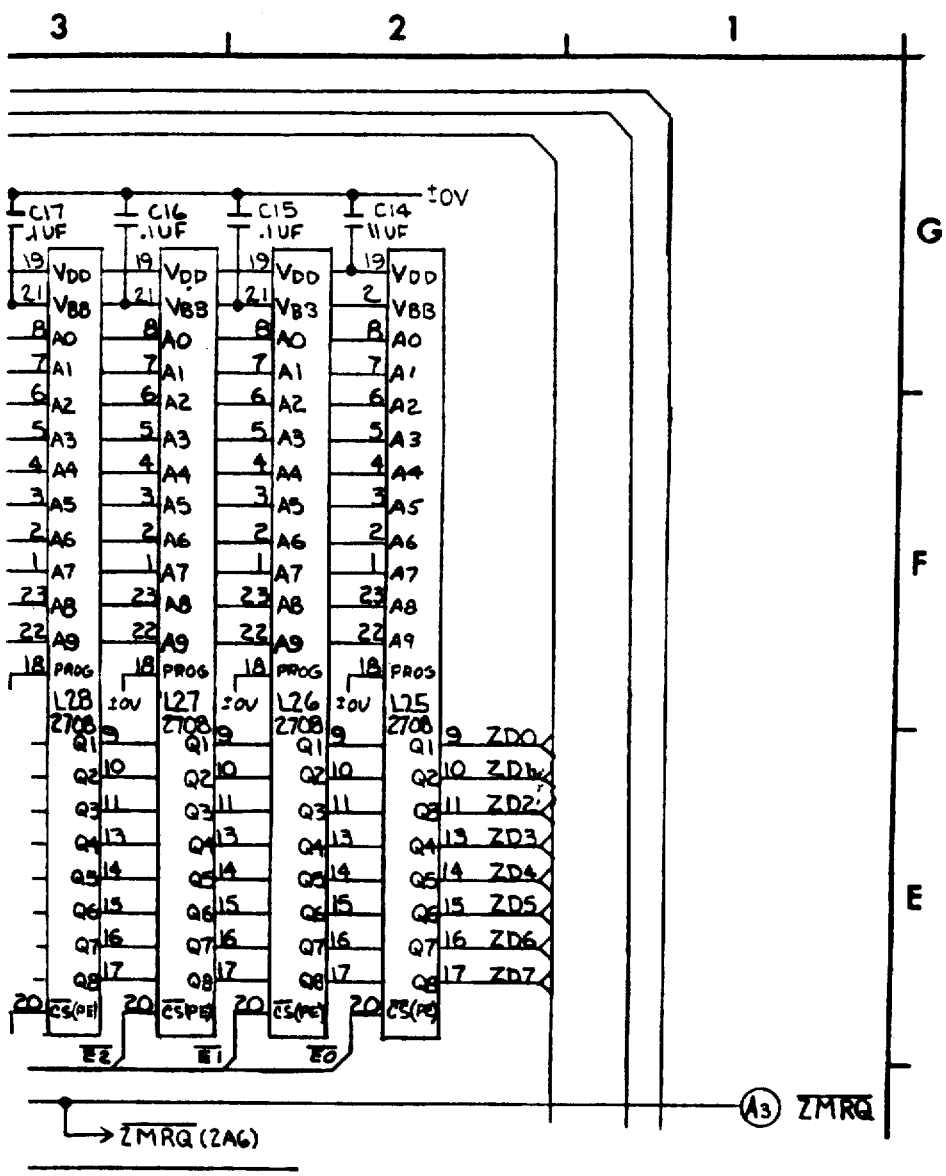
FIG. 6-1C2

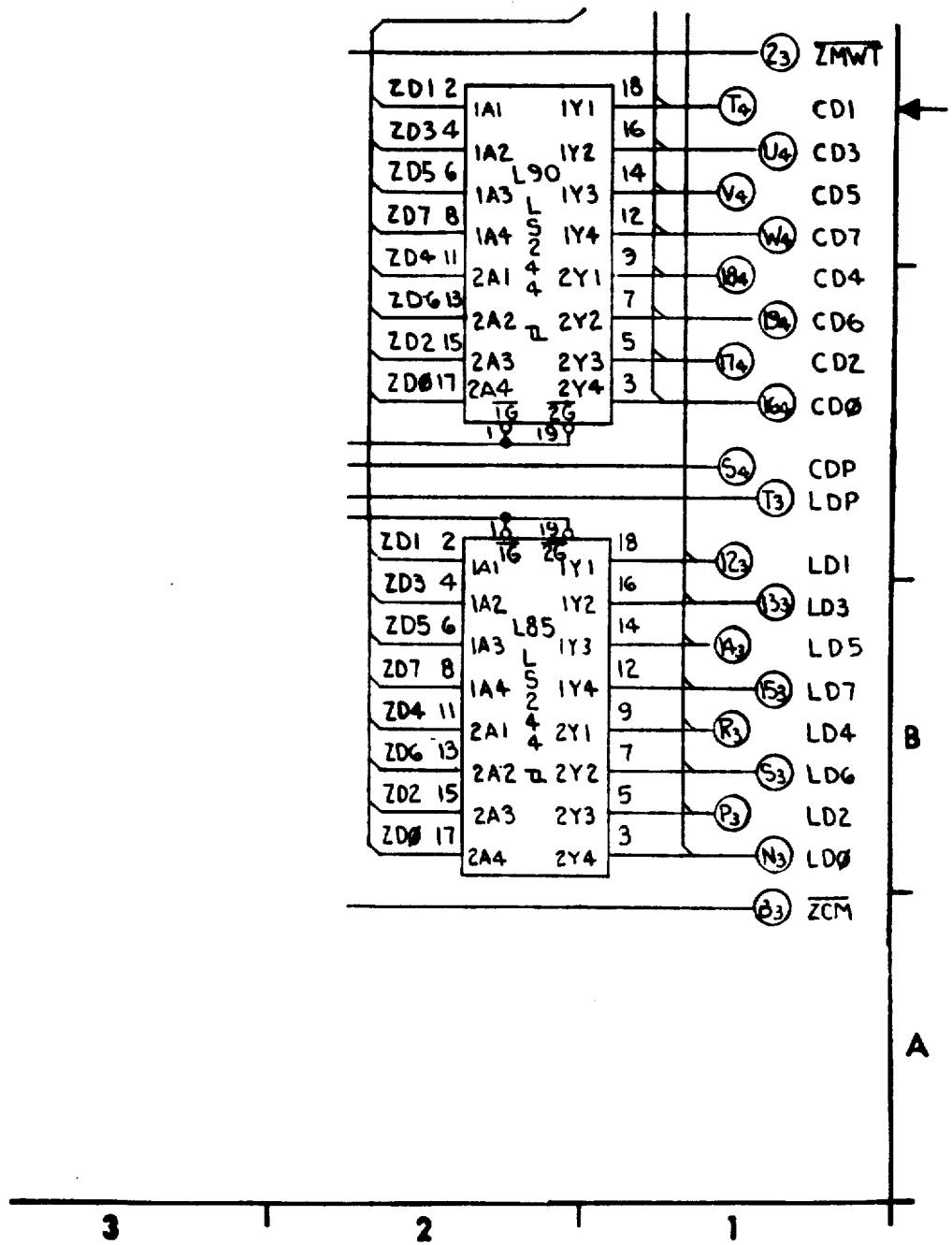
FIG. 6-1C3

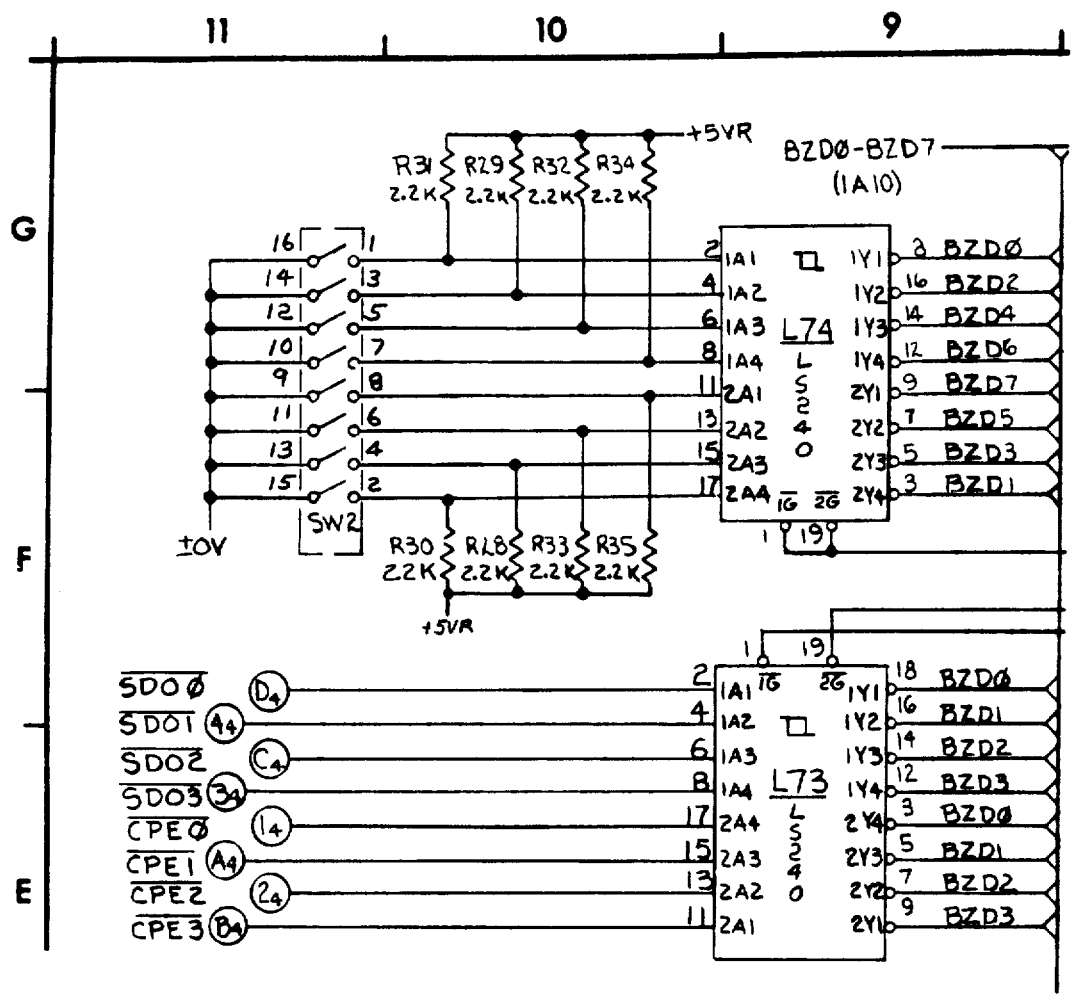
FIG. 6-2A1

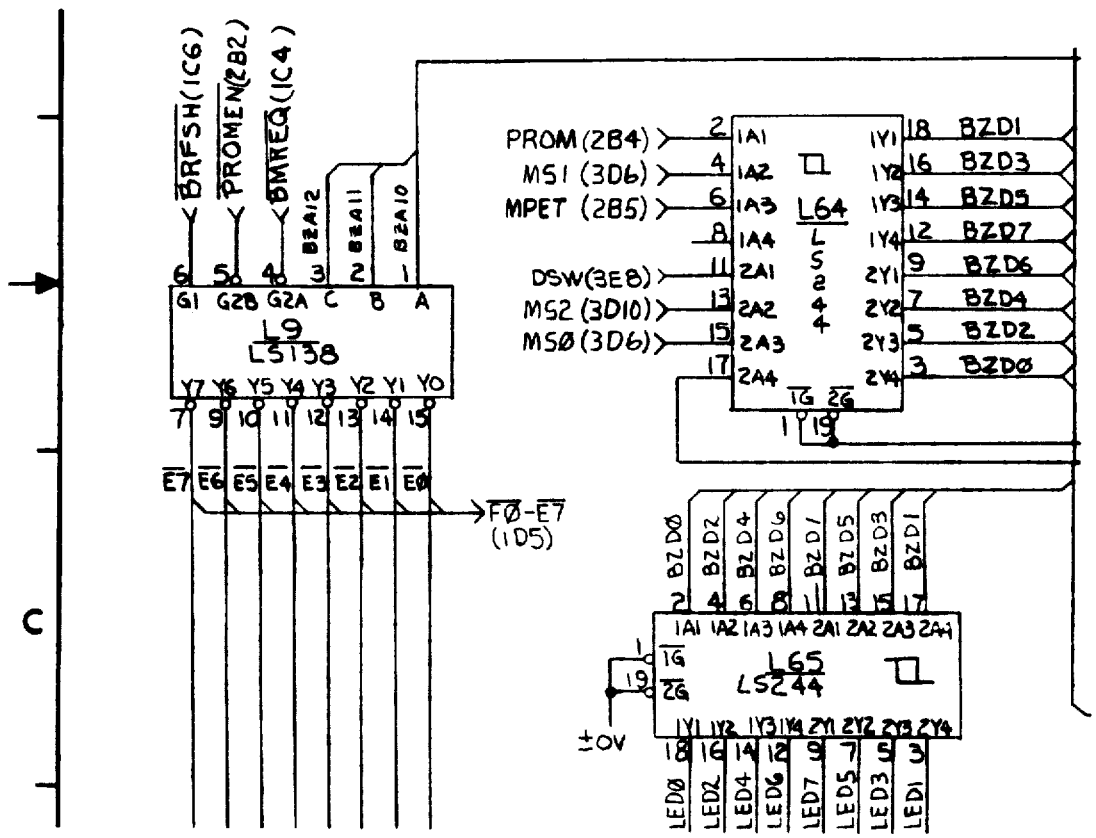
FIG. 6-2A2

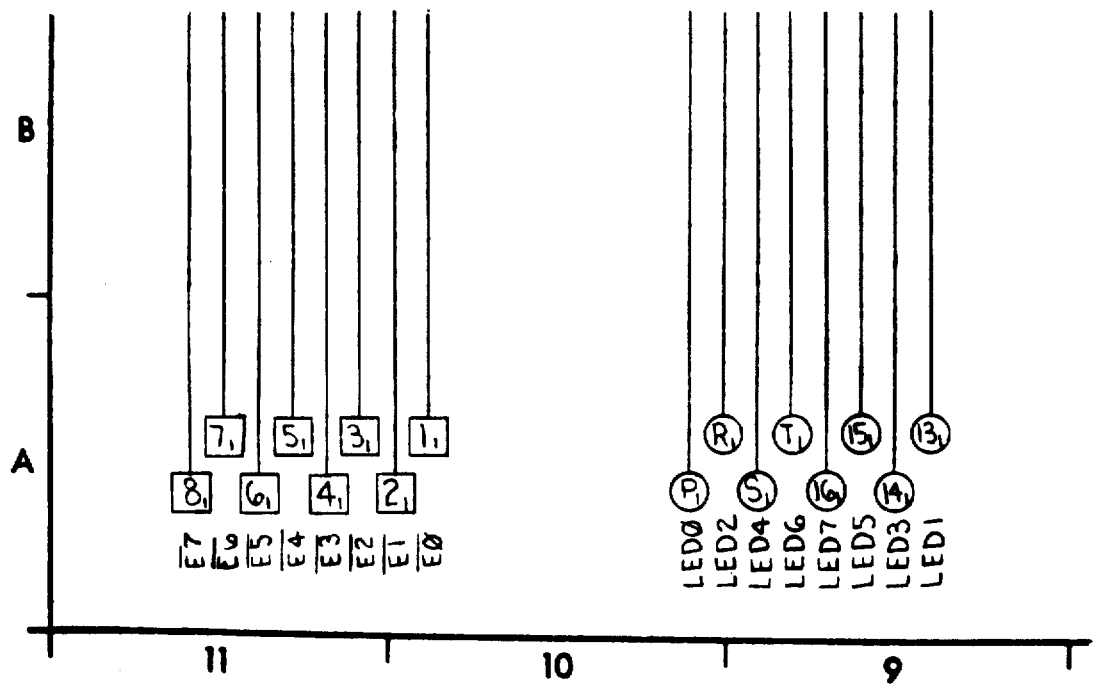
FIG. 6-2A3

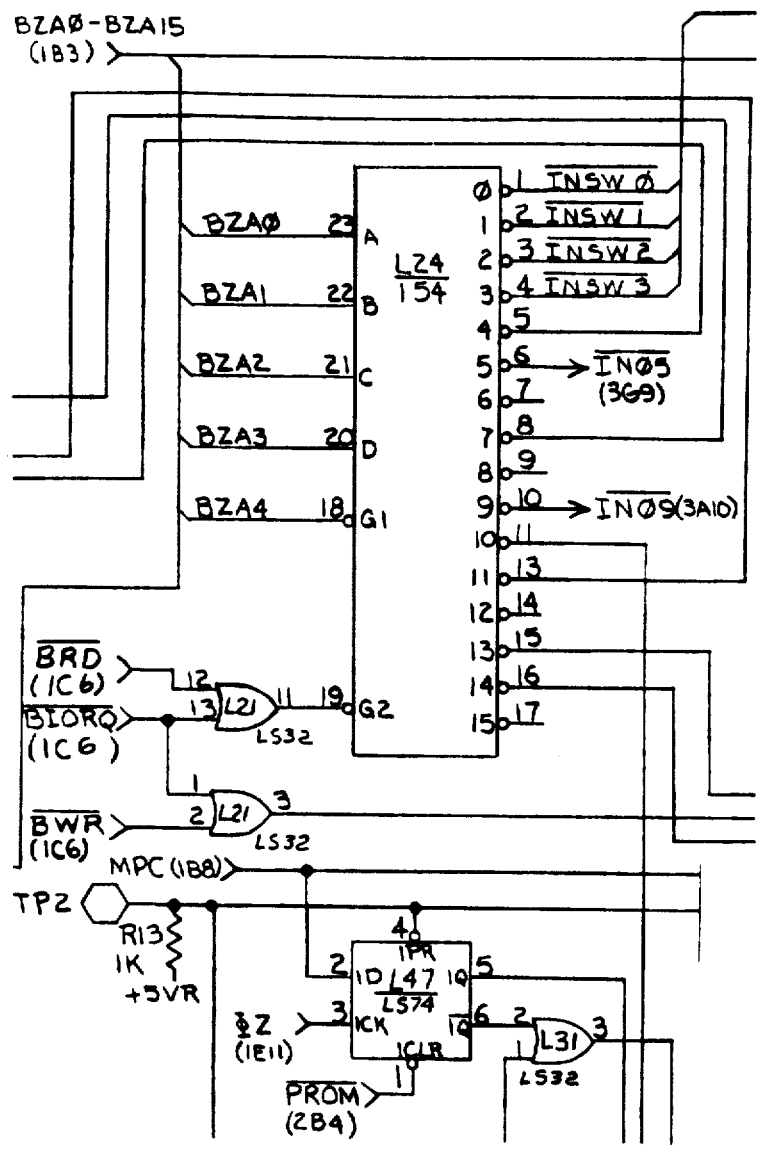
FIG. 6-2B1

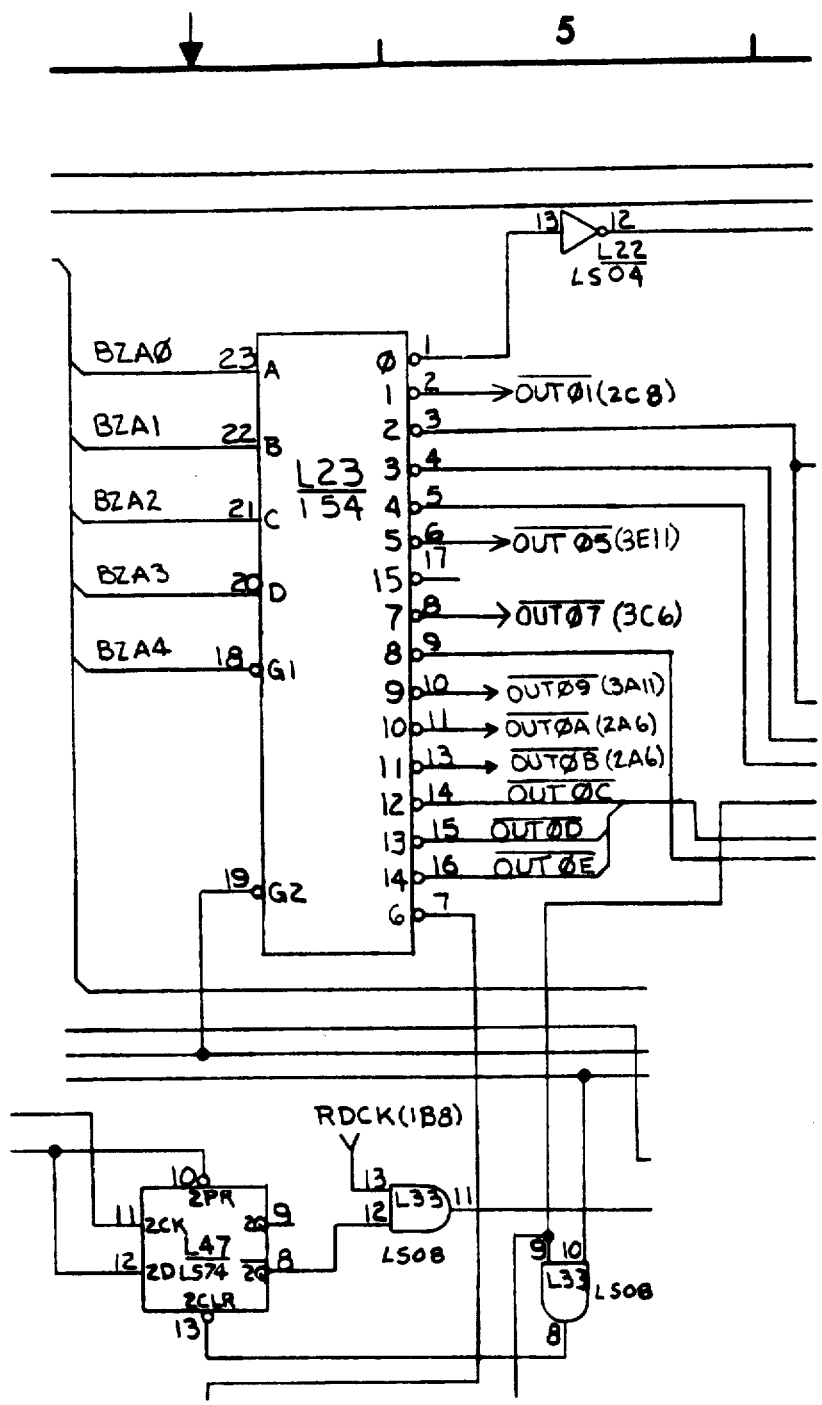
FIG. 6-2B2

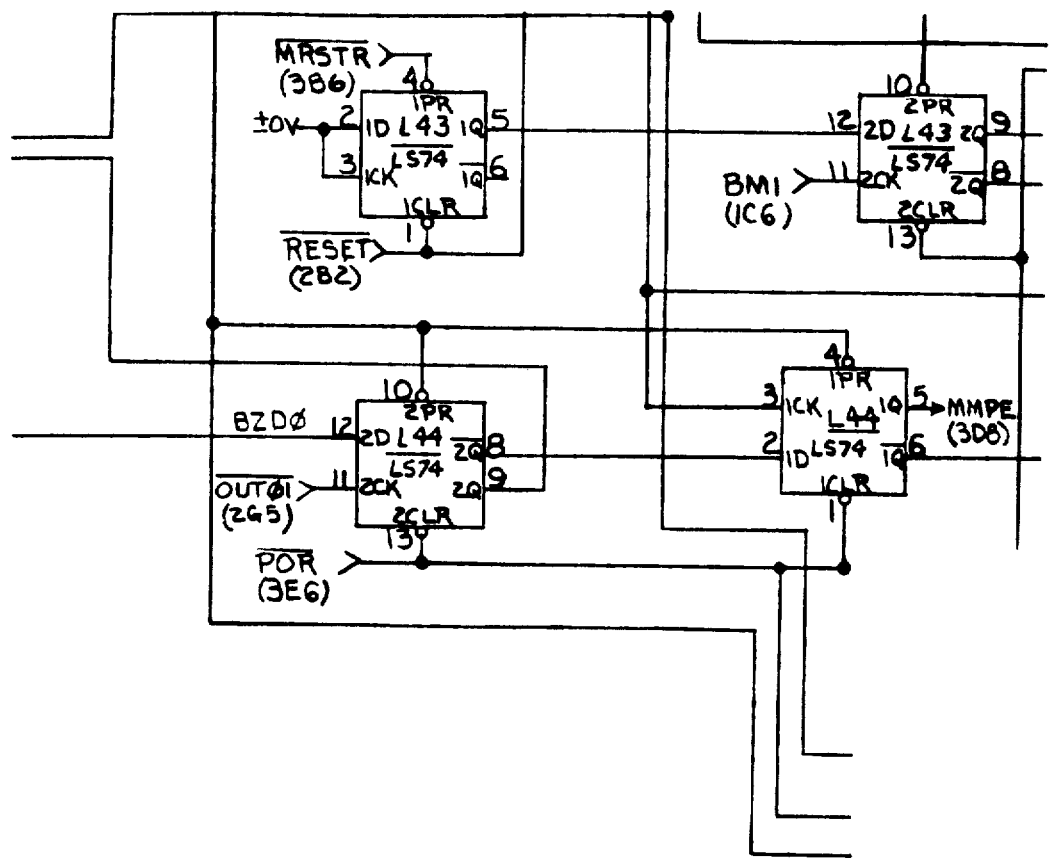
FIG. 6-2B3

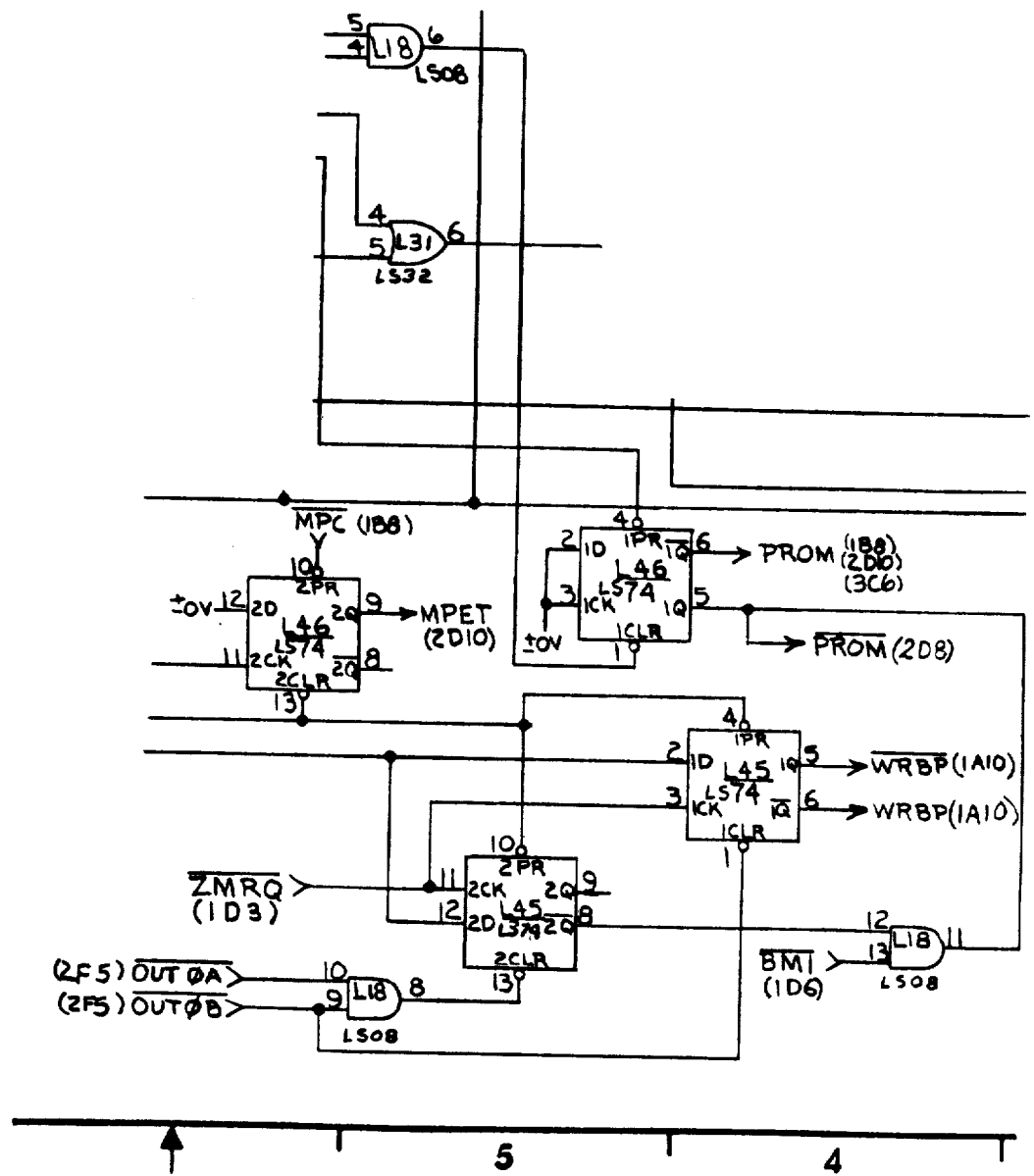
FIG. 6-2B4

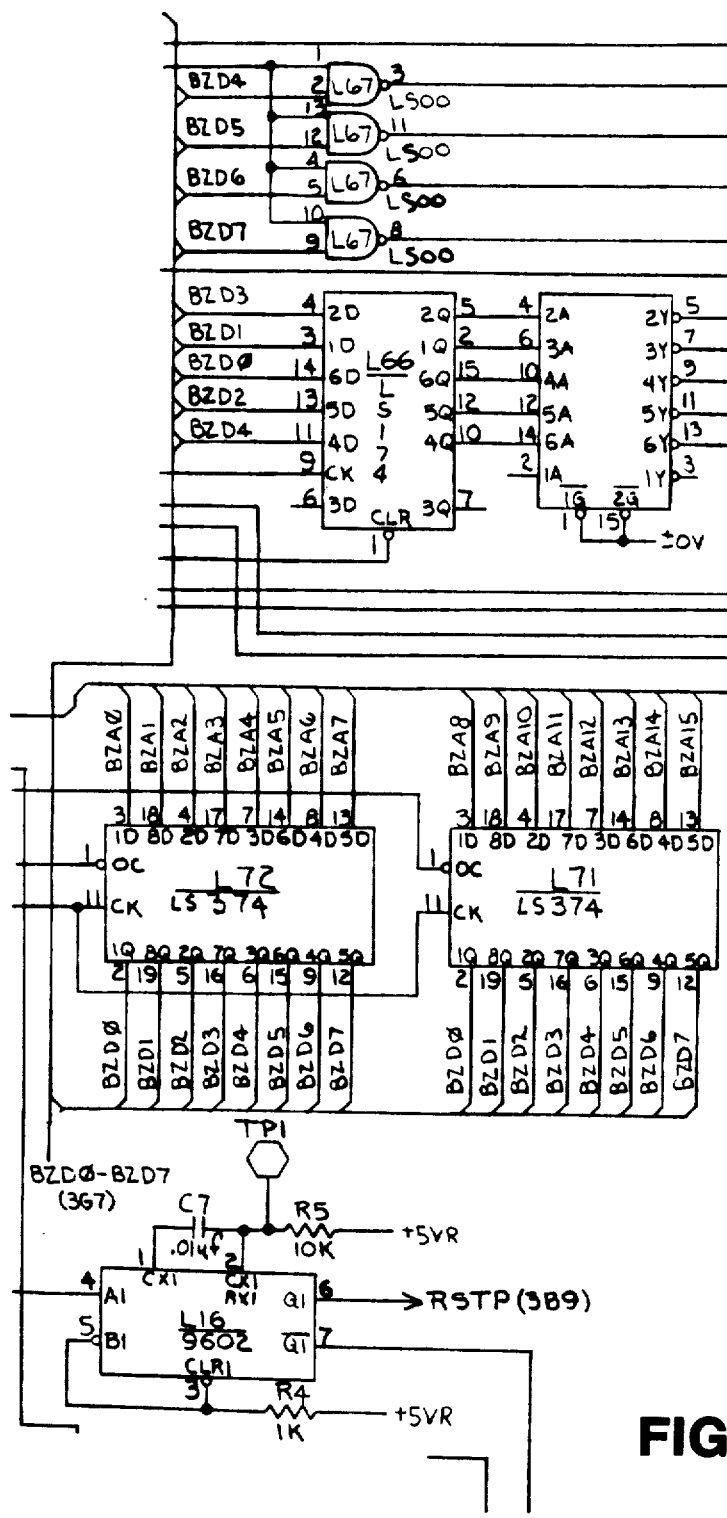
FIG. 6-2C1

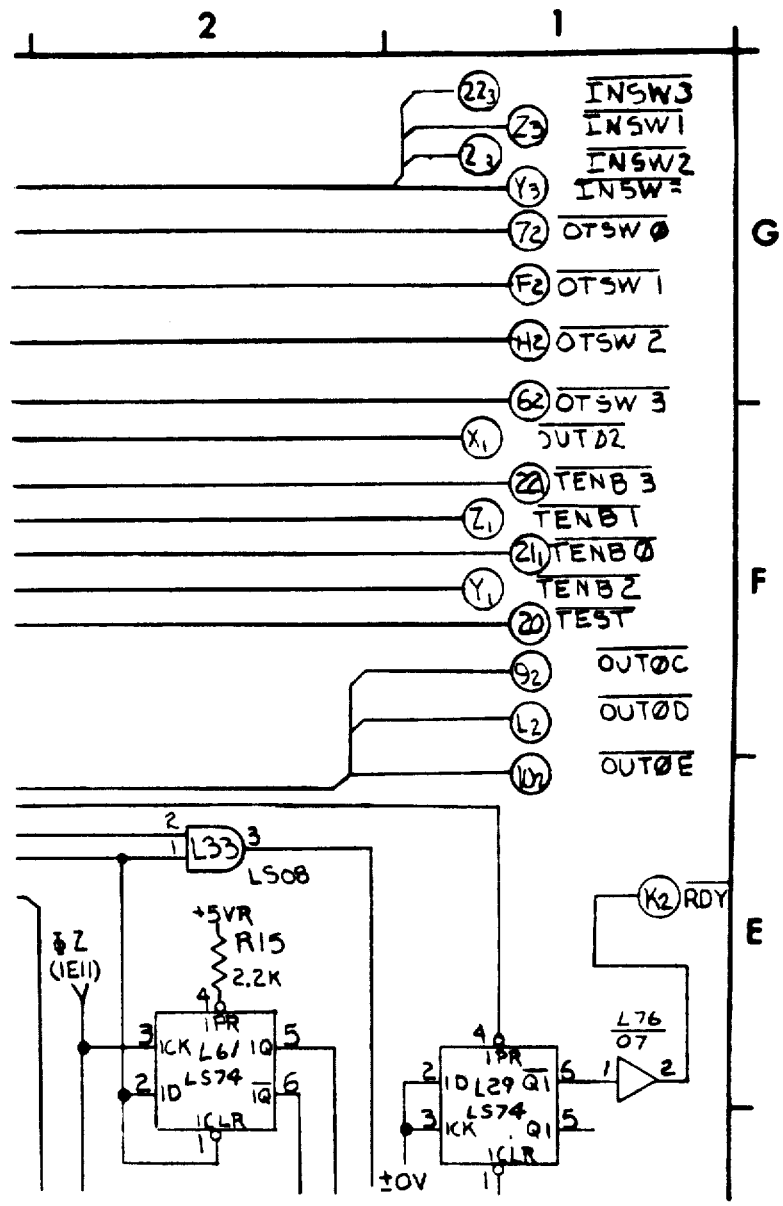
FIG. 6-2C2

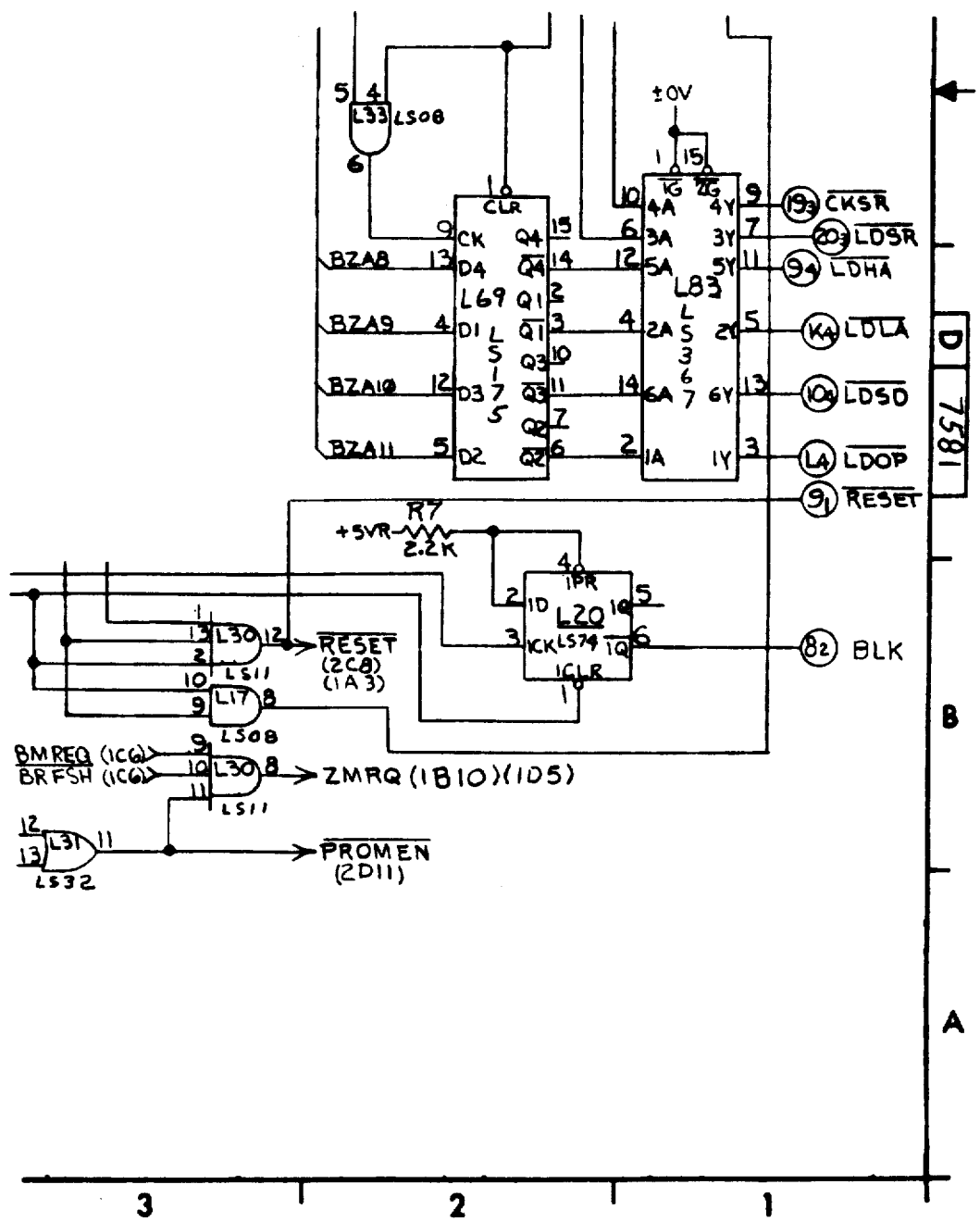
FIG. 6-2C3

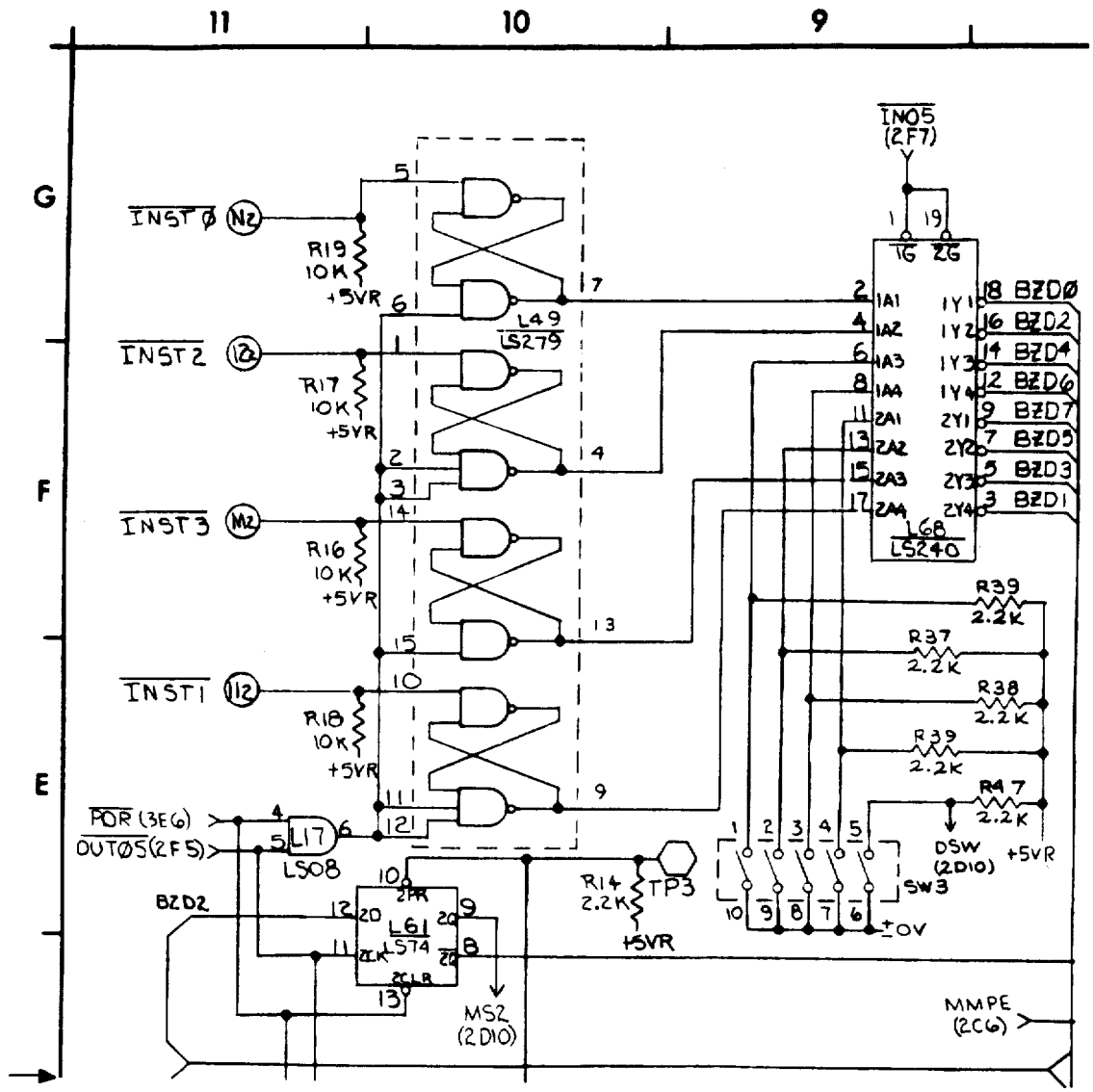
FIG. 6-3A1

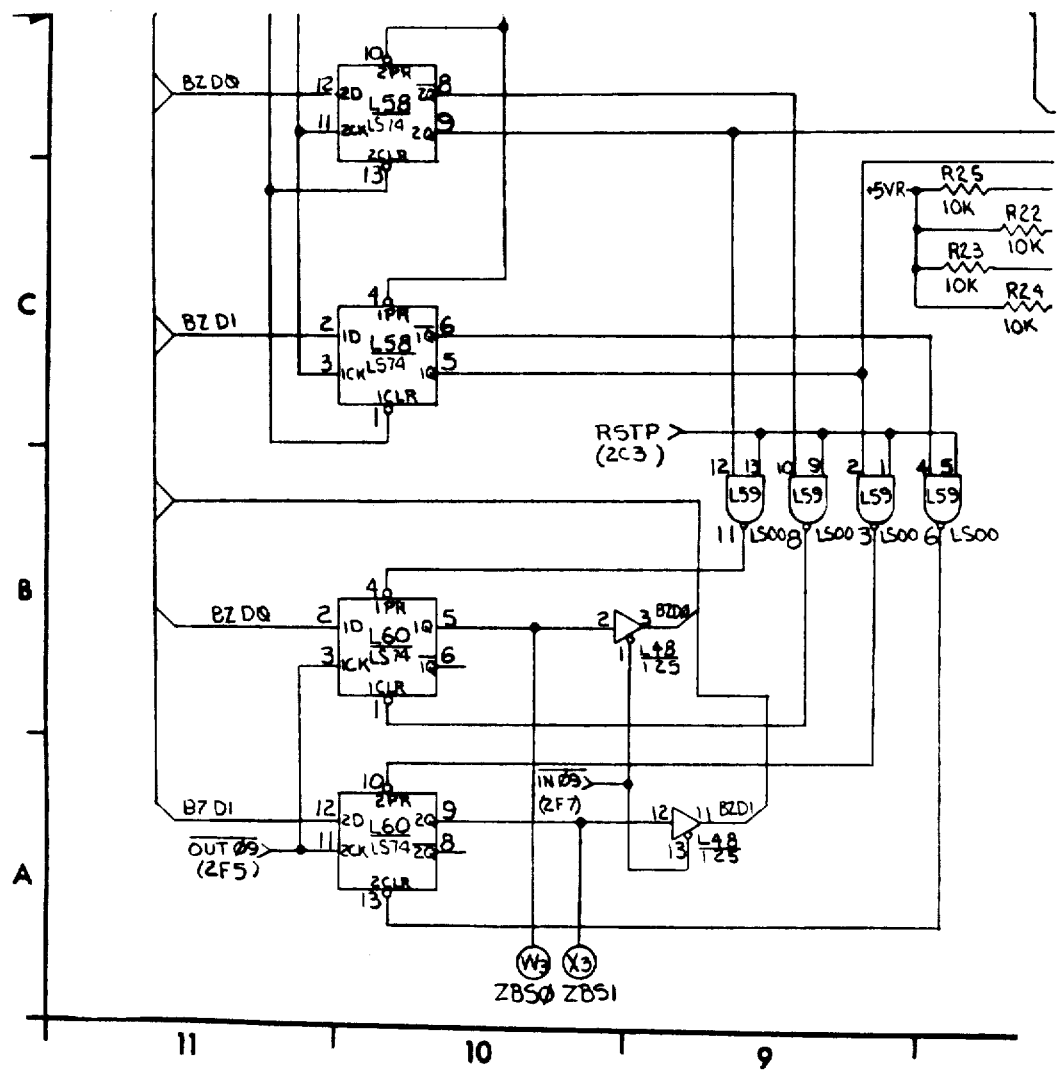
FIG. 6-3A2

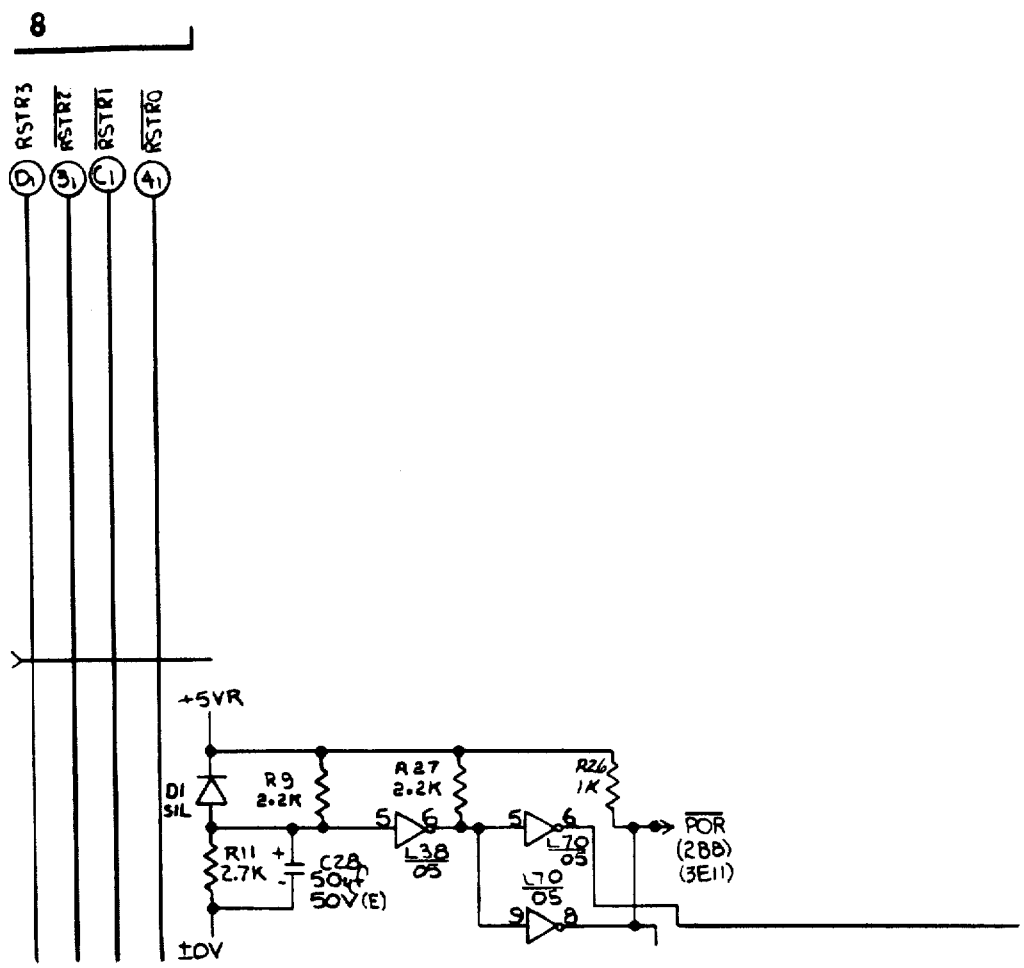
FIG. 6-3B1

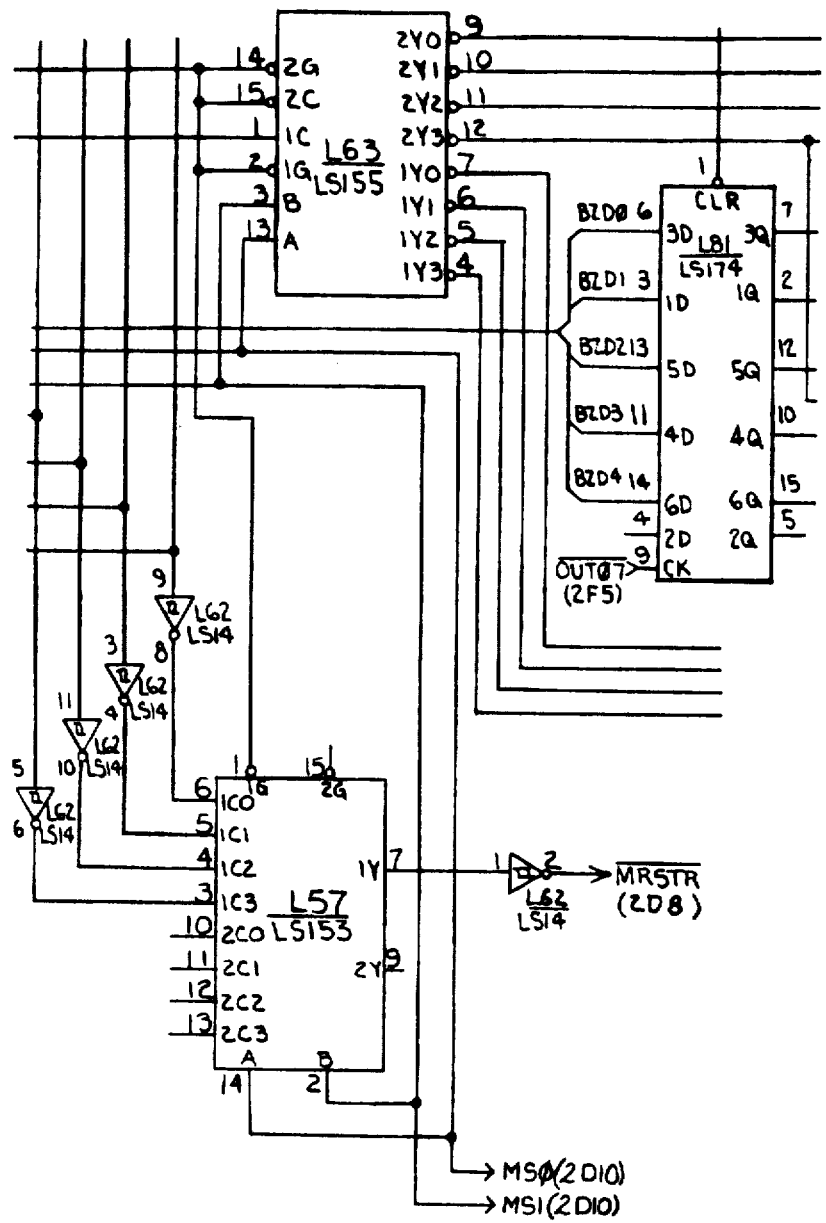
FIG. 6-3B2

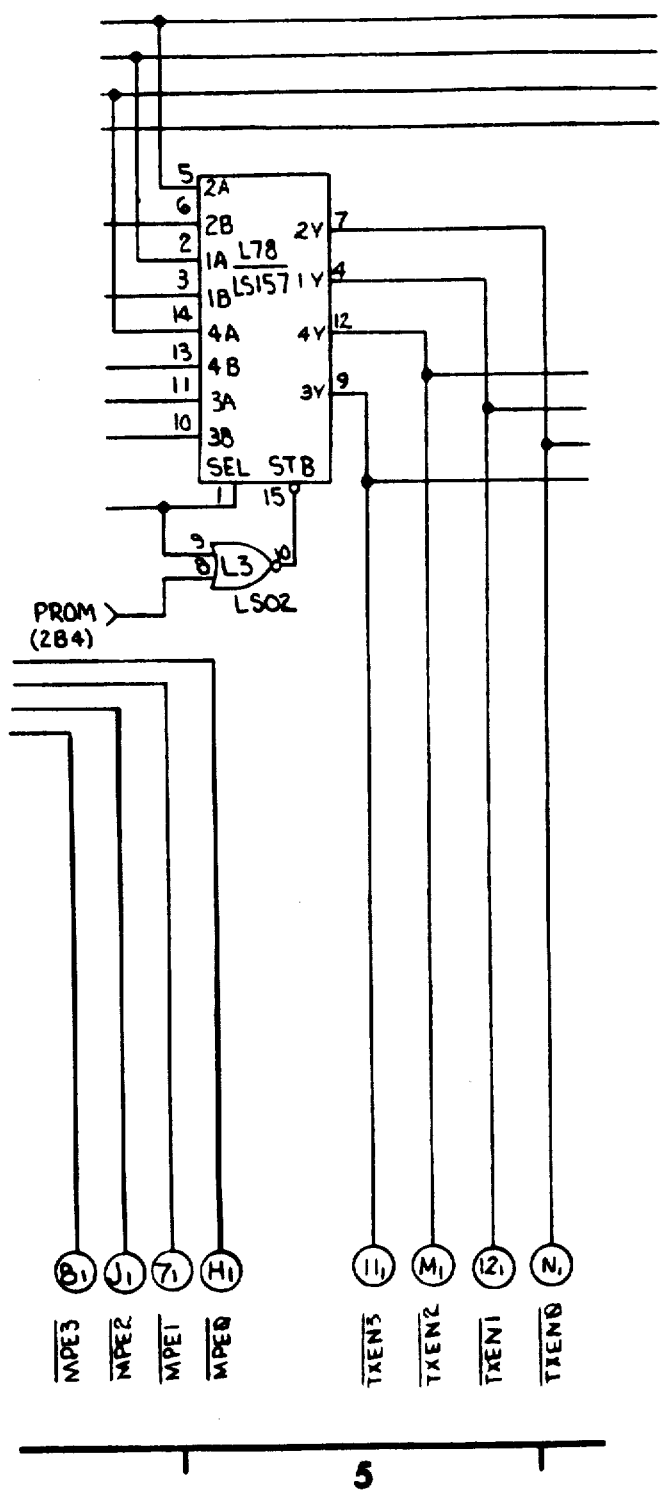
FIG. 6-3B3

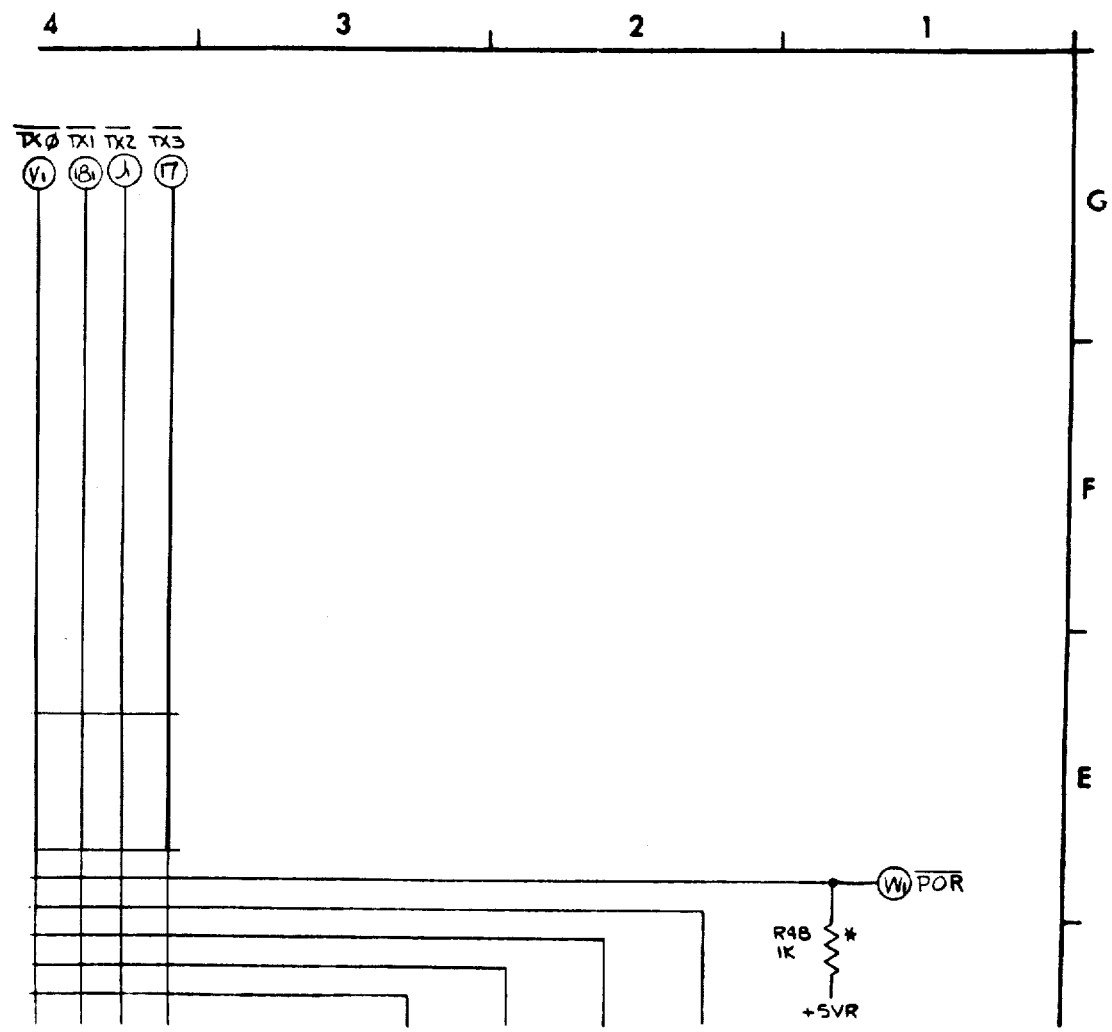
FIG. 6-3C1

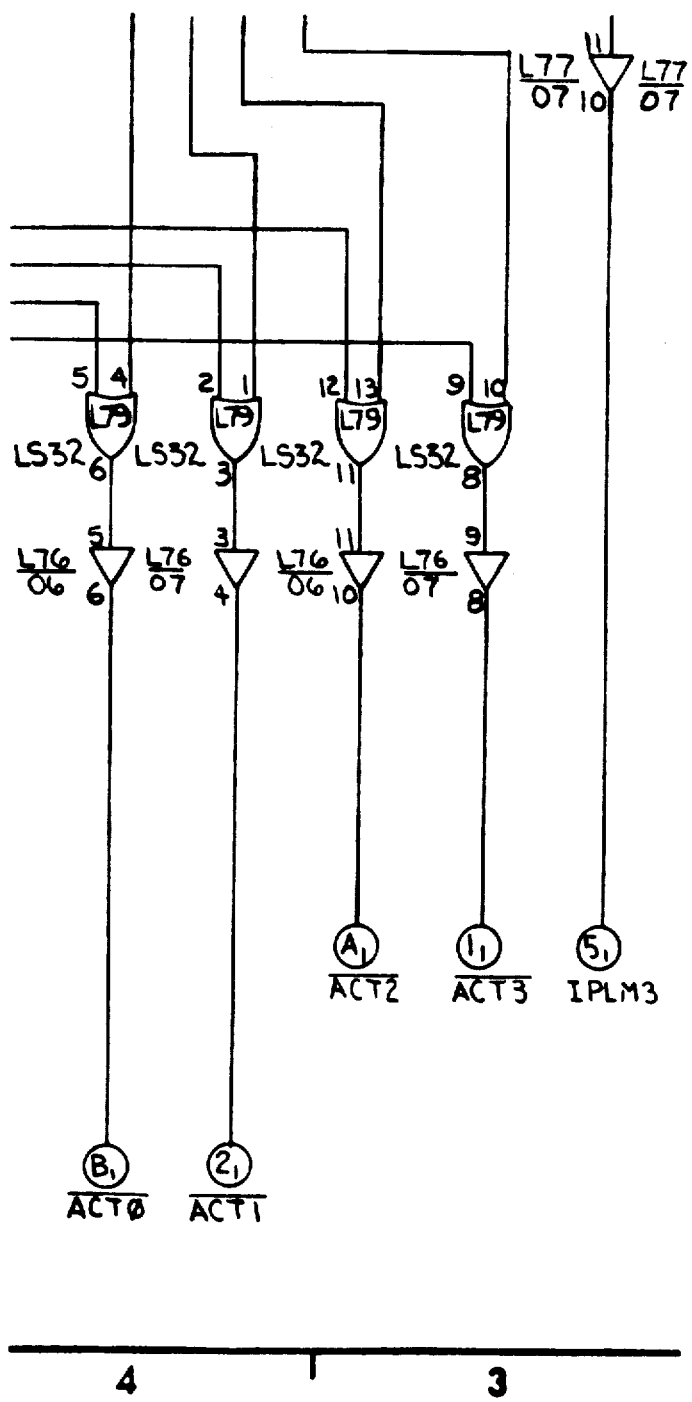
FIG. 6-3C2

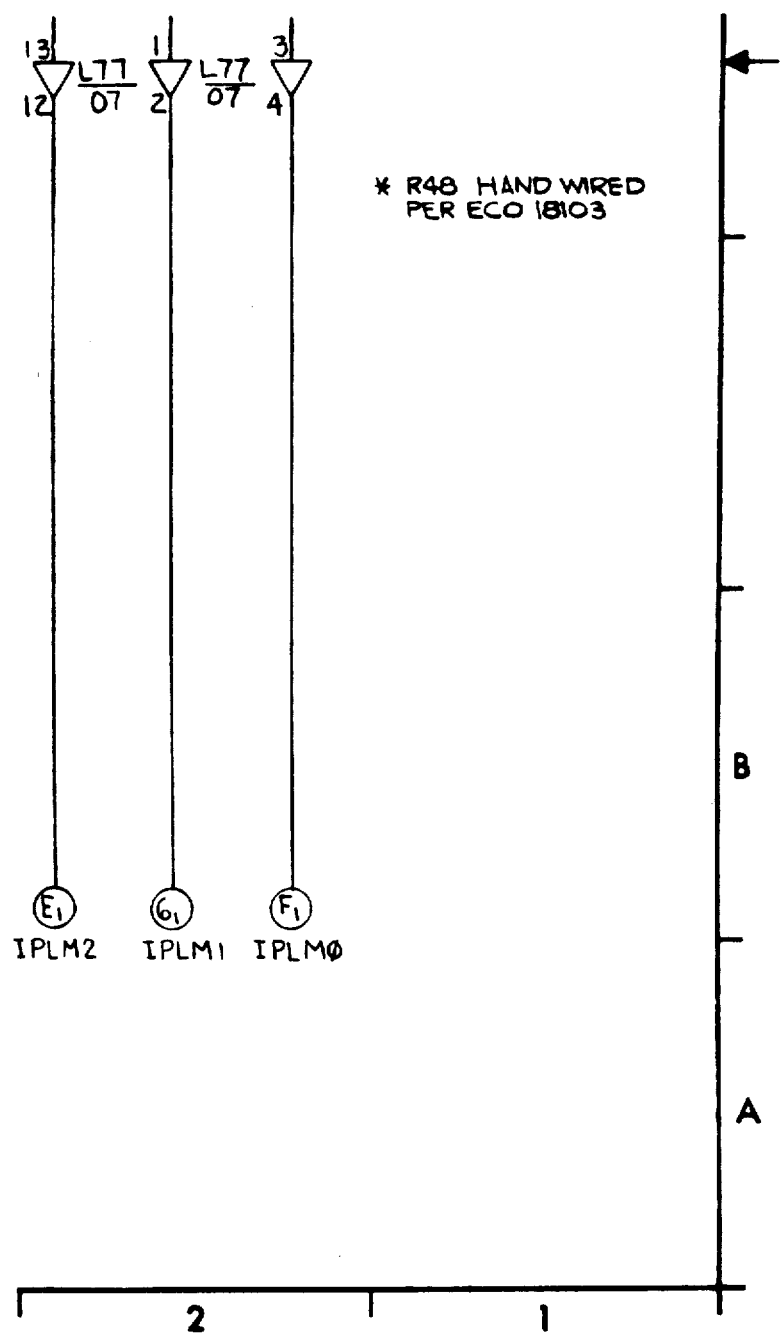
FIG. 6-3C3

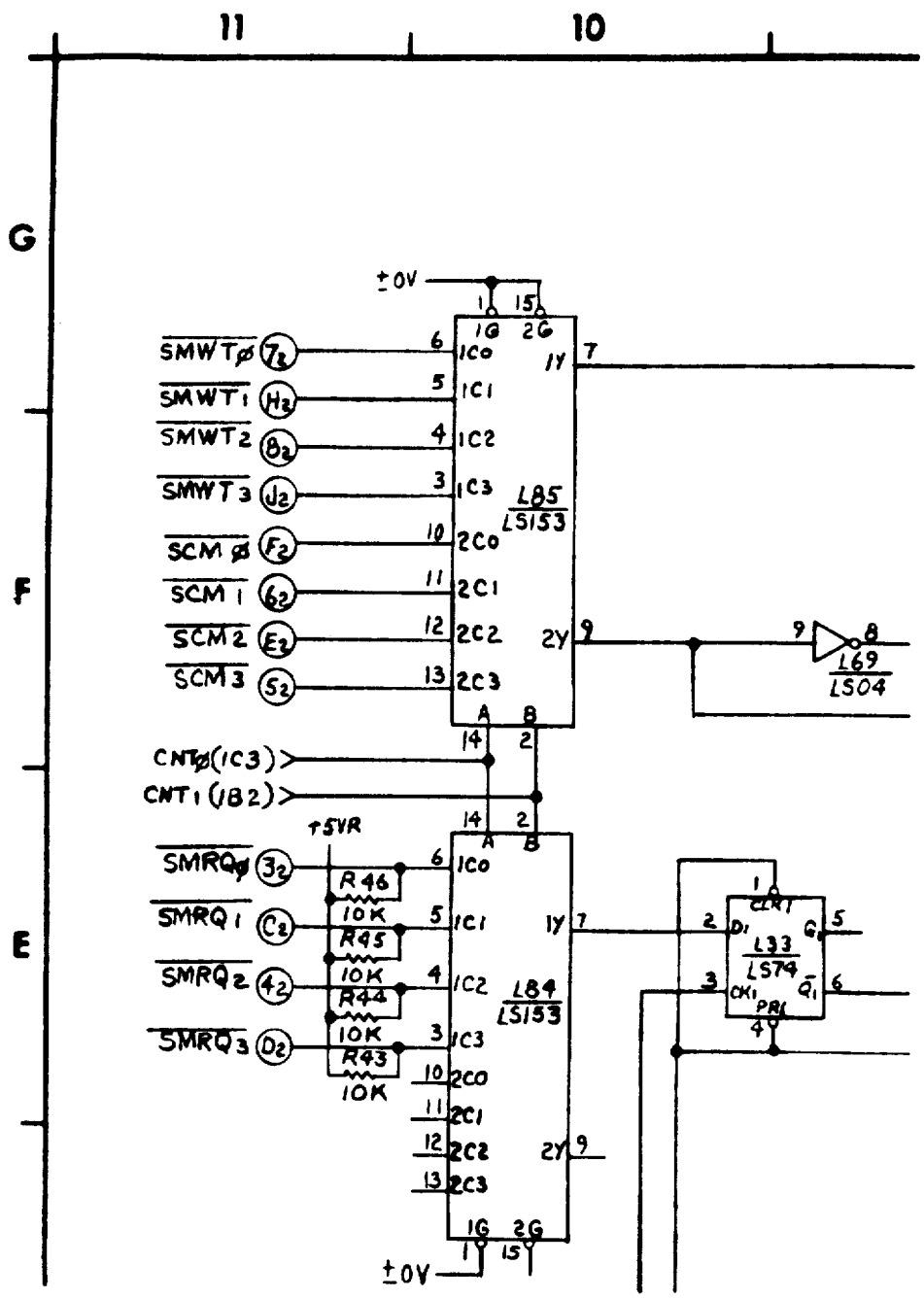
FIG. 7-1A1

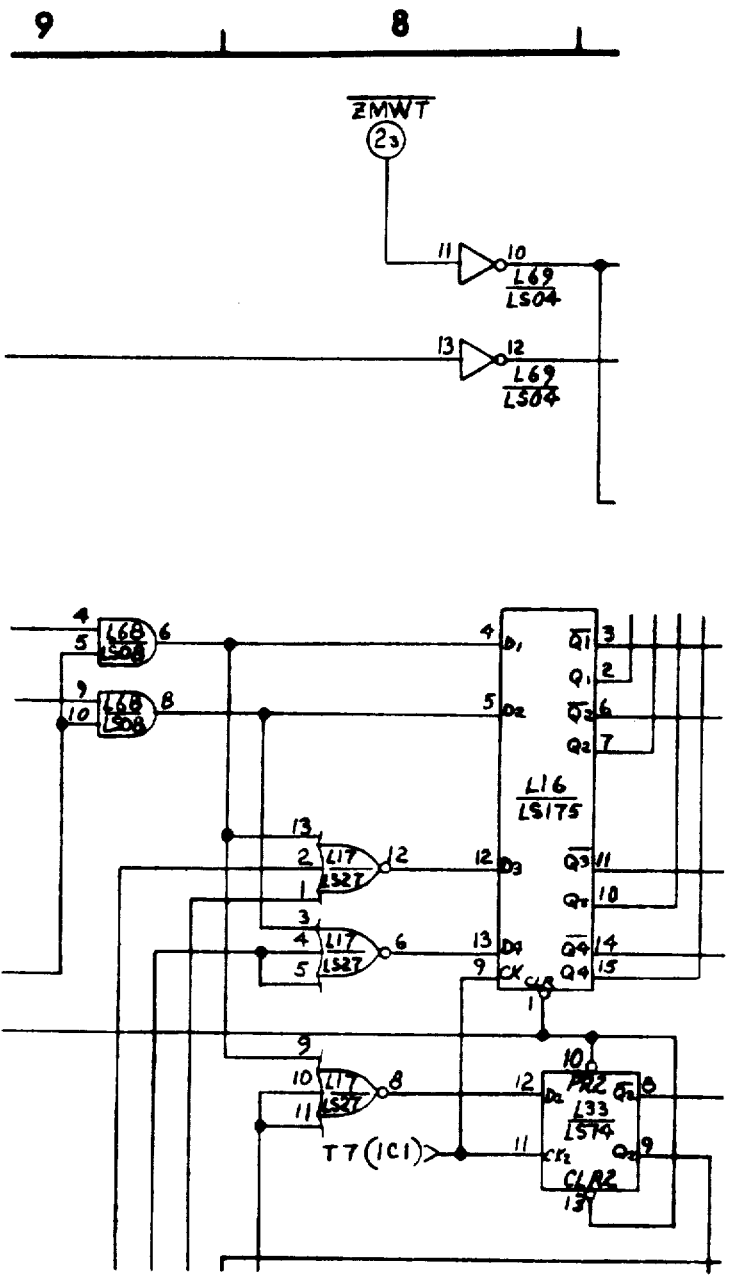
FIG. 7-1A2

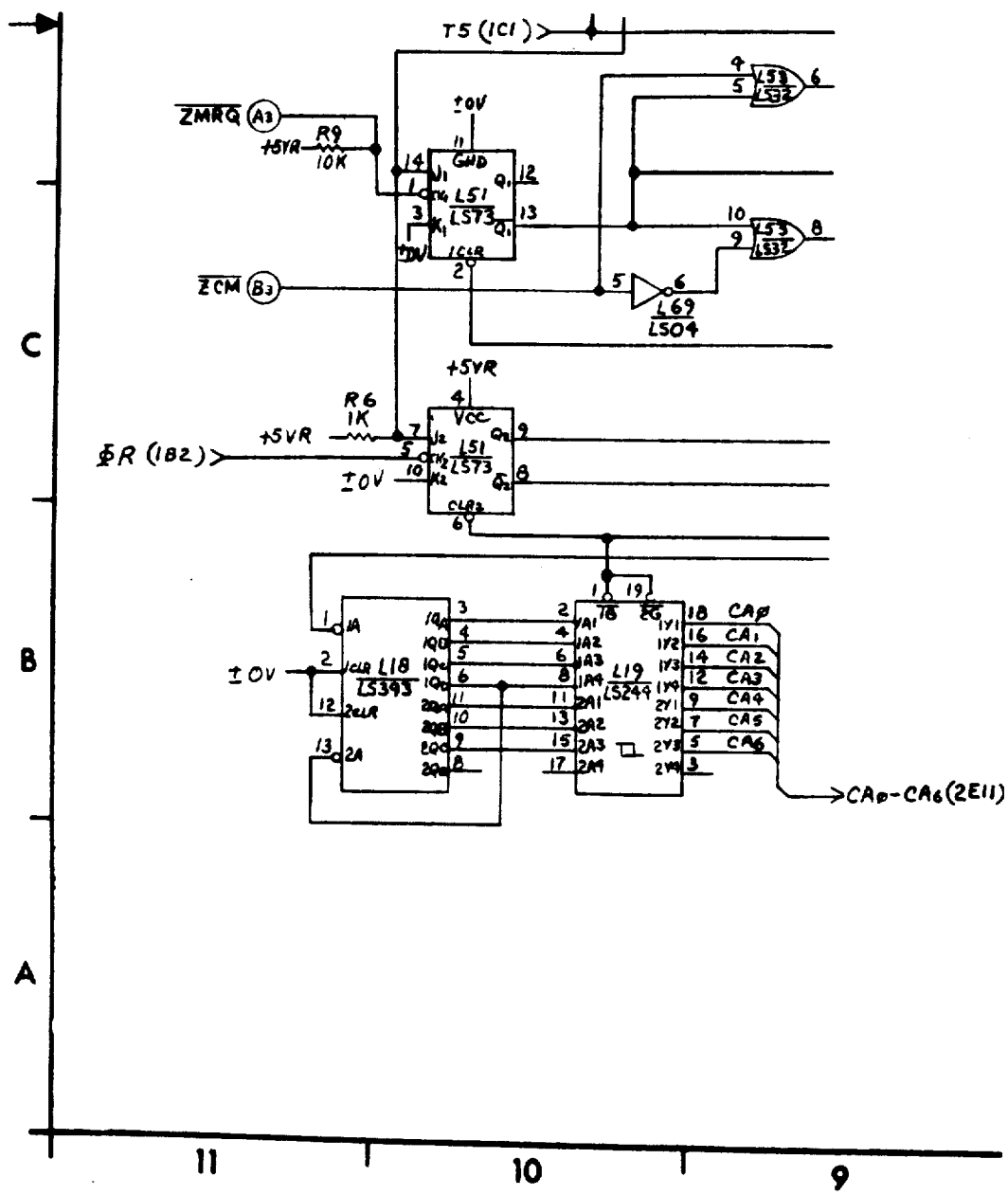
FIG. 7-1A3

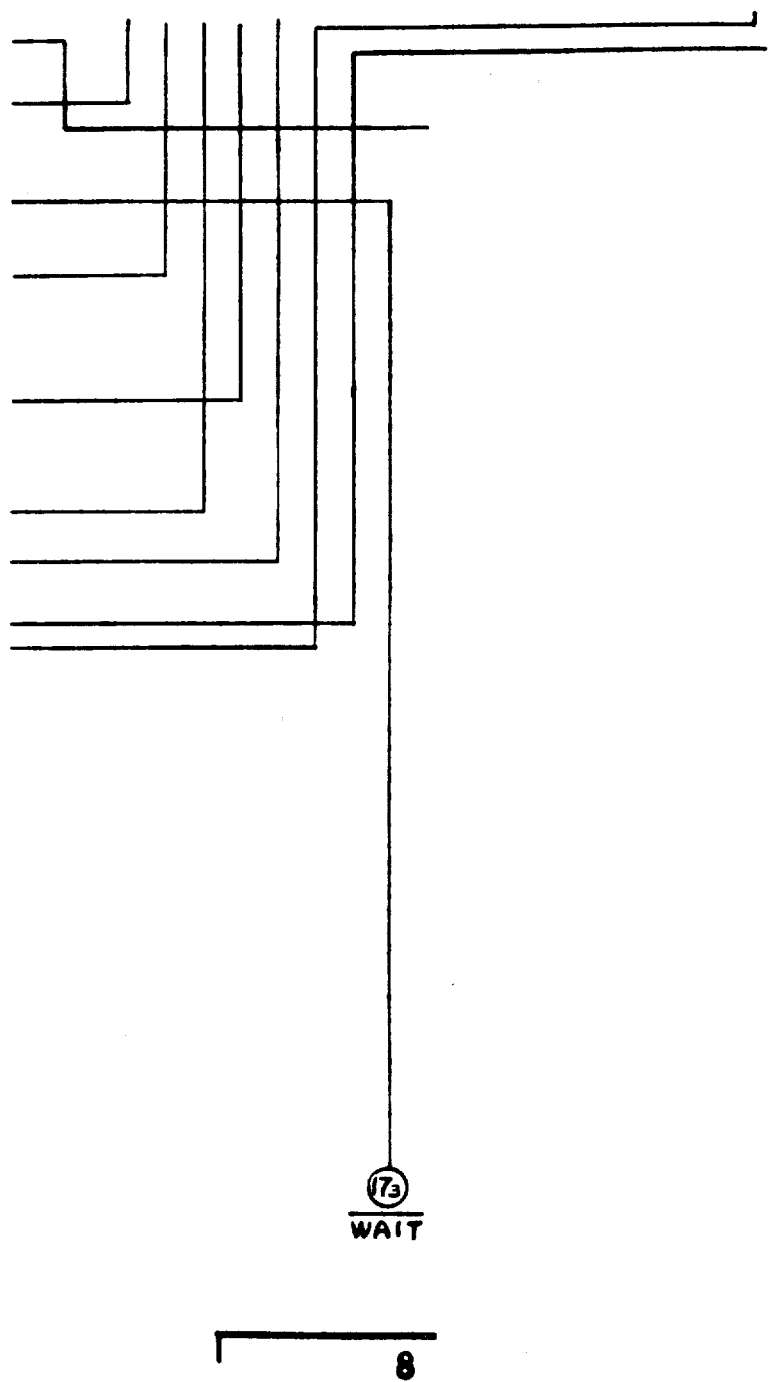
FIG. 7-1A4

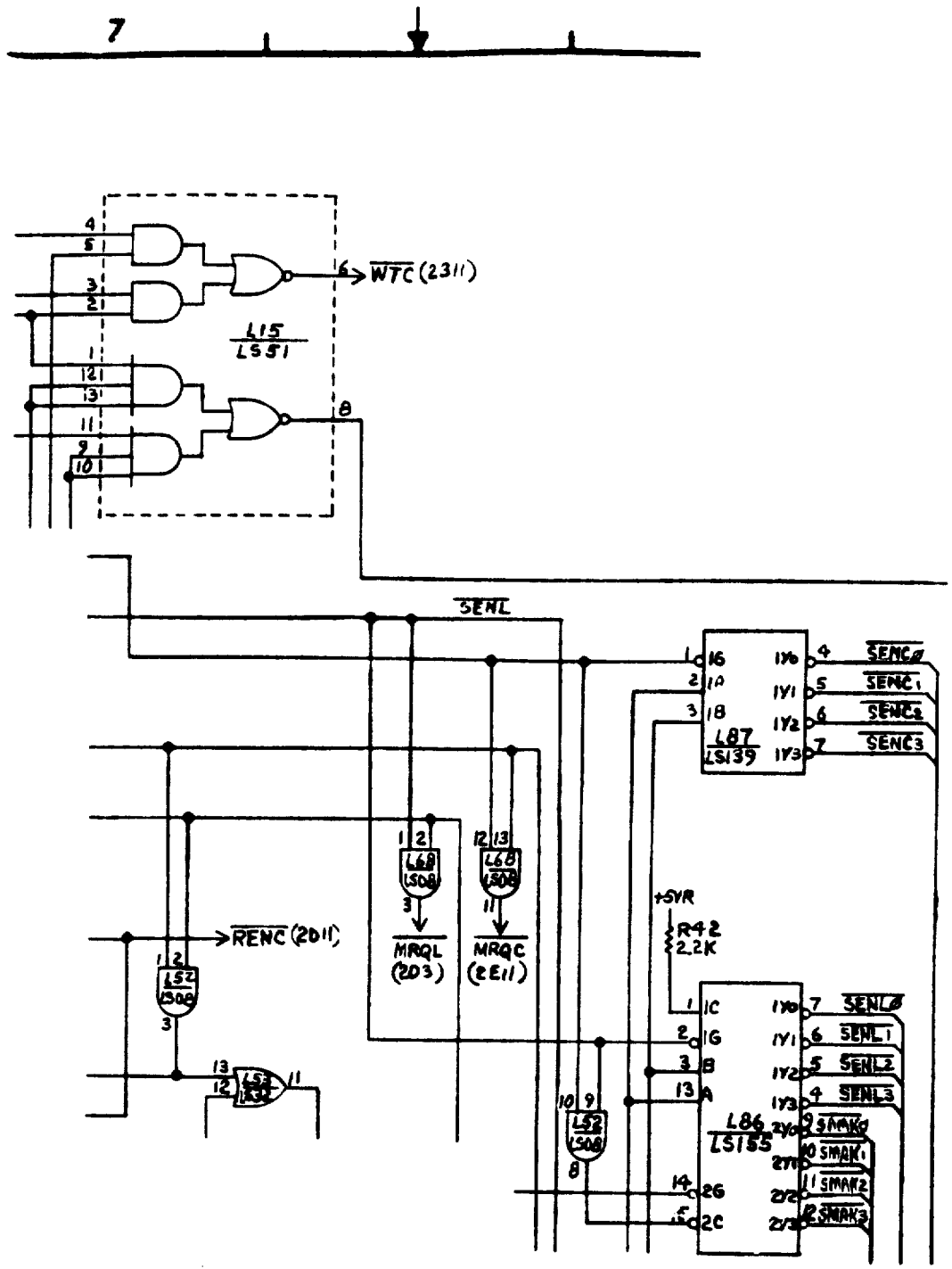
FIG. 7-1B1

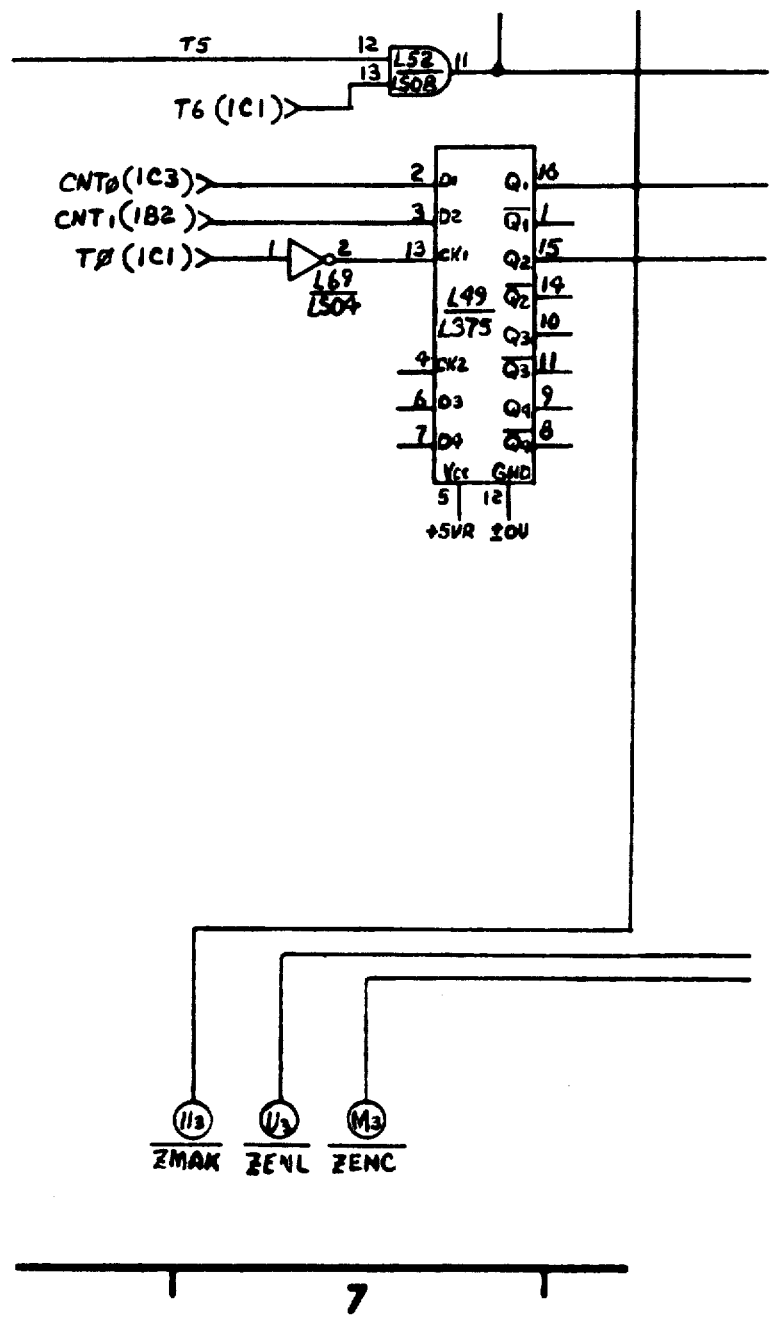
FIG. 7-1B2

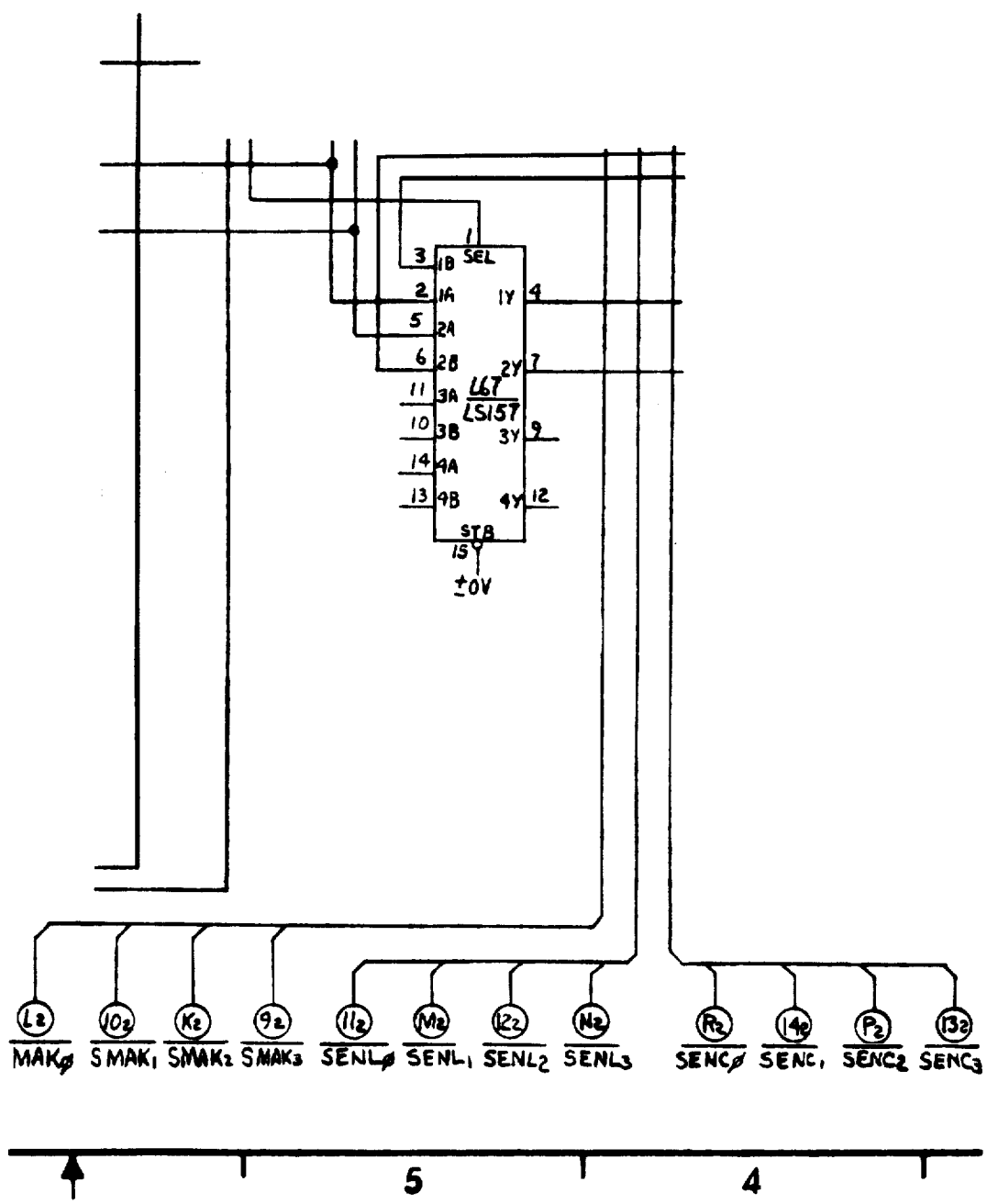
FIG. 7-1B3

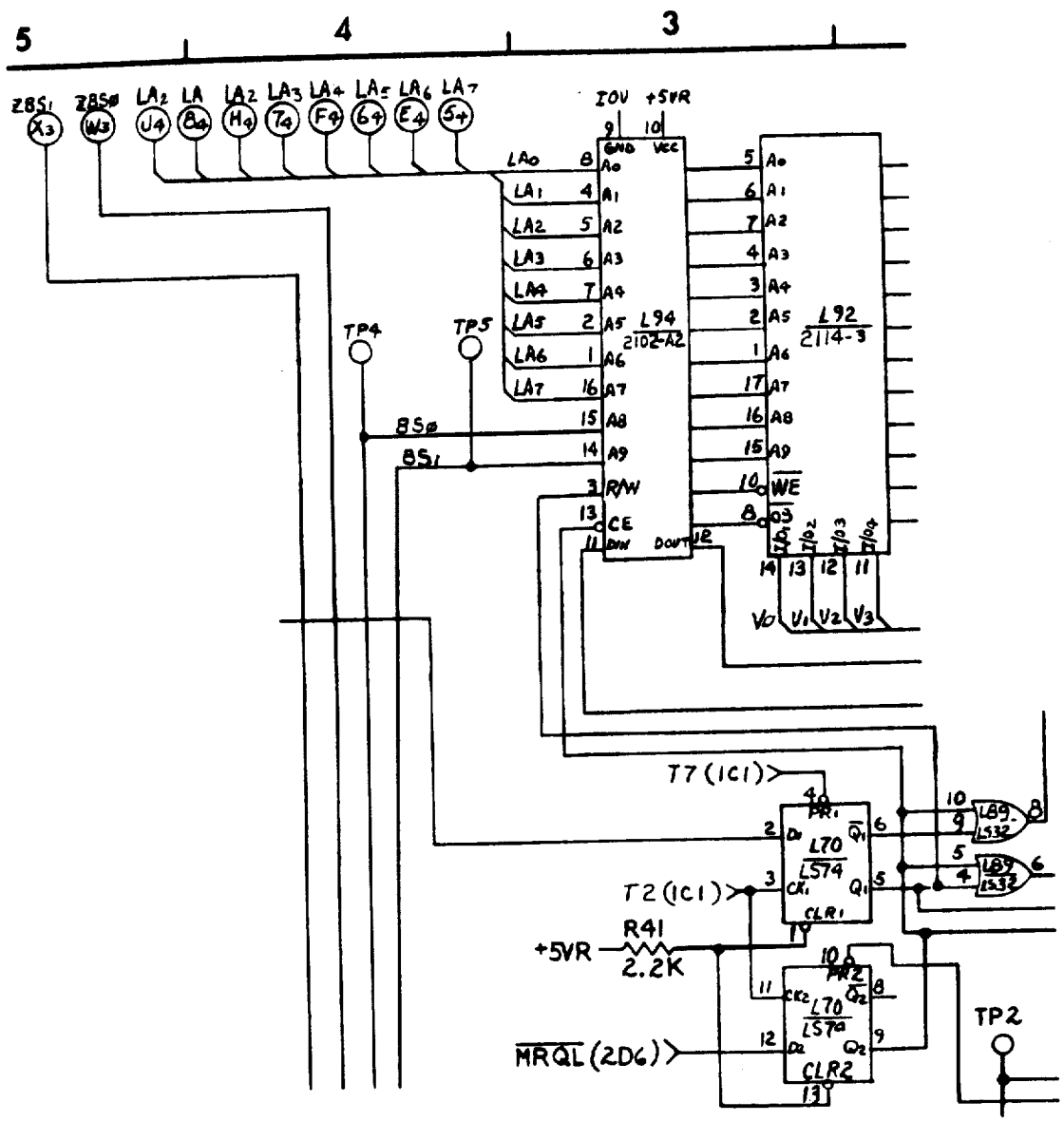
FIG. 7-1C1

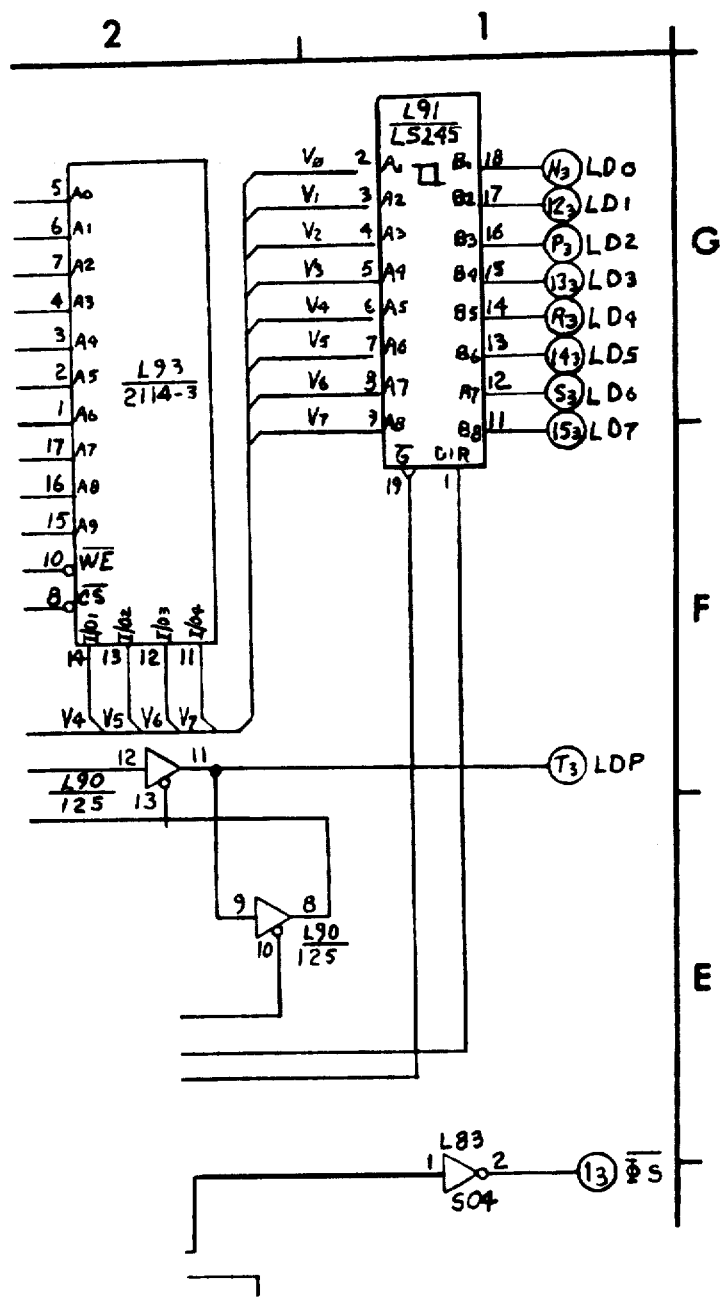
FIG. 7-1C2

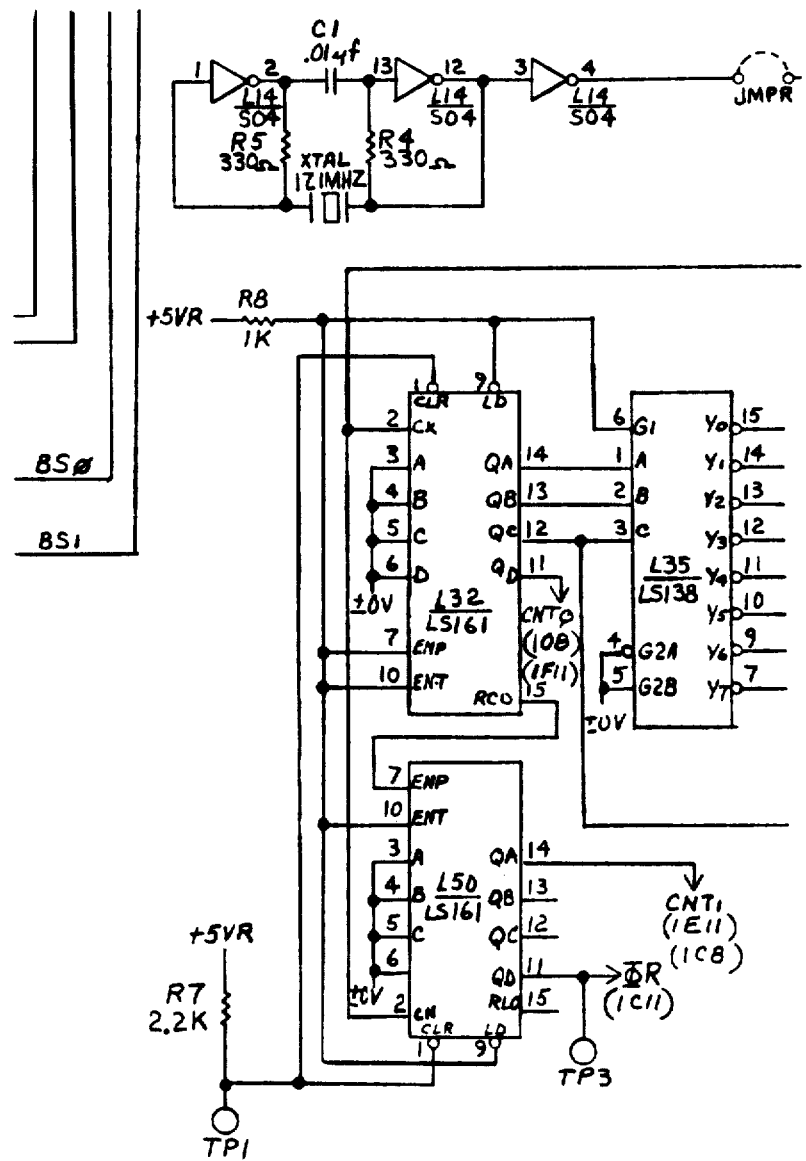
FIG. 7-1C3

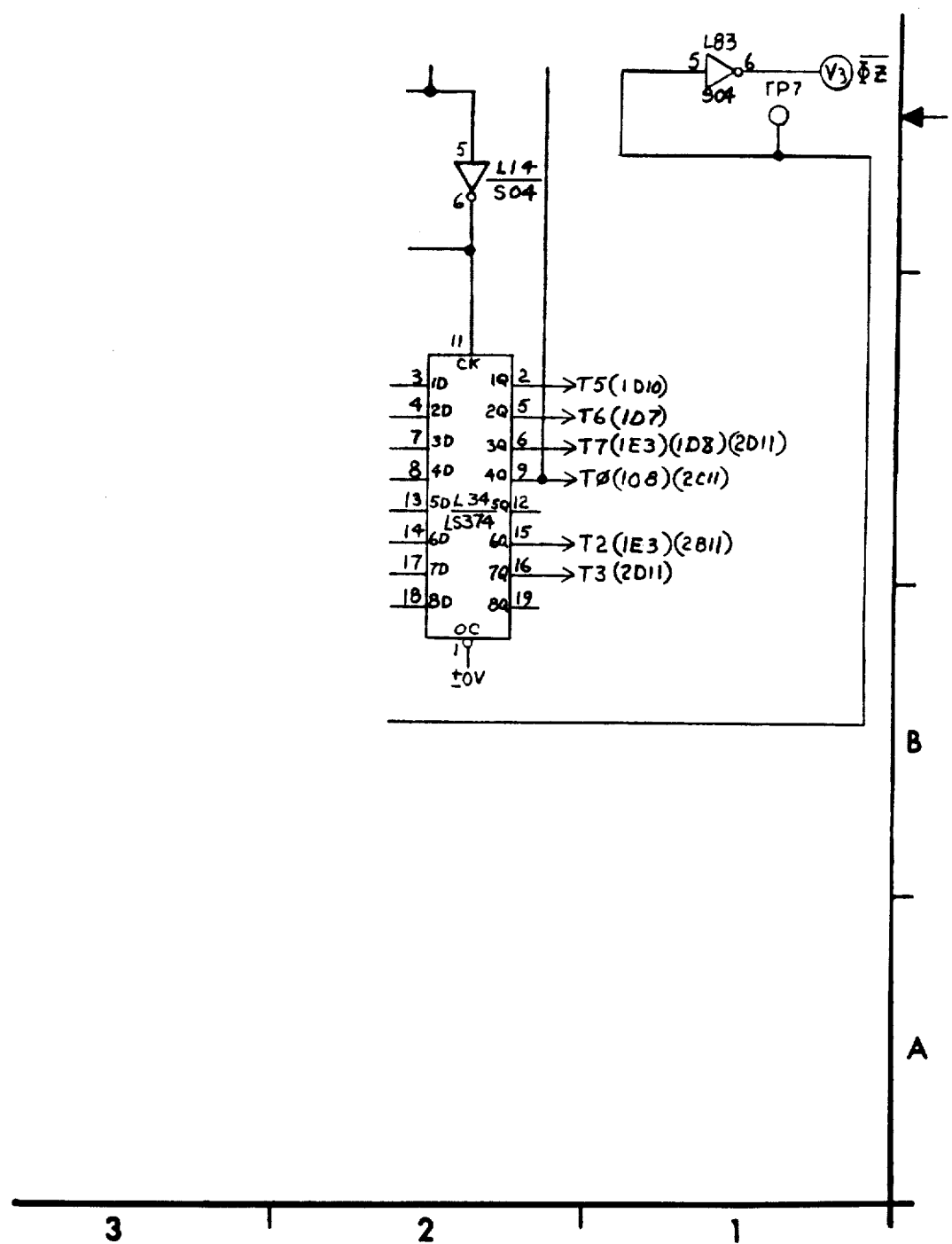
FIG. 7-1C4

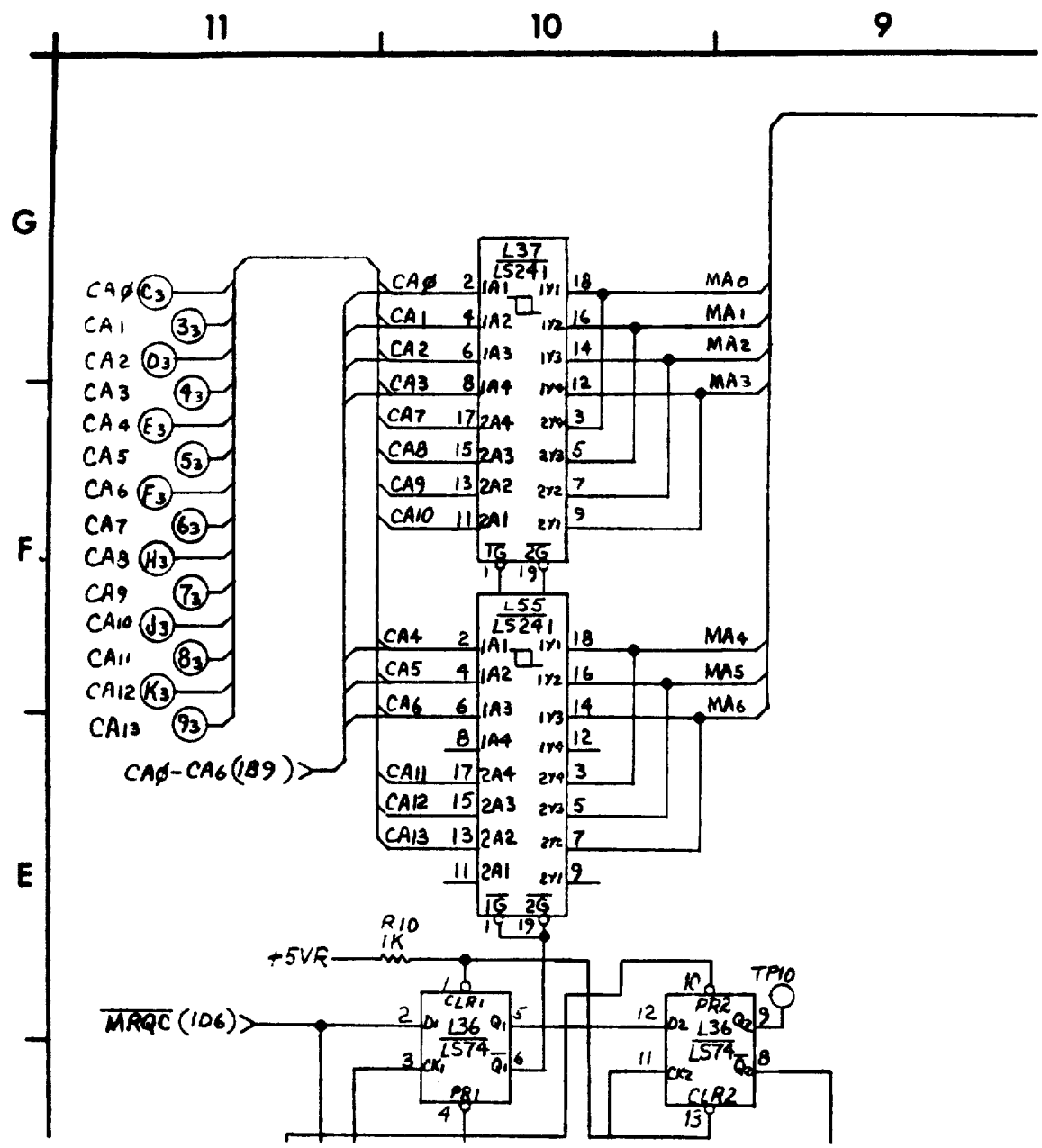
FIG. 7-2A1

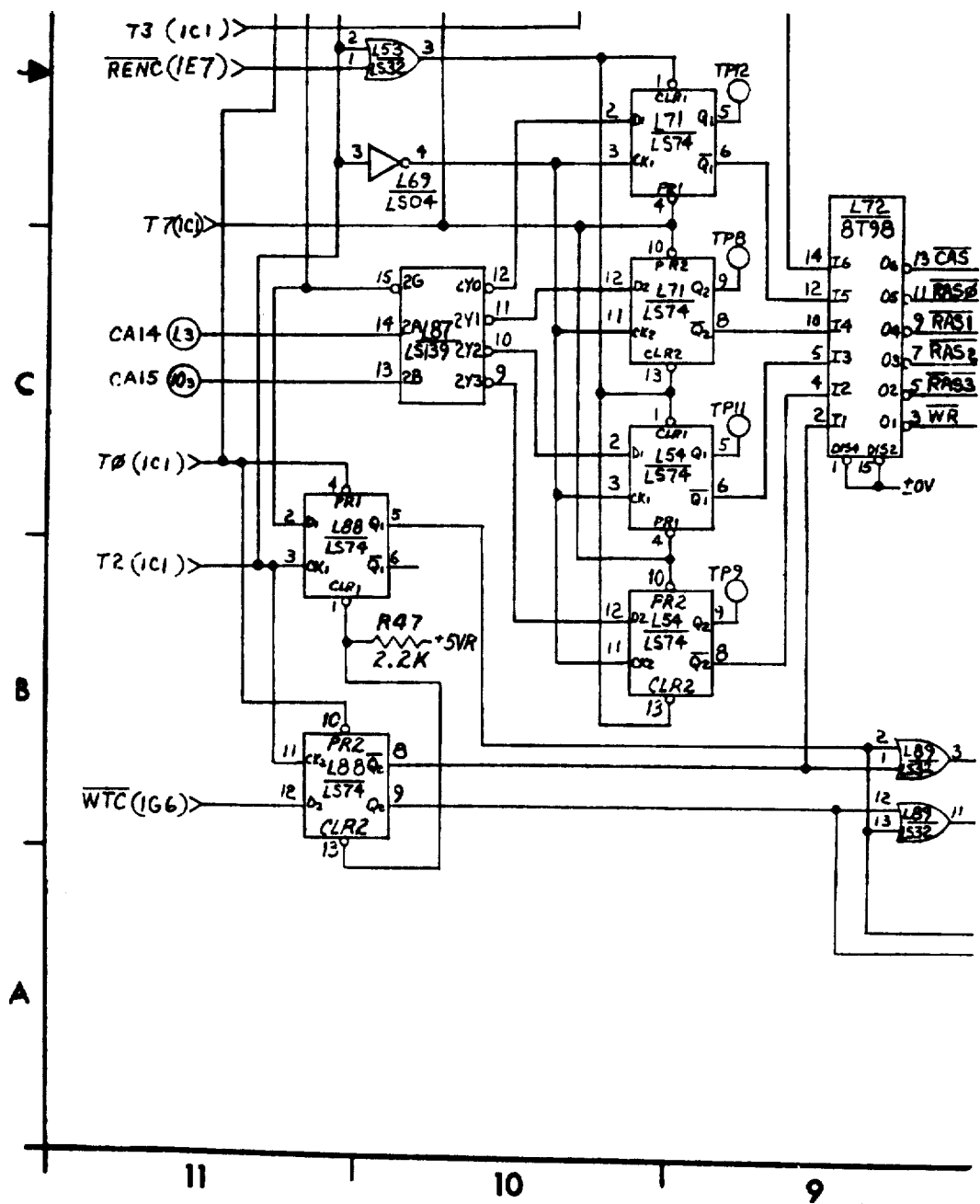
FIG. 7-2A2

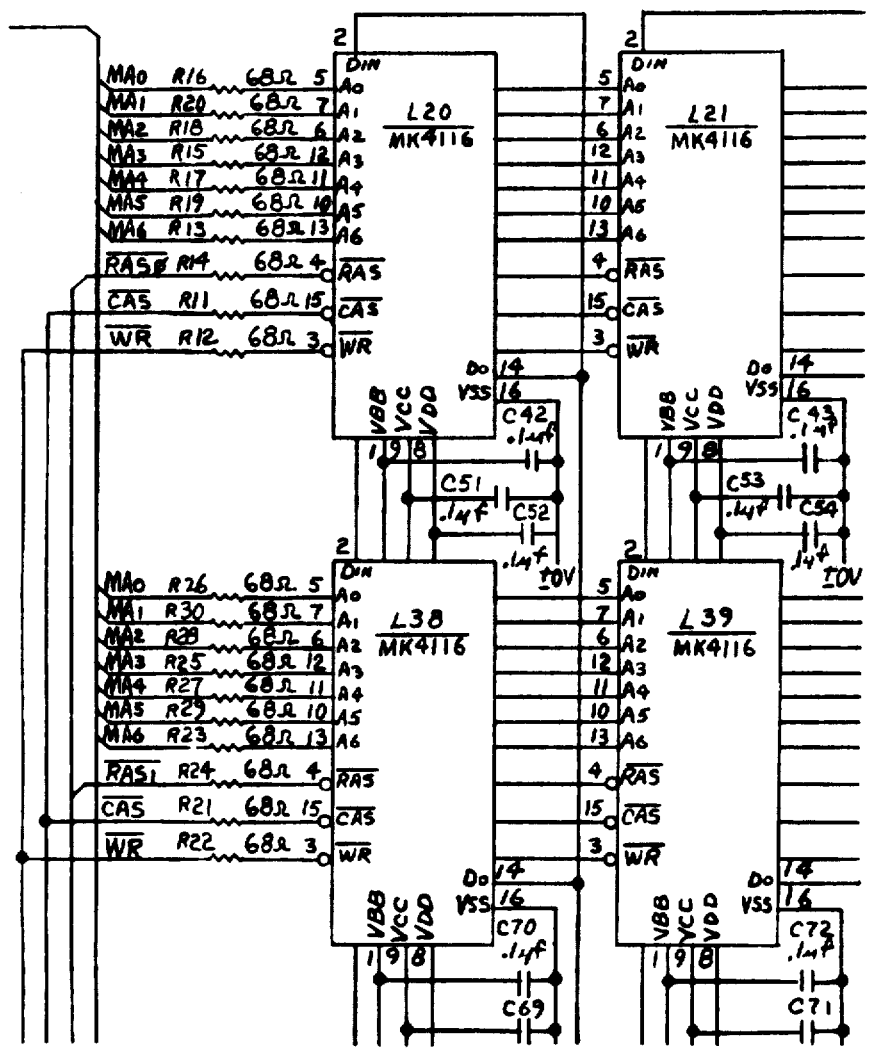
FIG. 7-2B1

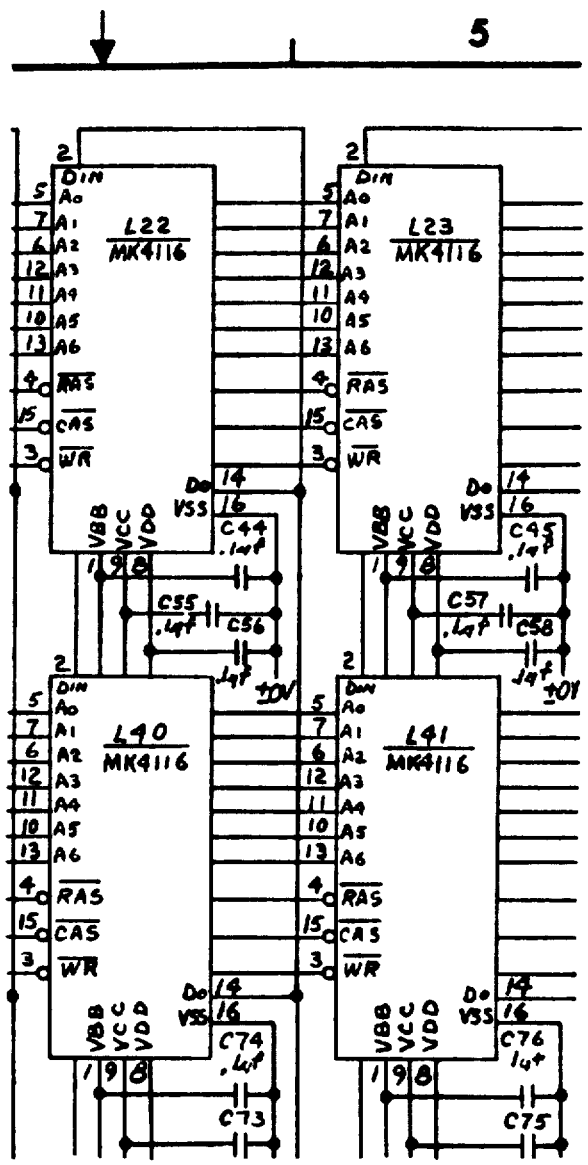
FIG. 7-2B2

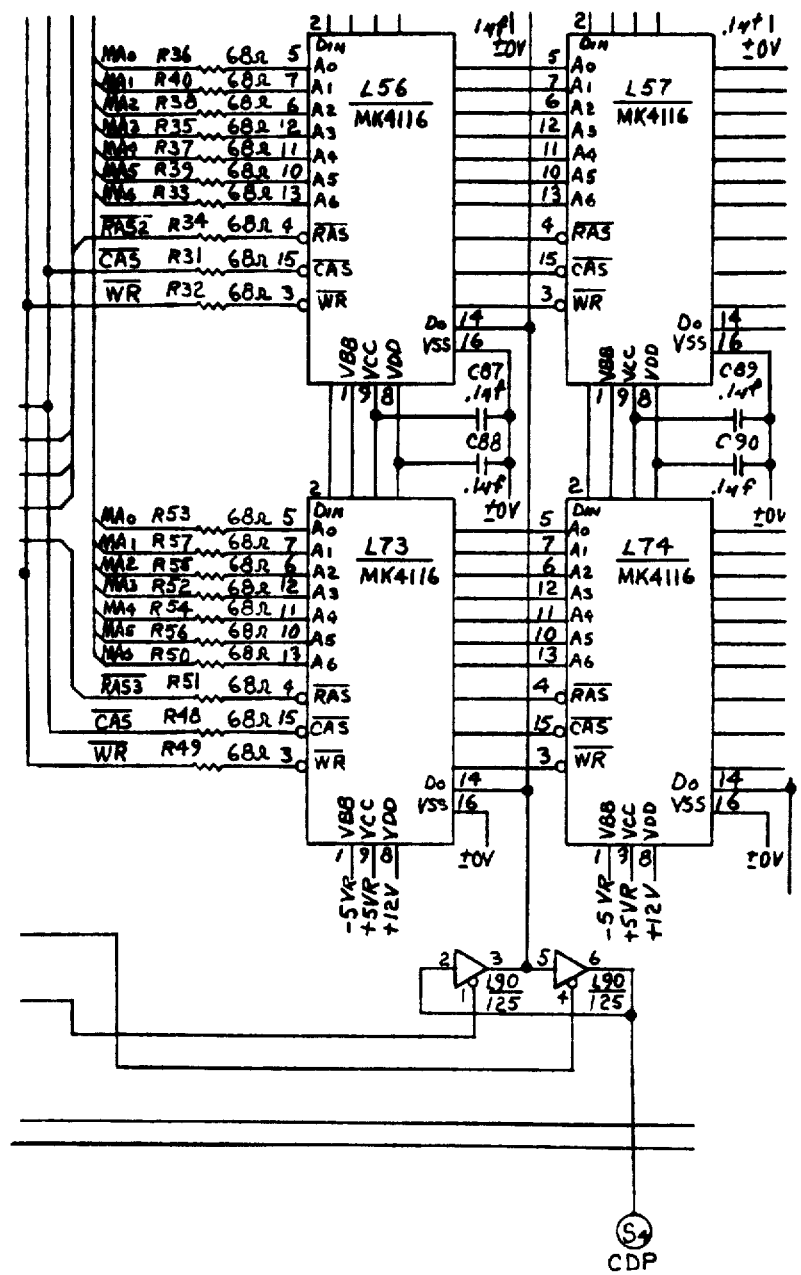
FIG. 7-2B3

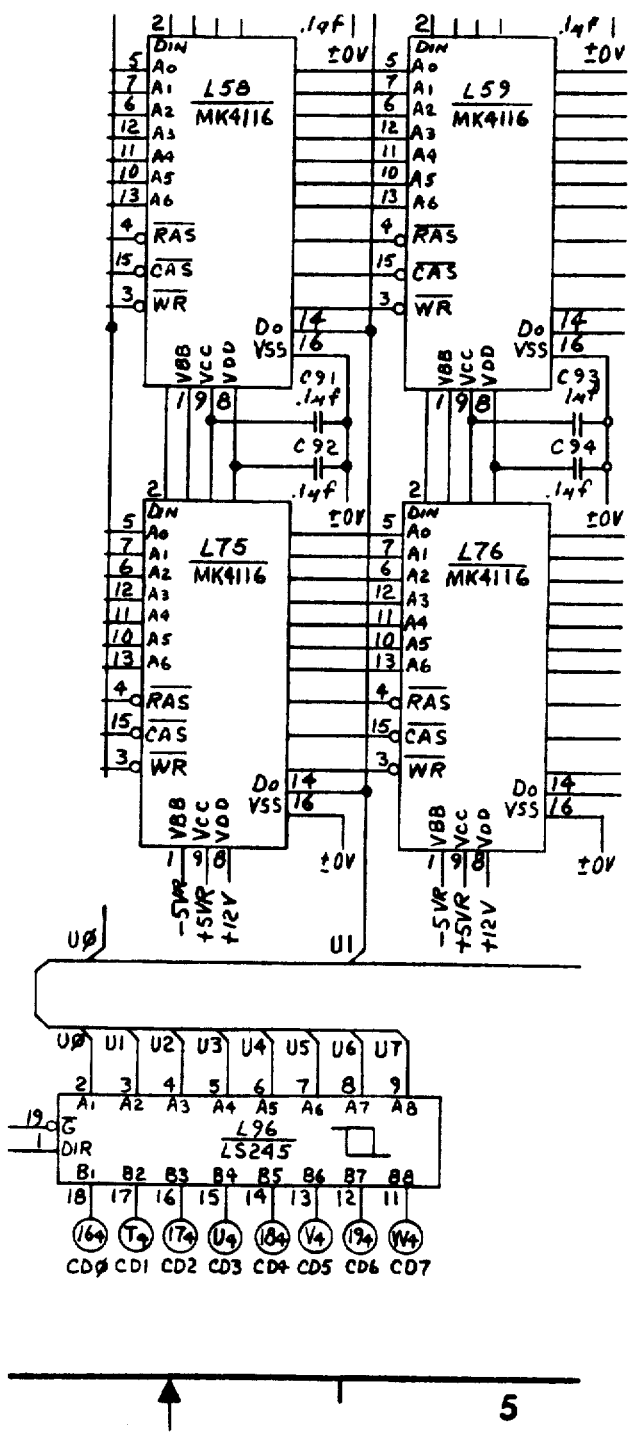
FIG. 7-2B4

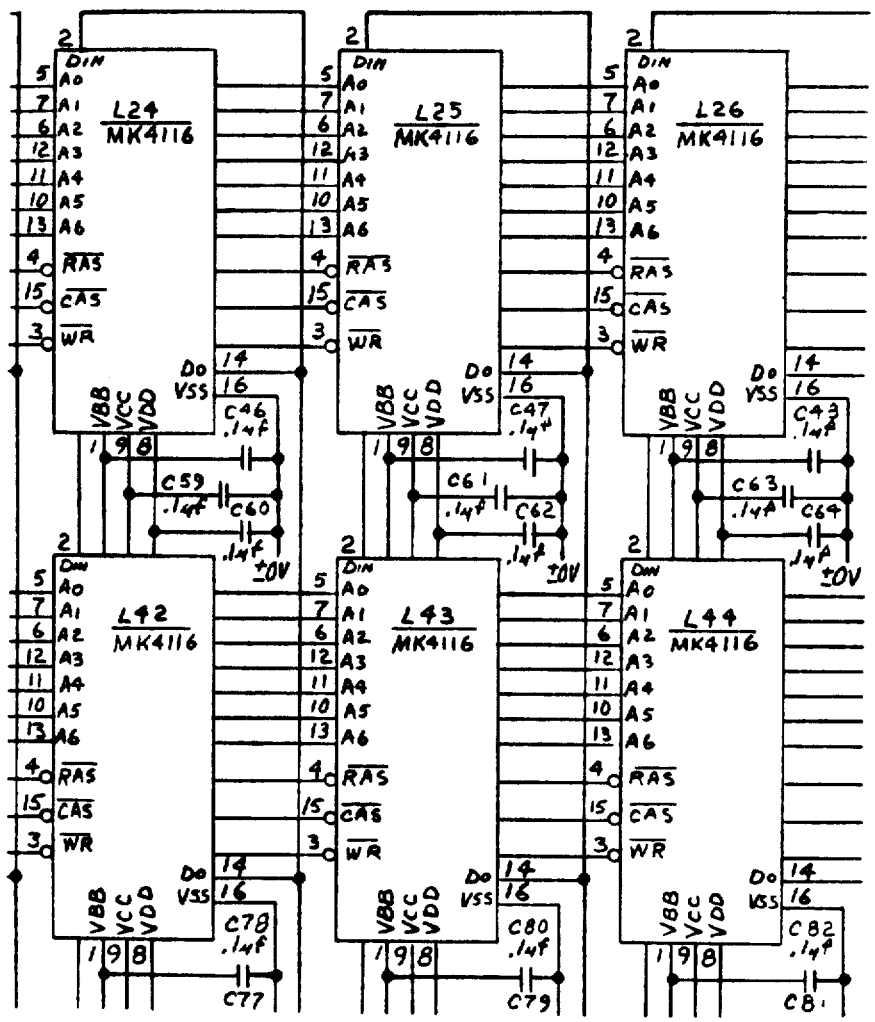
FIG. 7-2C1

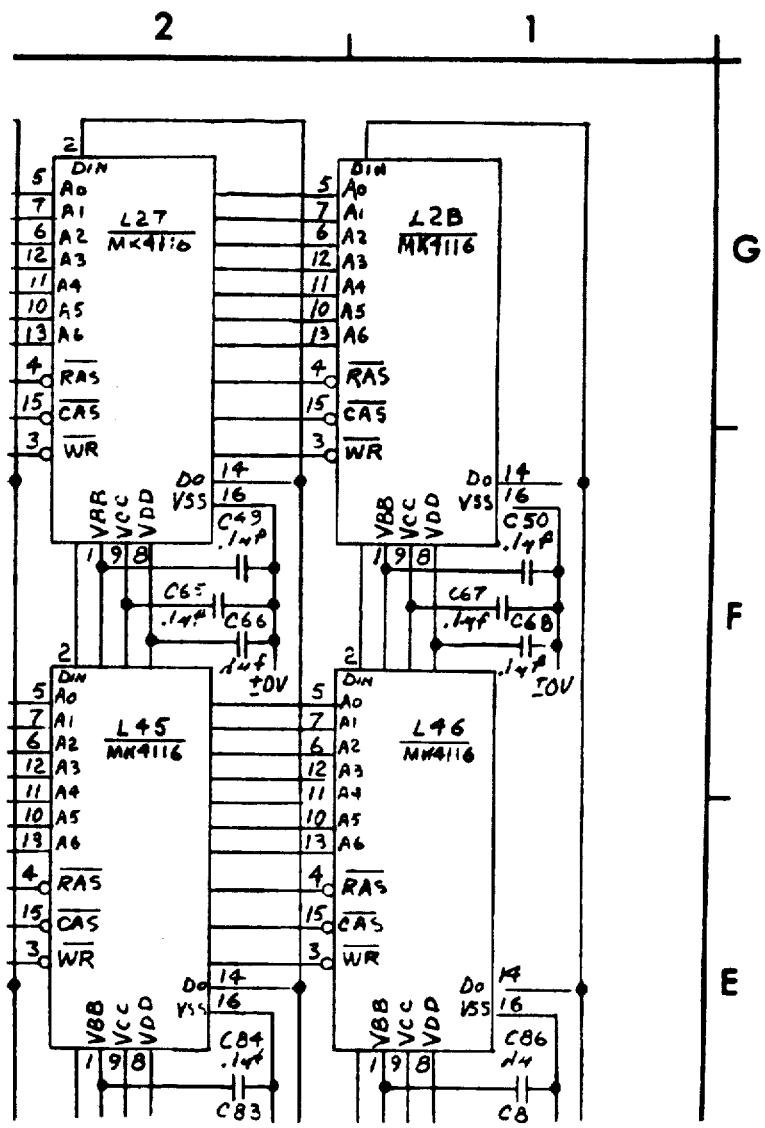
FIG. 7-2C2

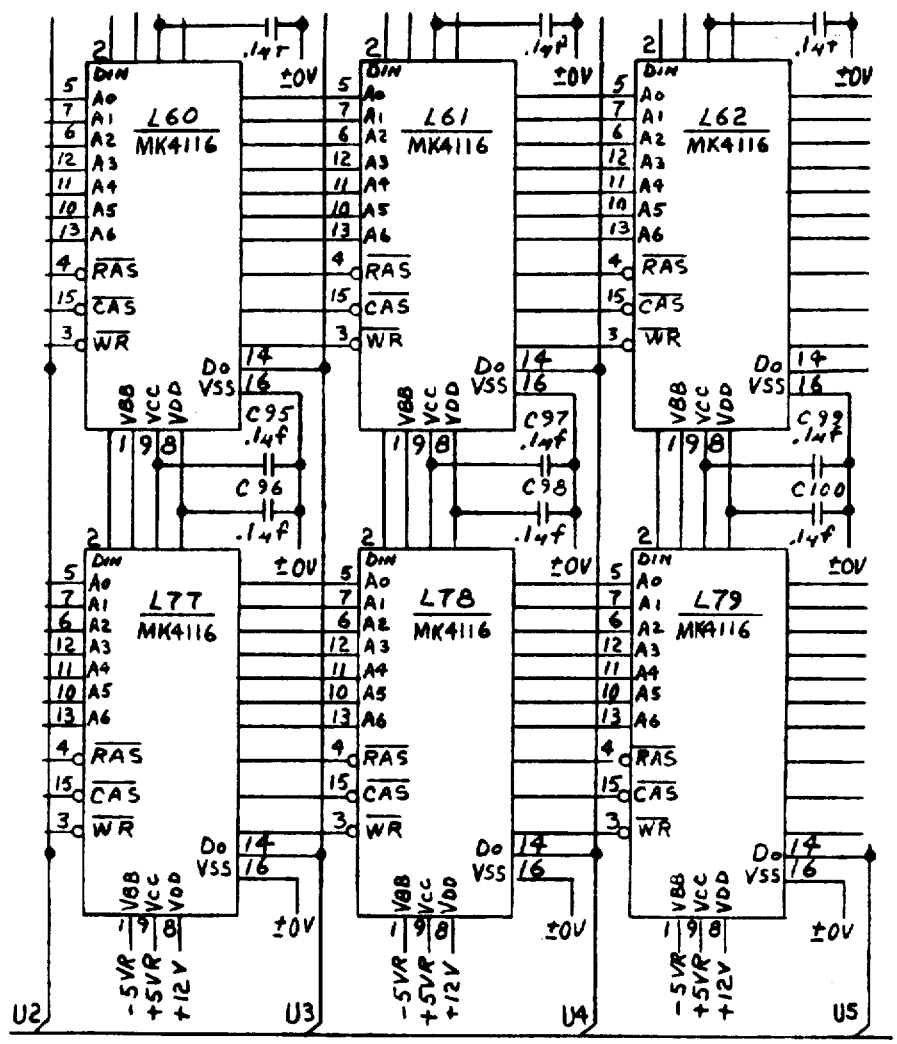
FIG. 7-2C3

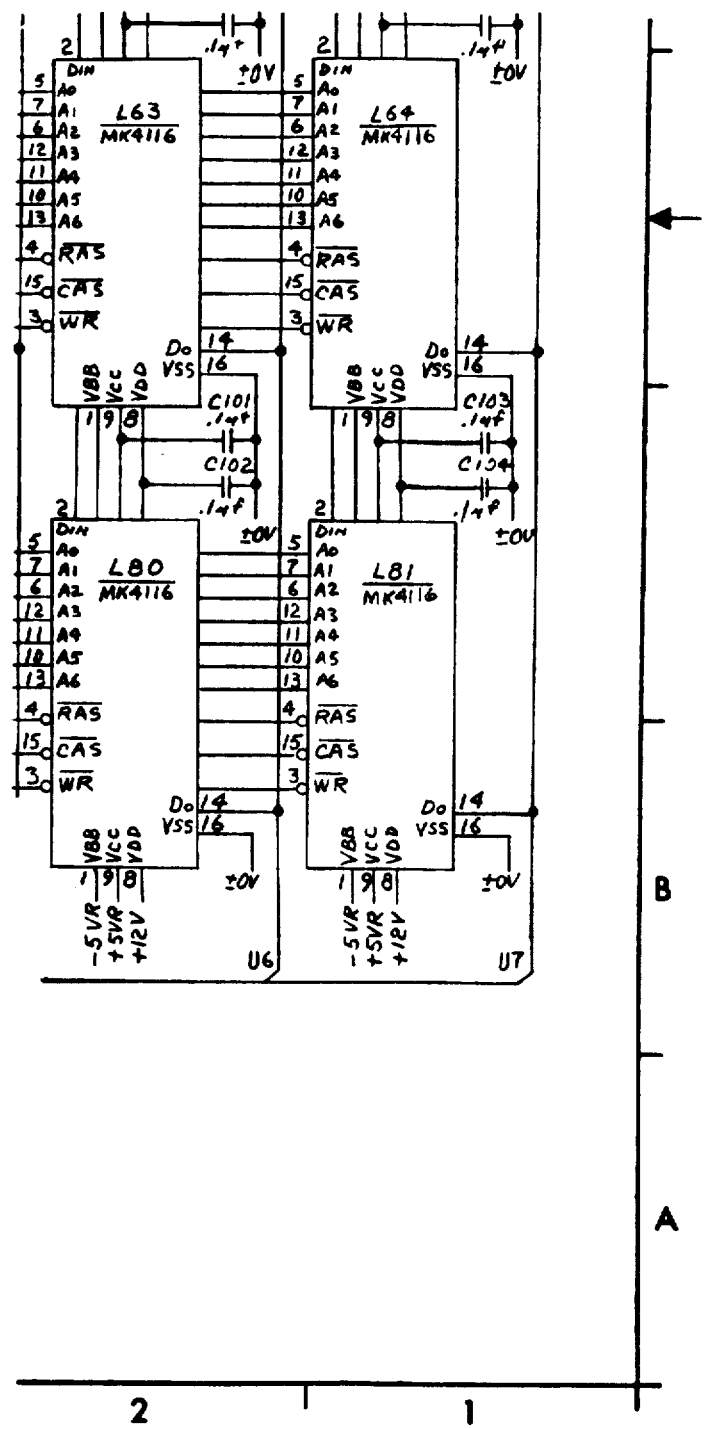
FIG. 7-2C4

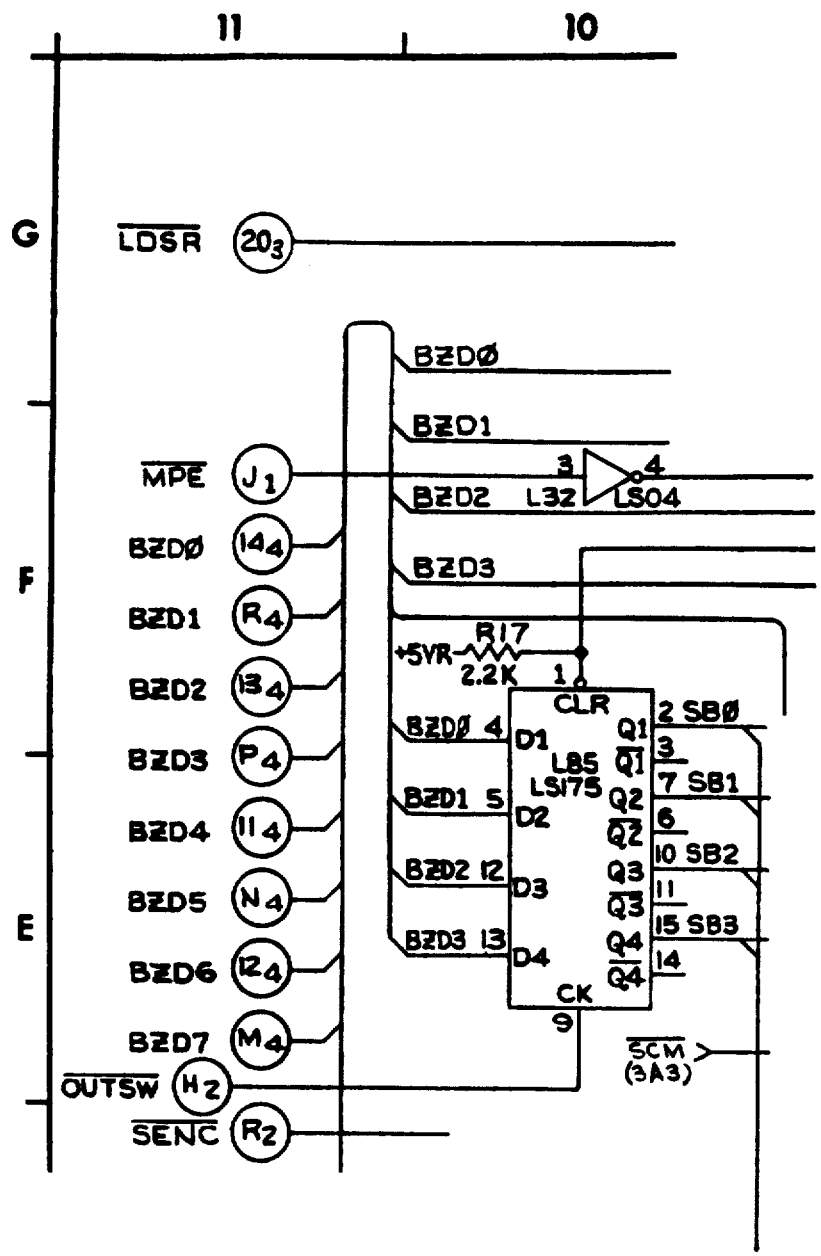
FIG. 8-1A1

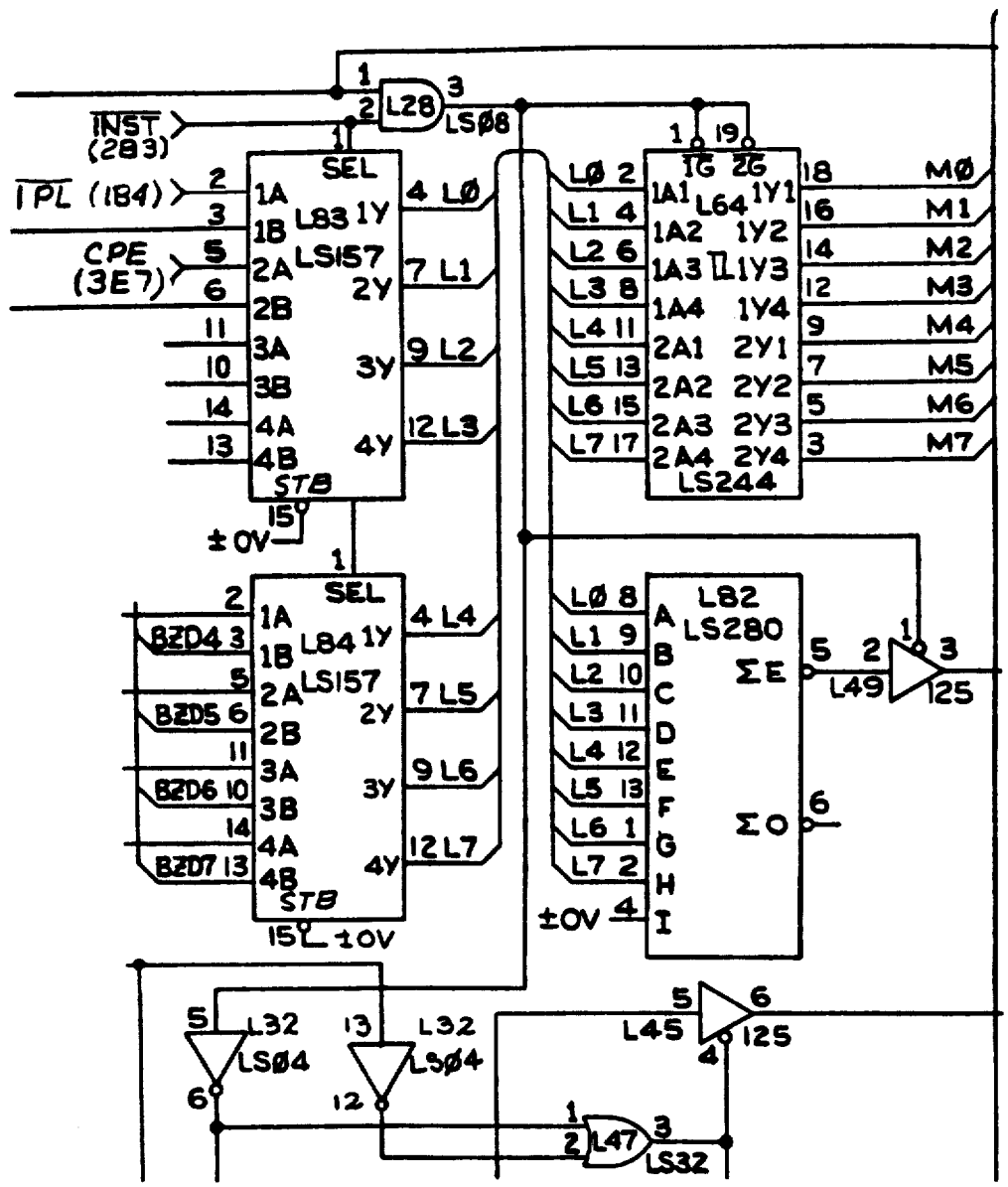
FIG. 8-1A2

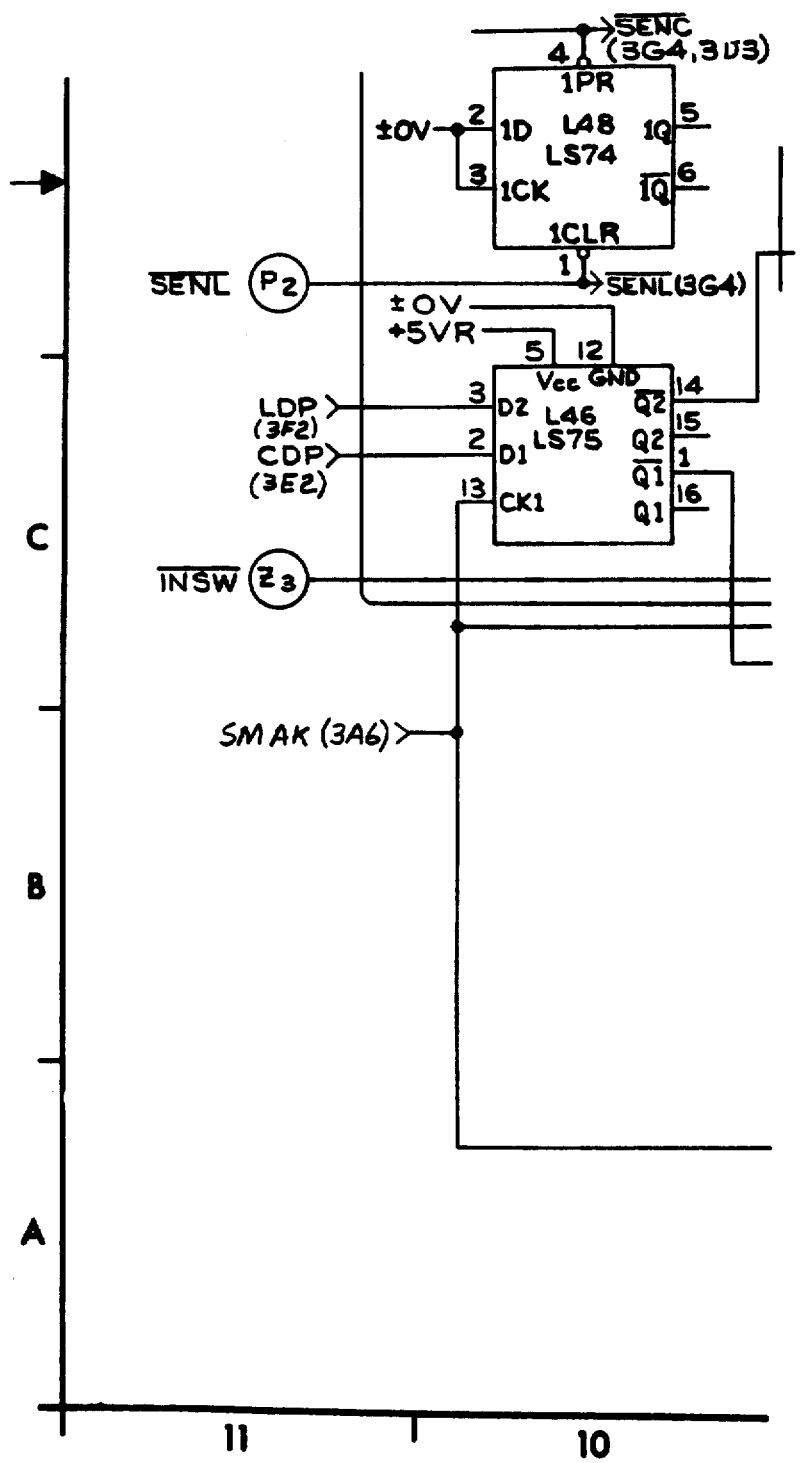
FIG. 8-1A3

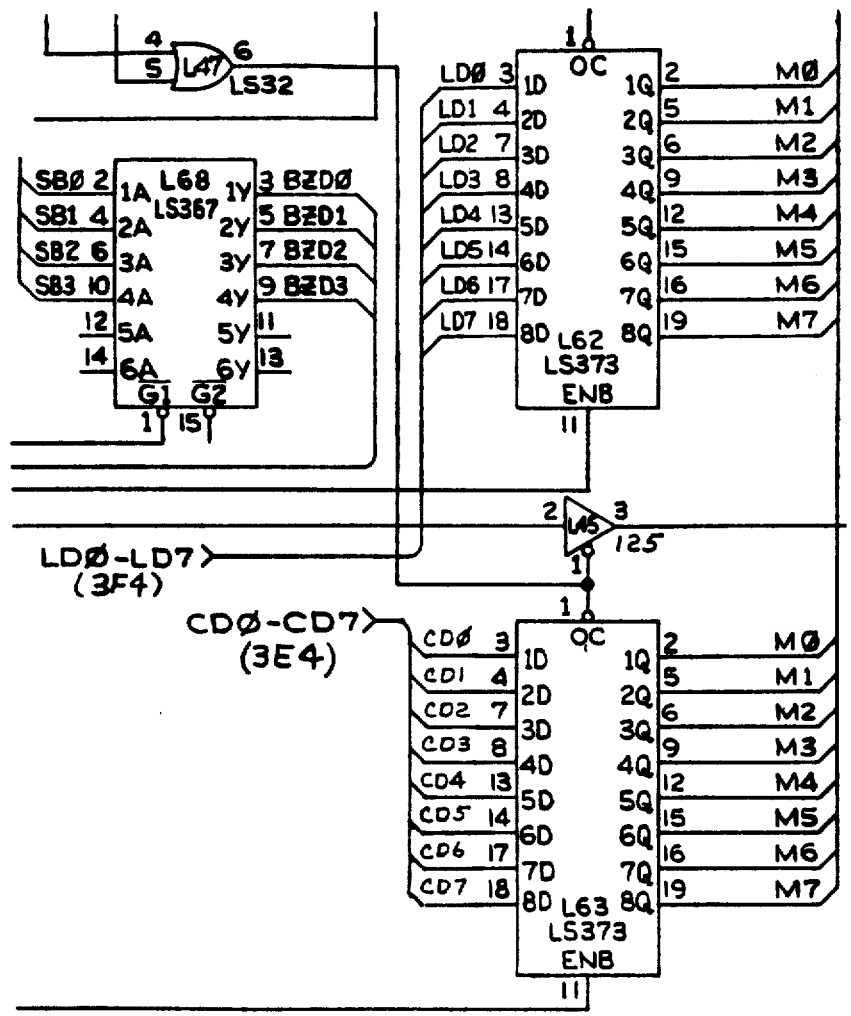
FIG. 8-1A4

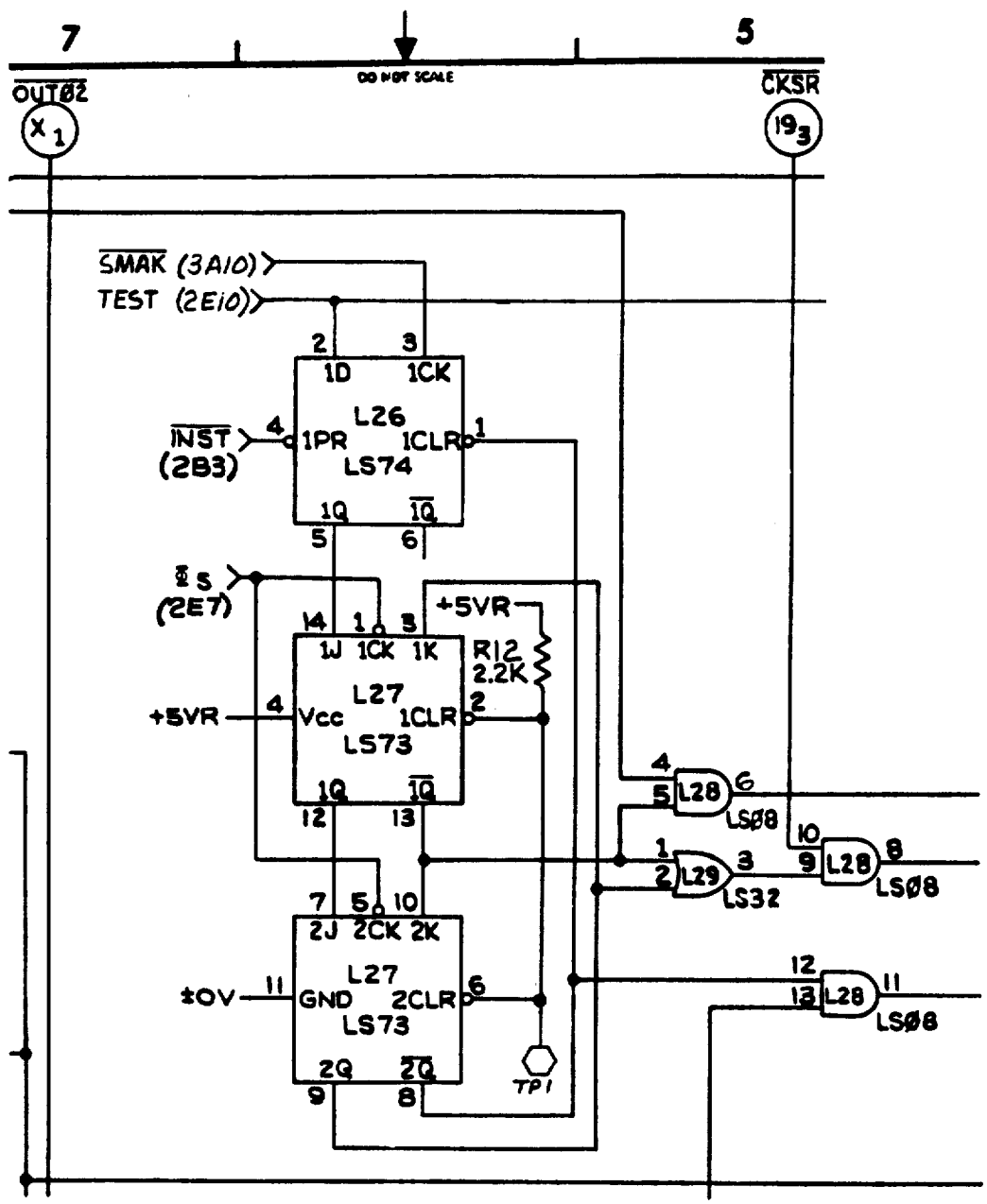
FIG. 8-1B1

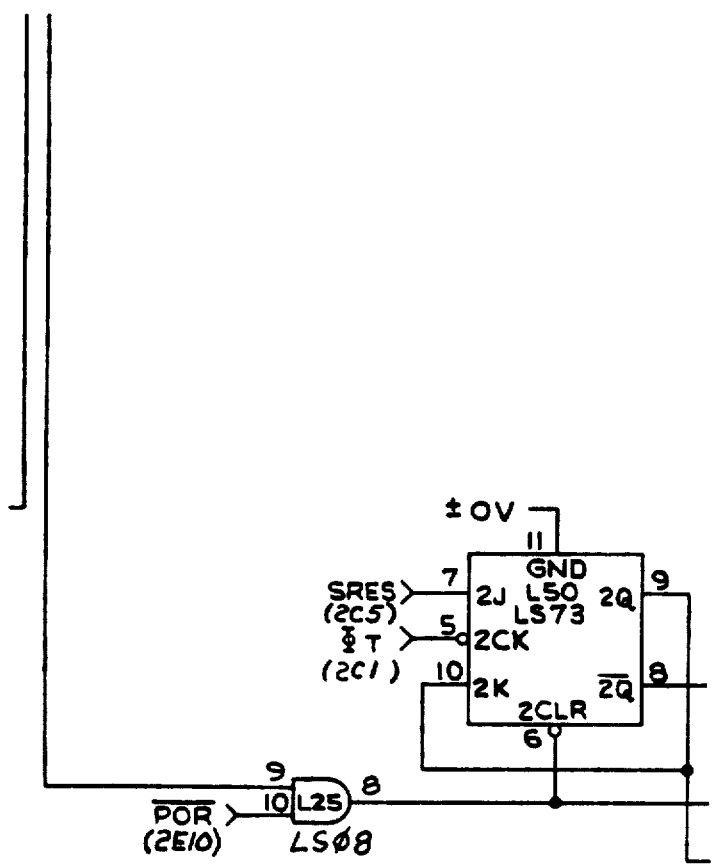
NOTE
L"X" FOLLOWING SIGNAL DENOTES MULTI-USAGE POSITION.
FIG. 8-1B2

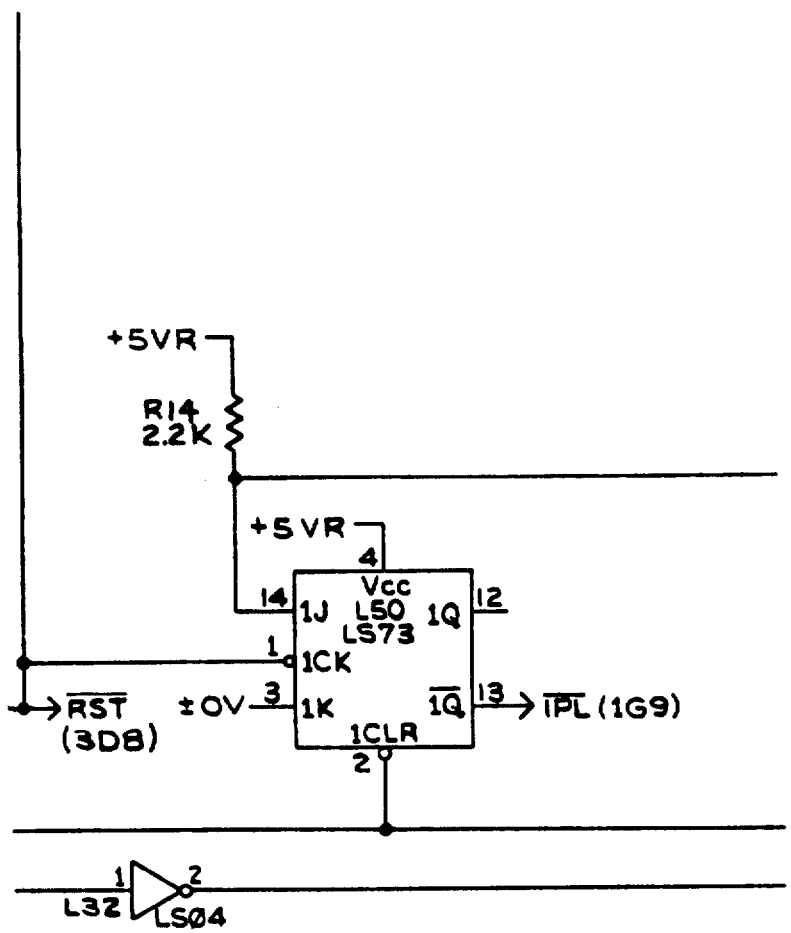
FIG. 8-1B3

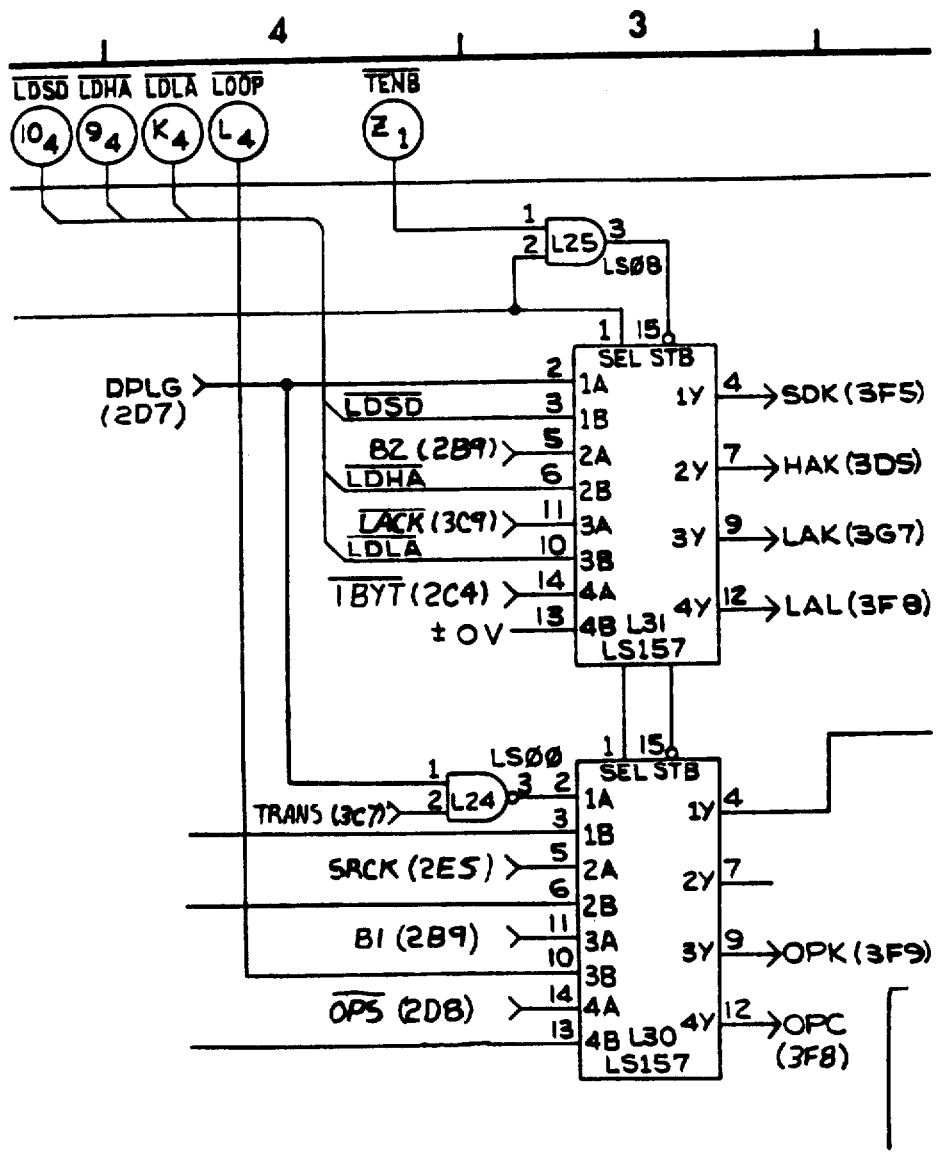
FIG. 8-1C1

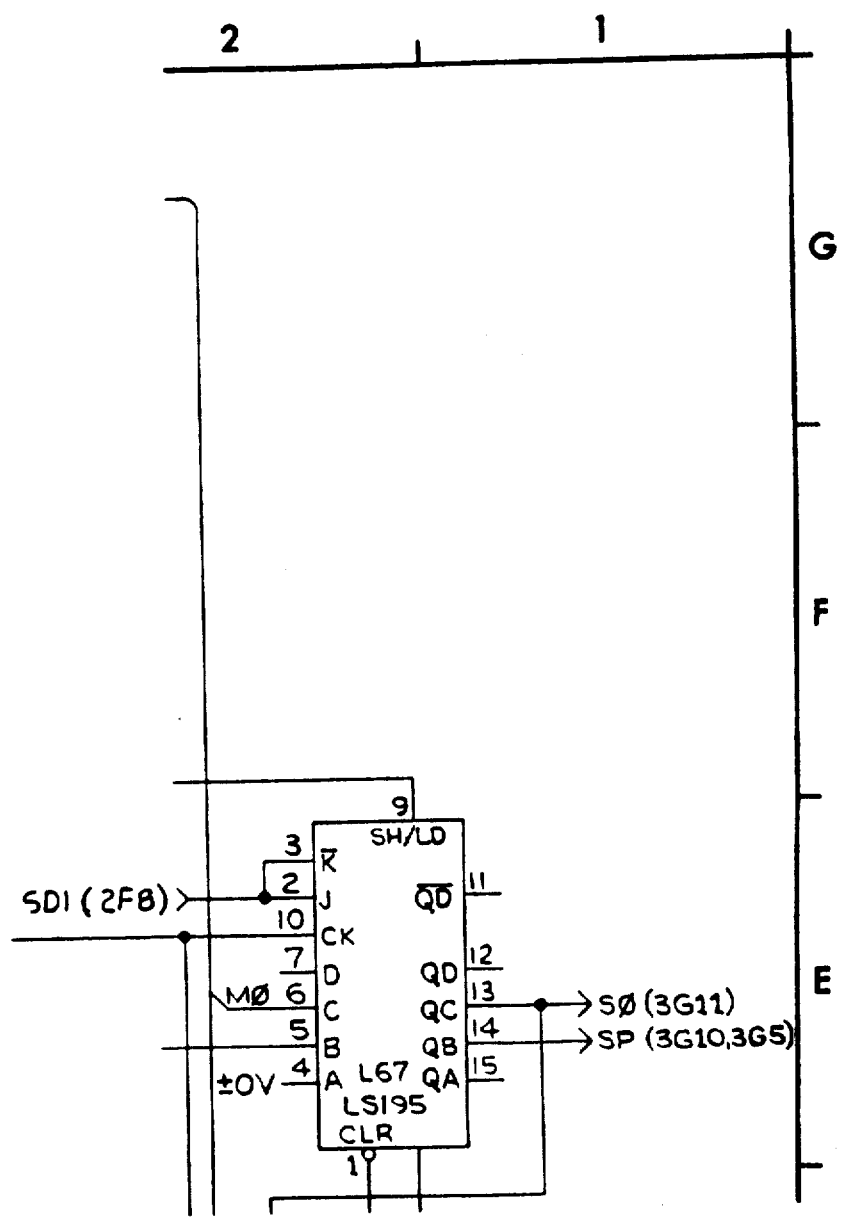
FIG. 8-1C2

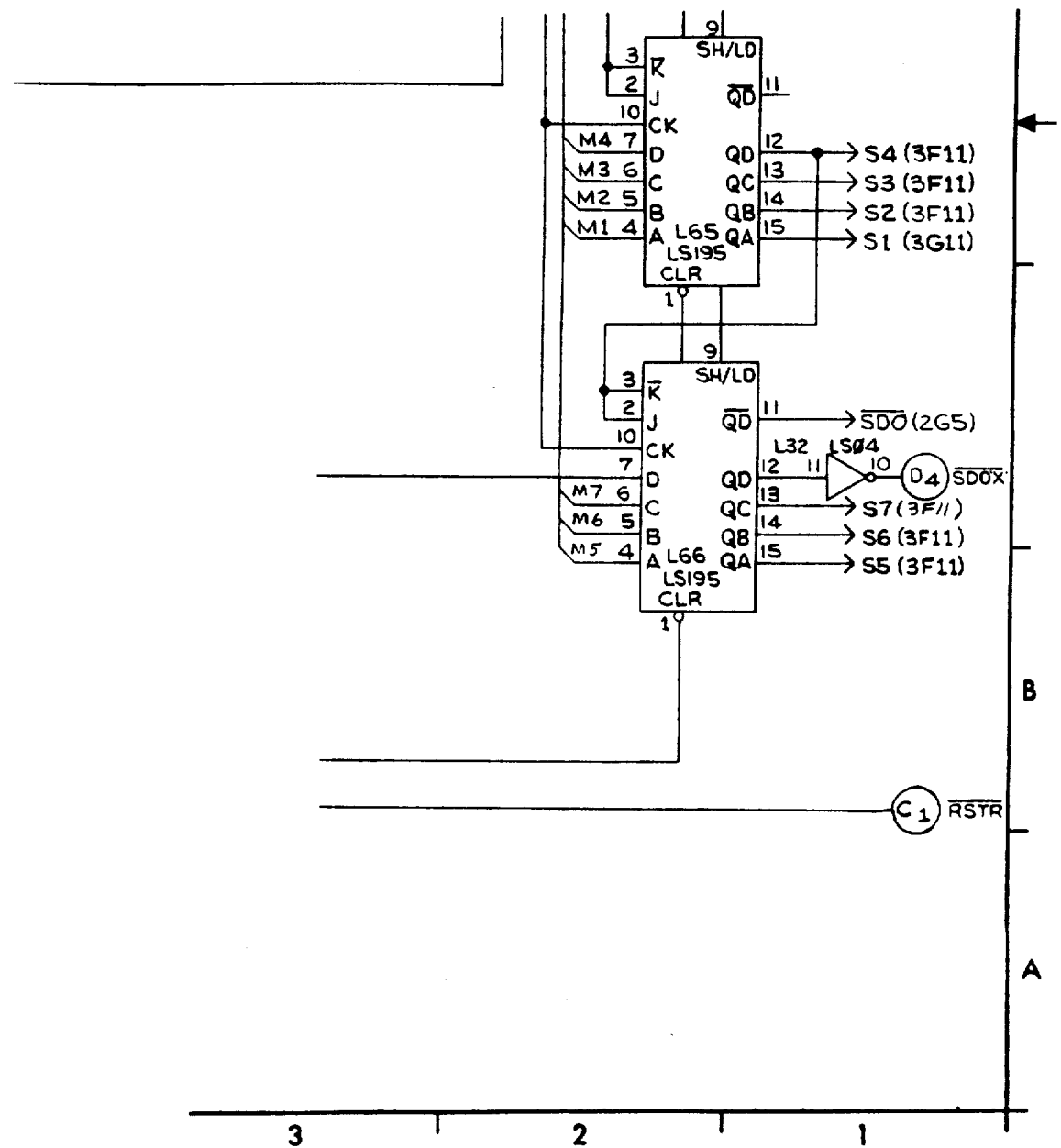
FIG. 8-1C3

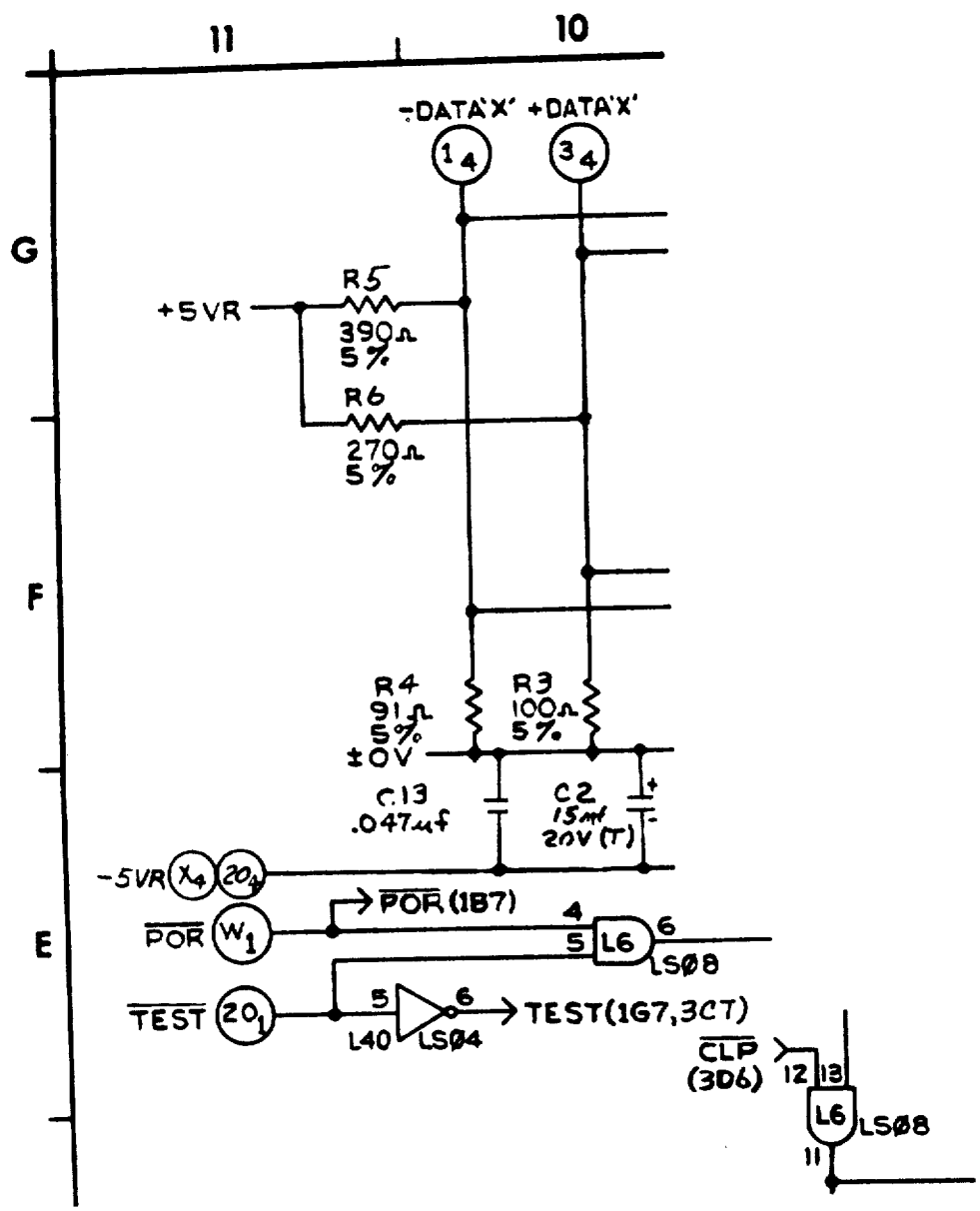
FIG. 8-2A1

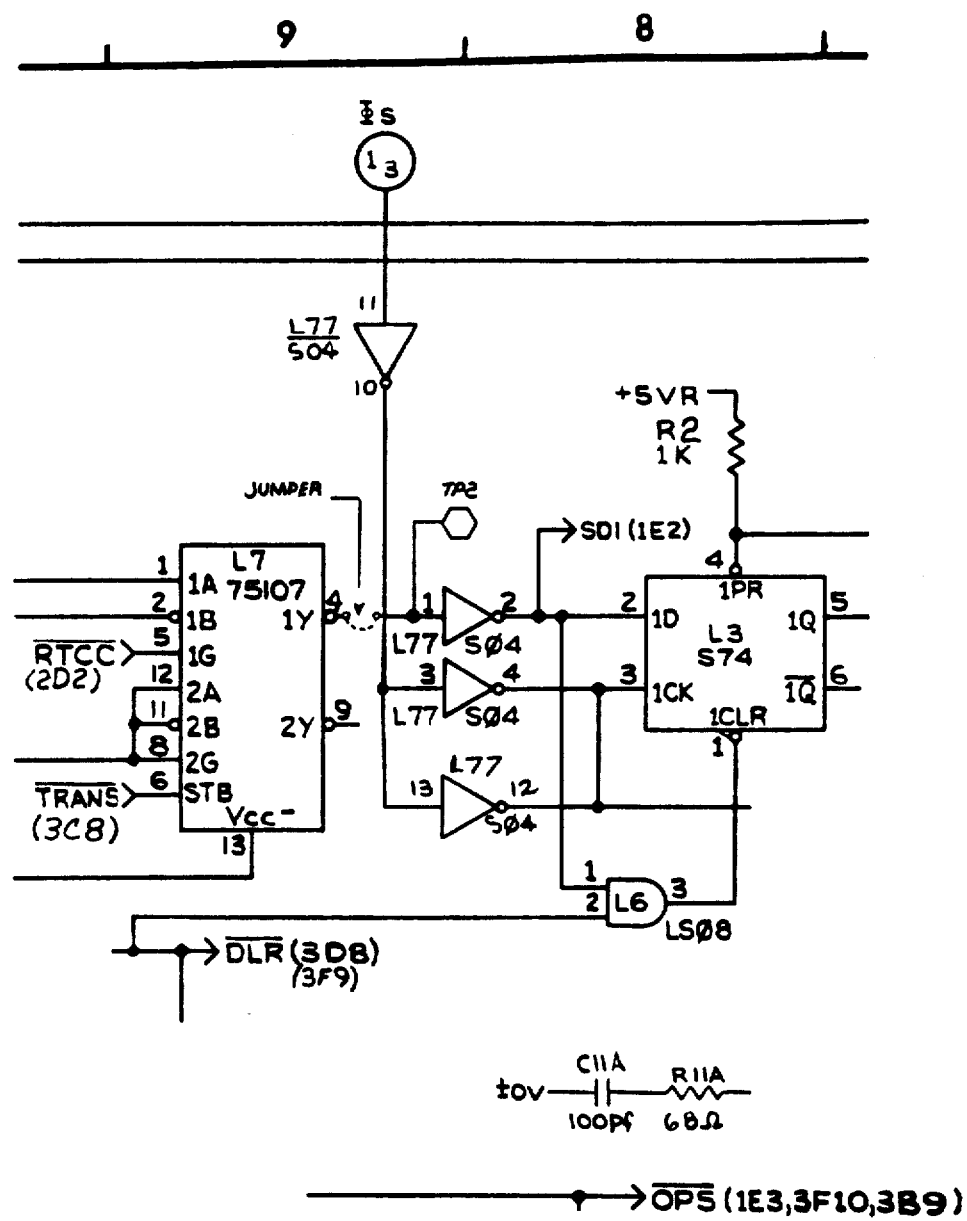
FIG. 8-2A2

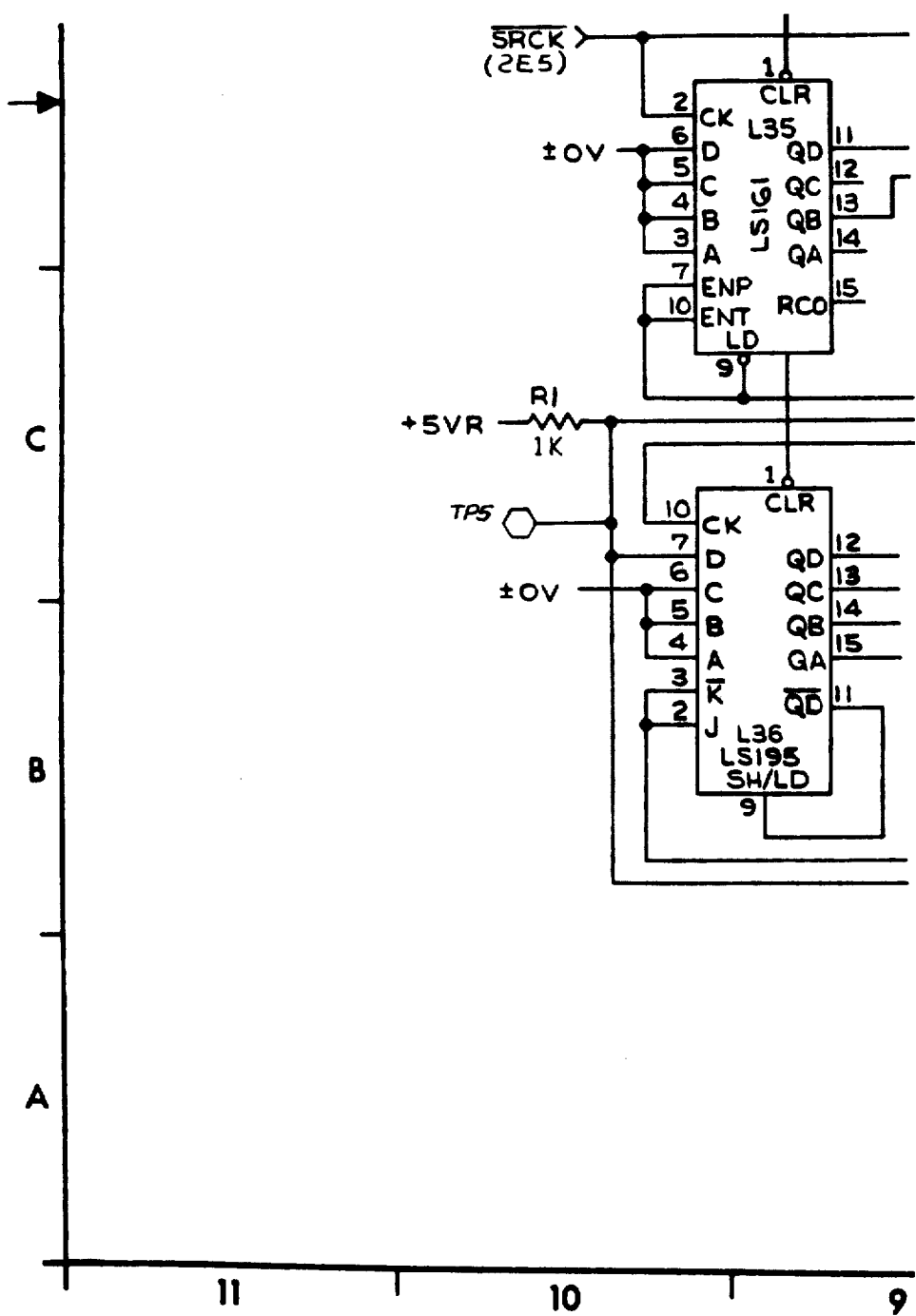
FIG. 8-2A3

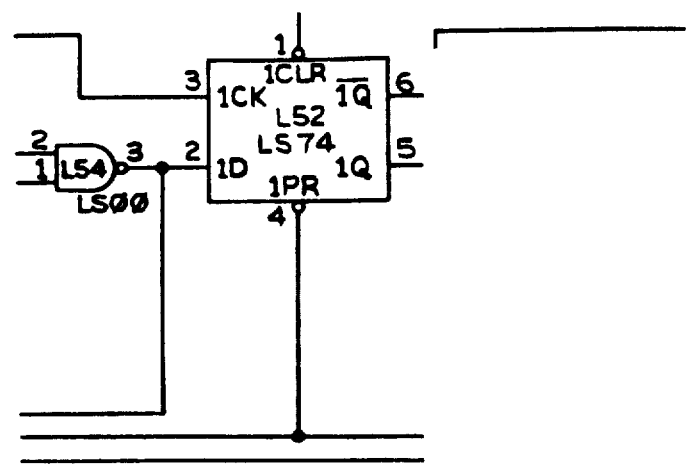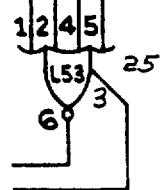
FIG. 8-2A4

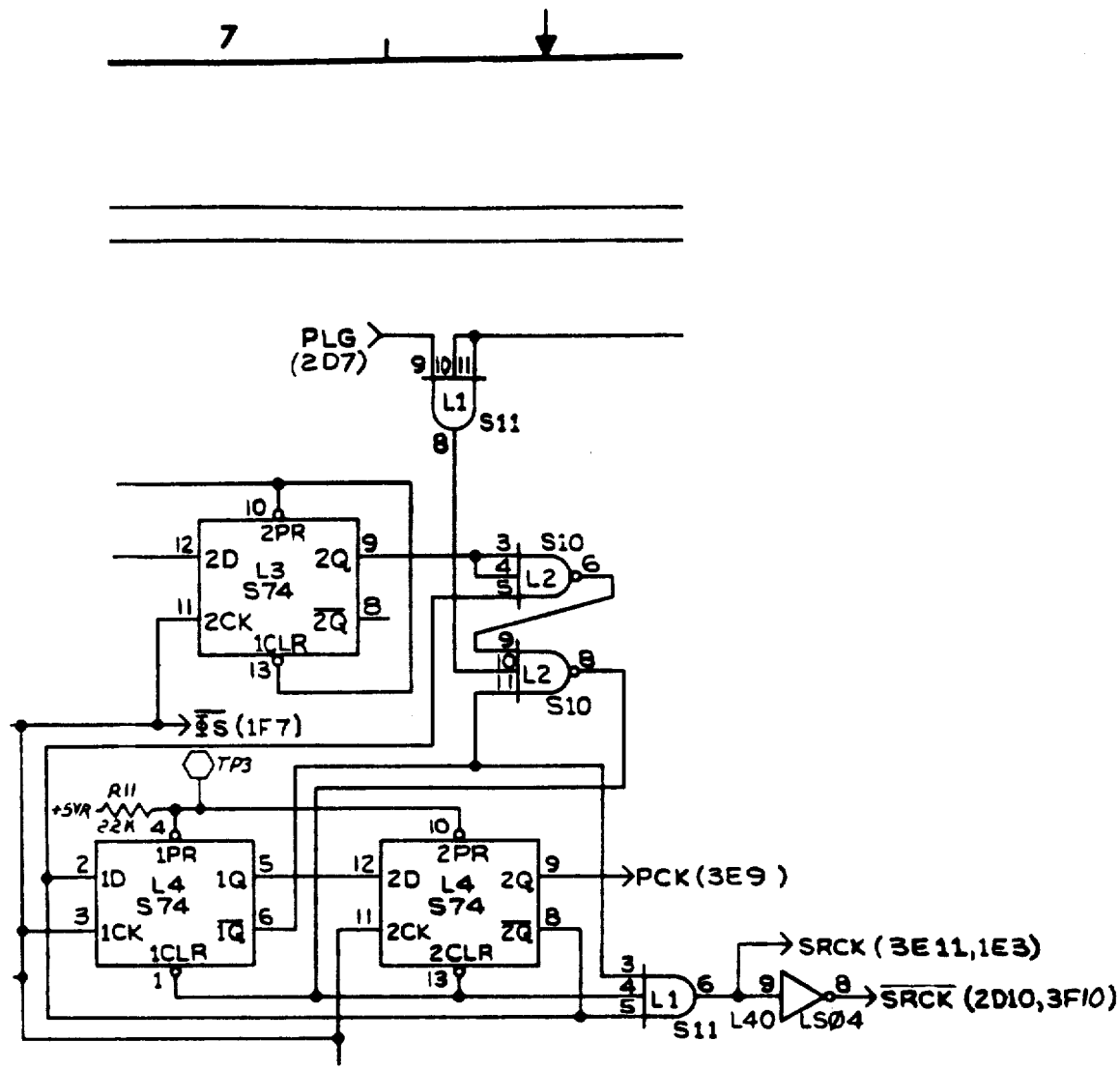
FIG. 8-2B1

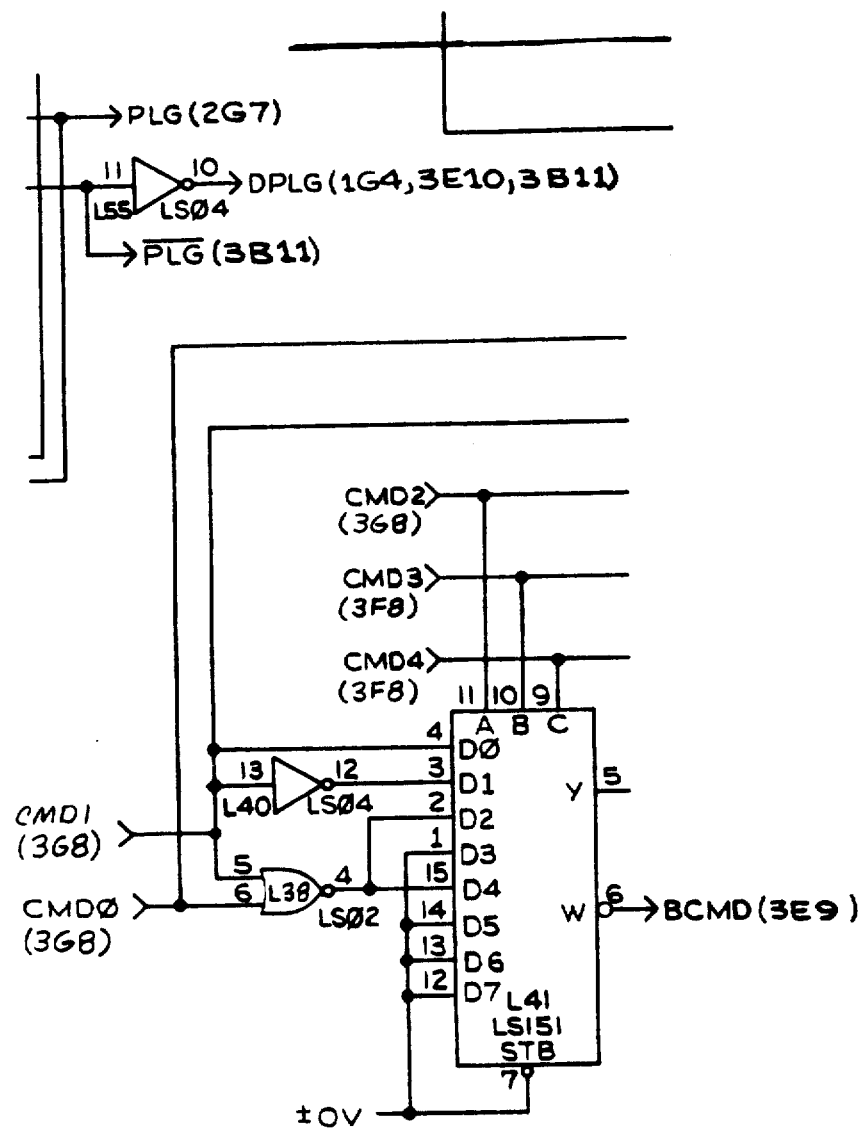
FIG. 8-2B2

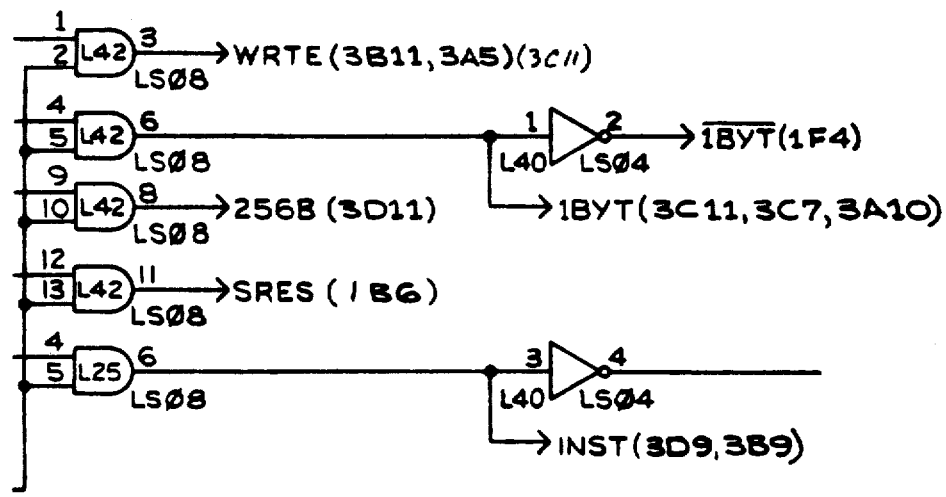
FIG. 8-2B3

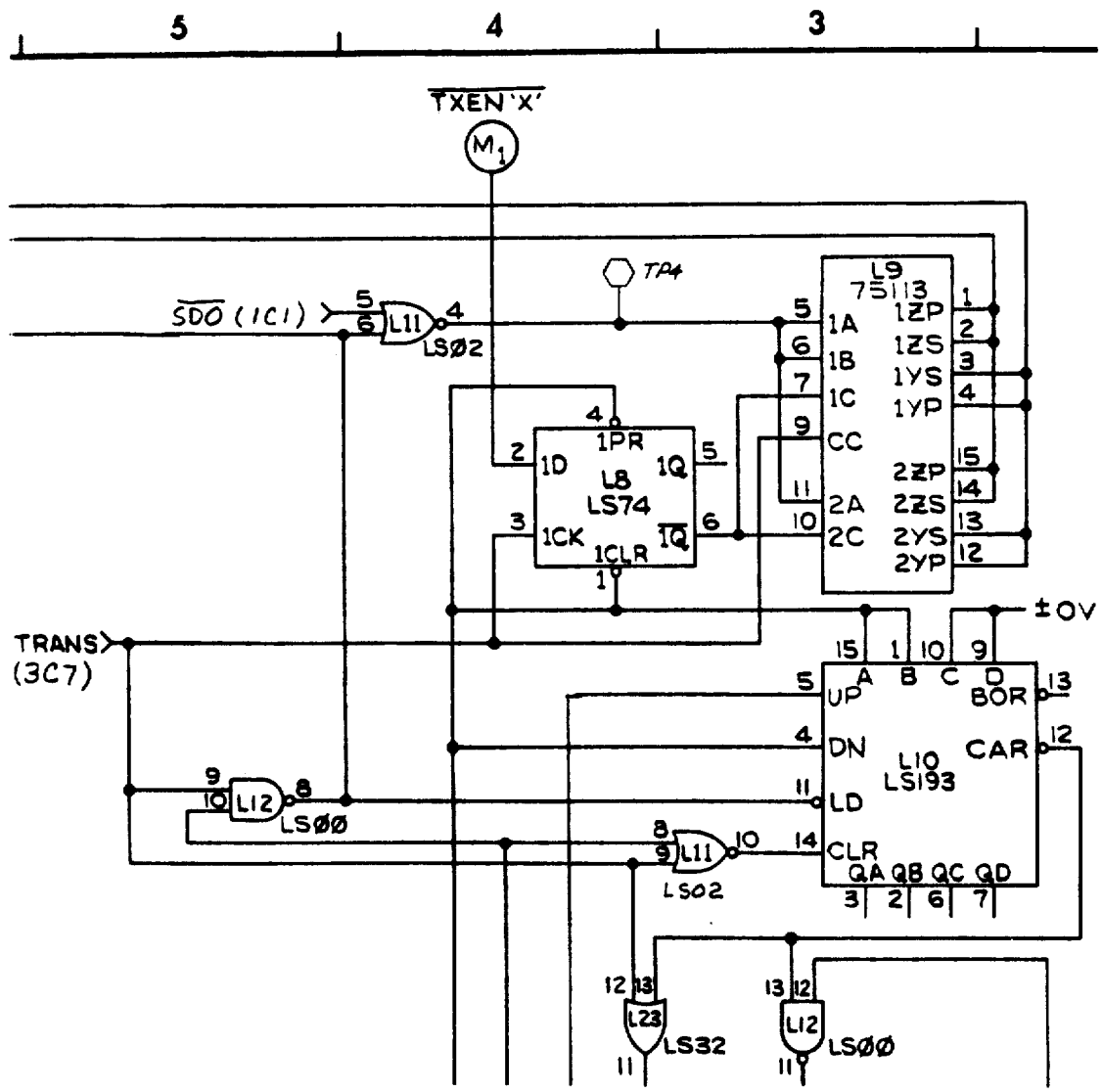
FIG. 8-2C1

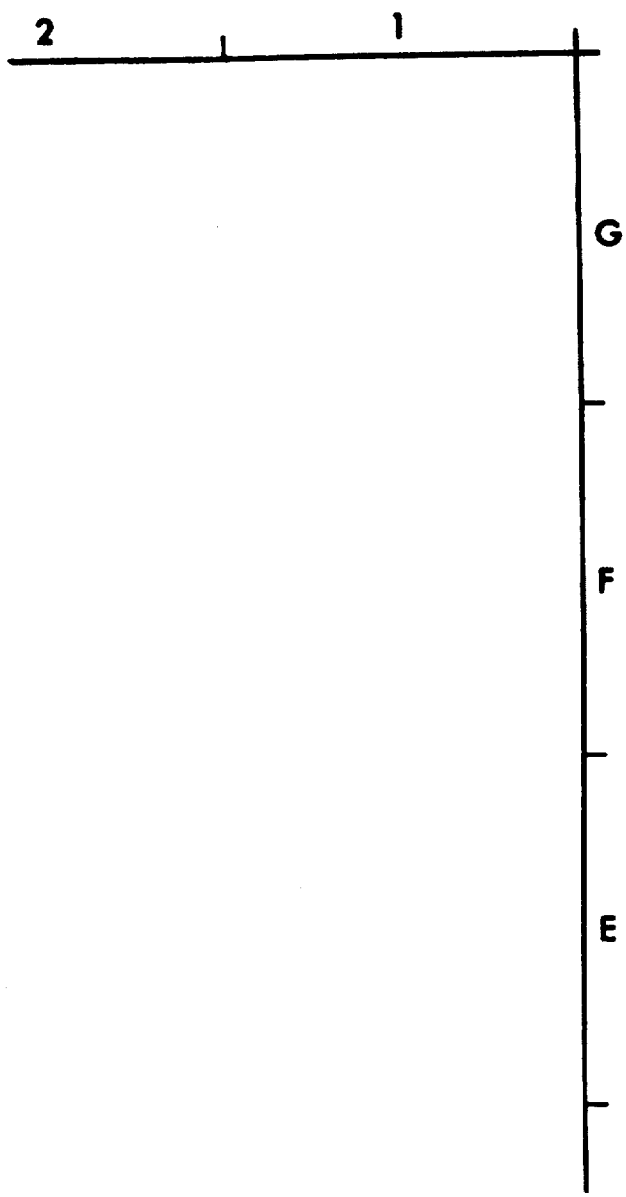
FIG. 8-2C2

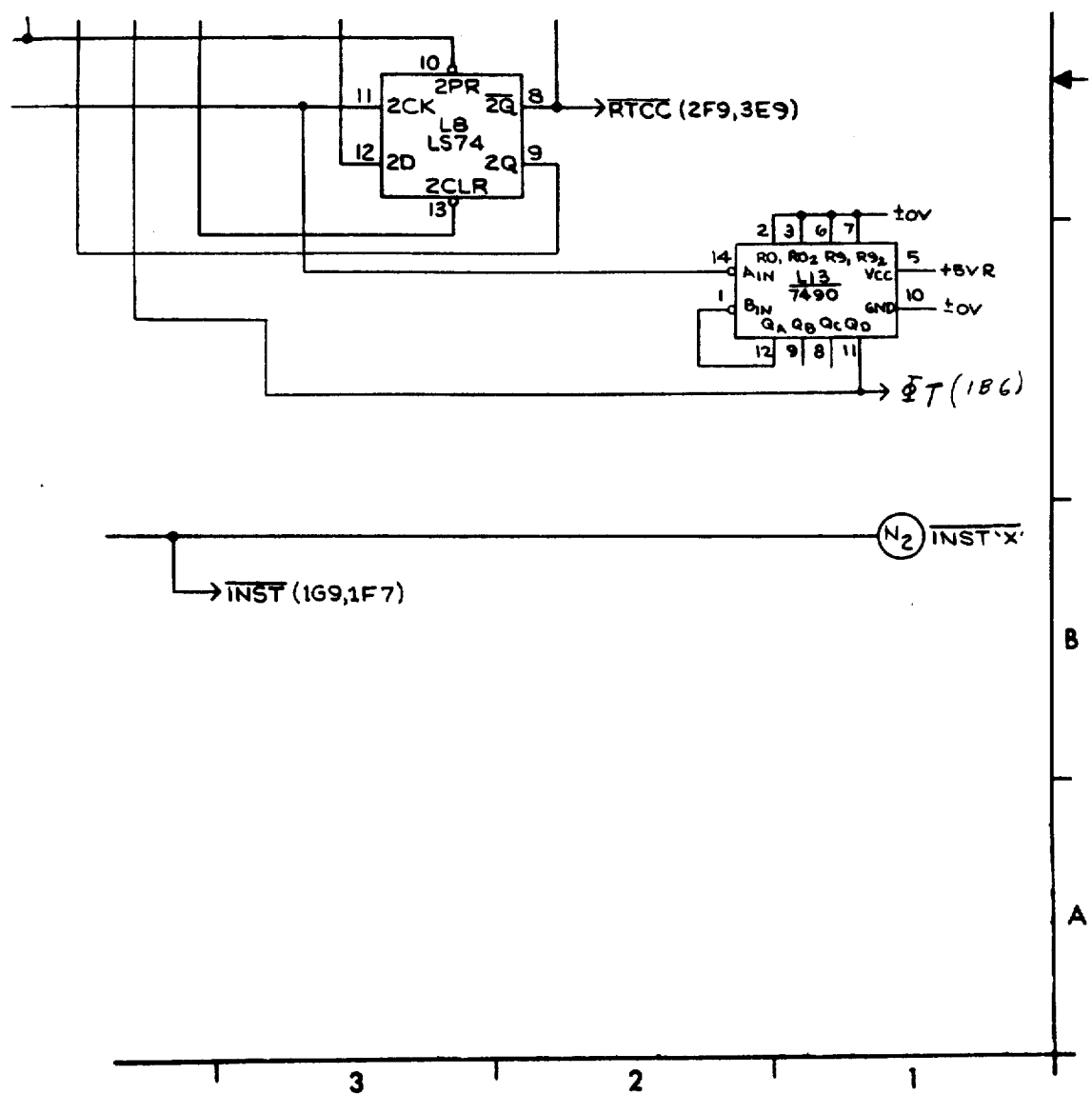
FIG. 8-2C3

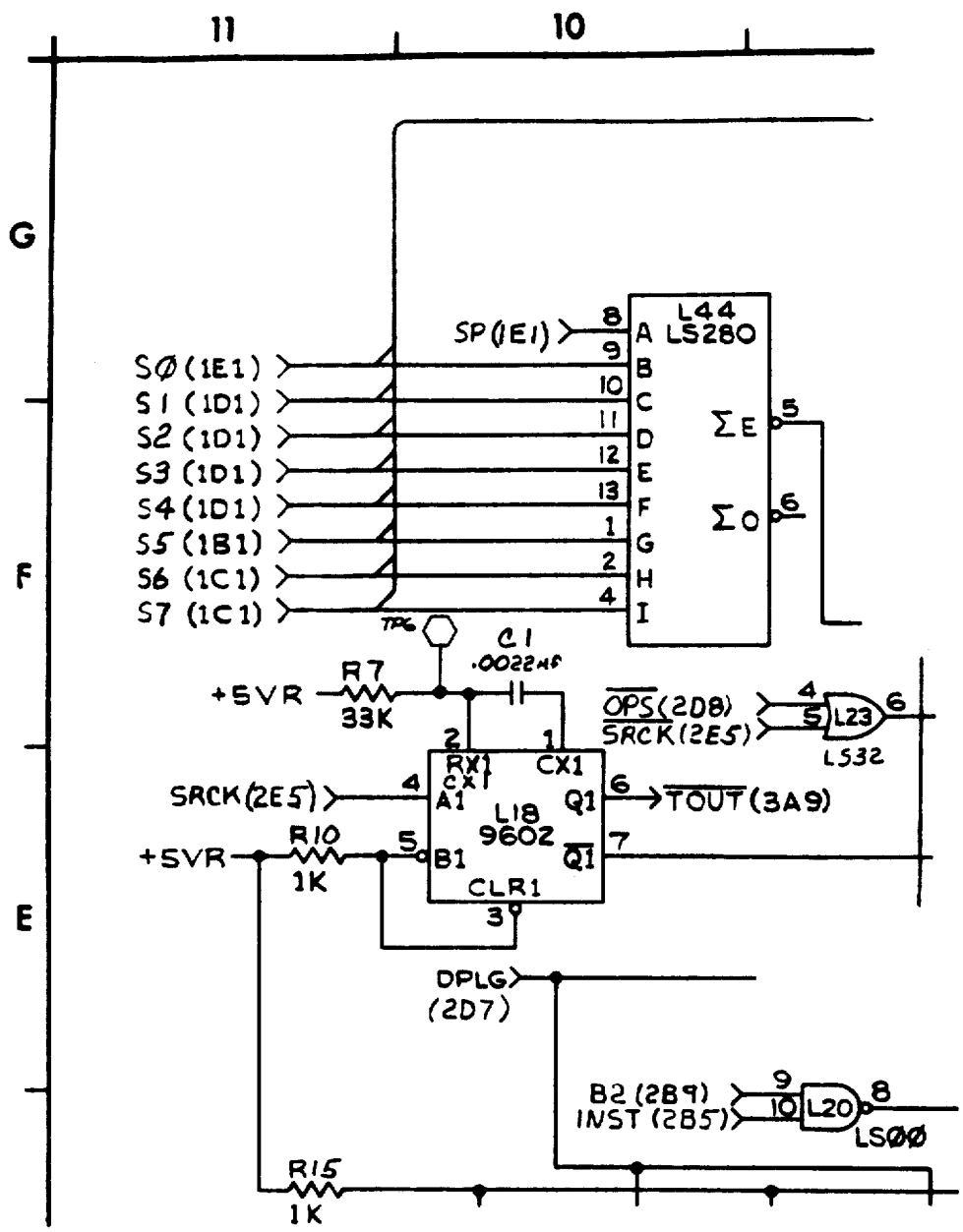
FIG. 8-3A1

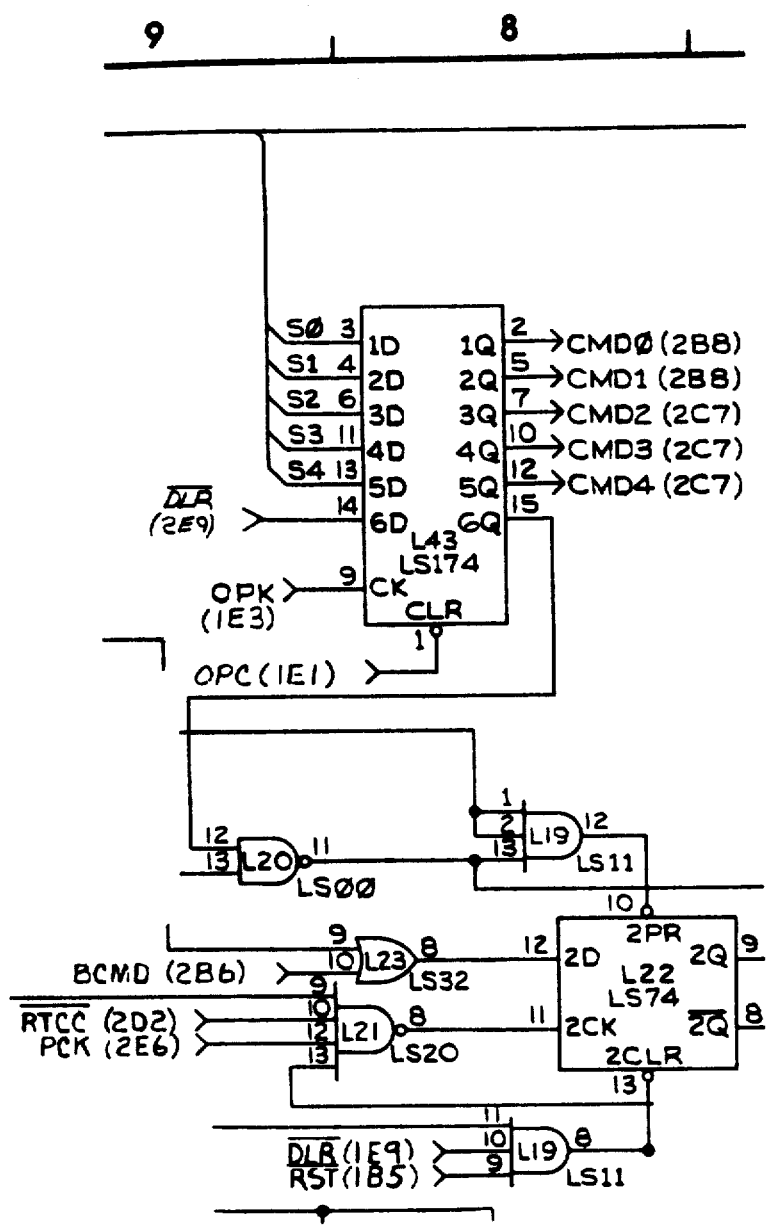
FIG. 8-3A2

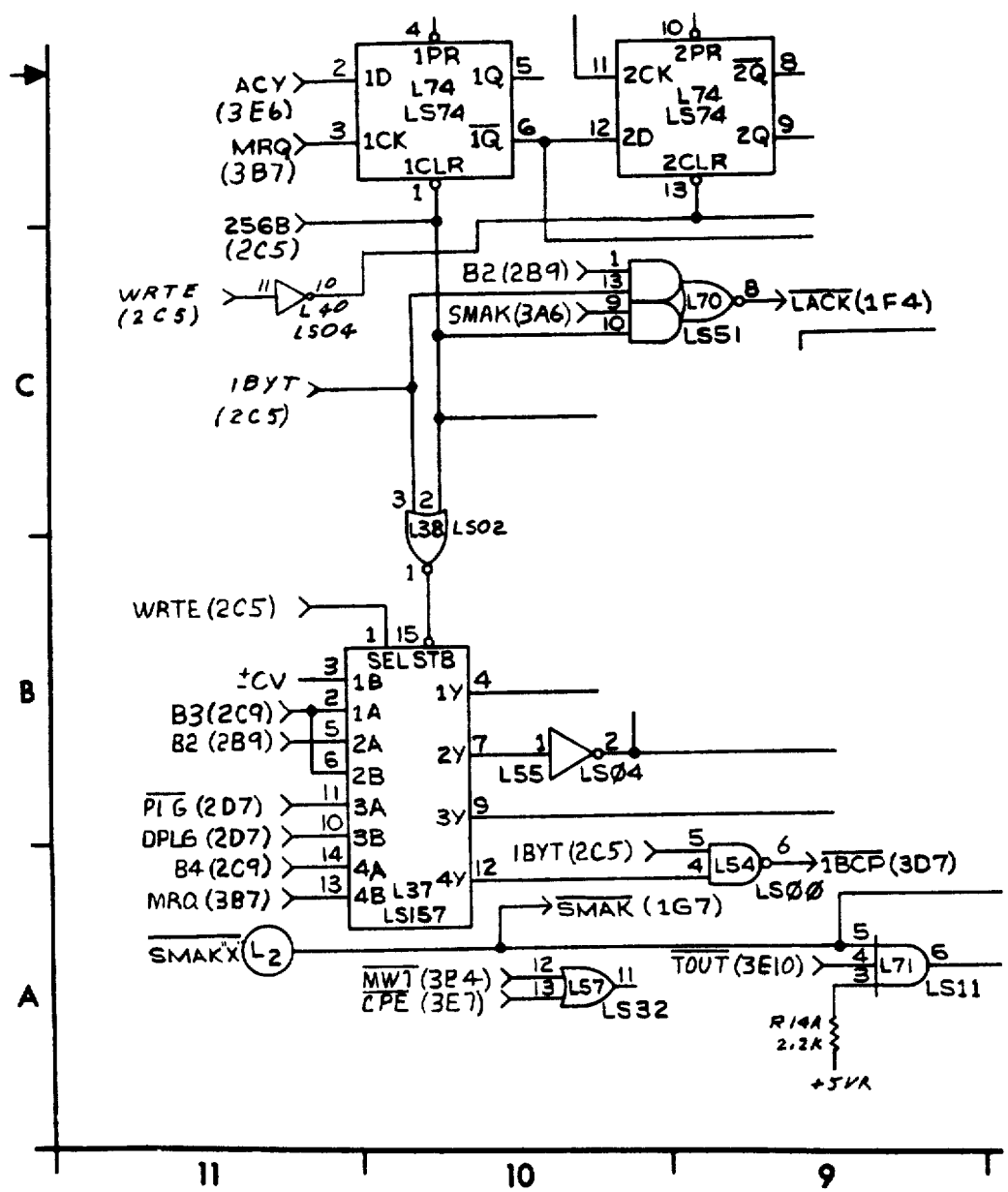
FIG. 8-3A3

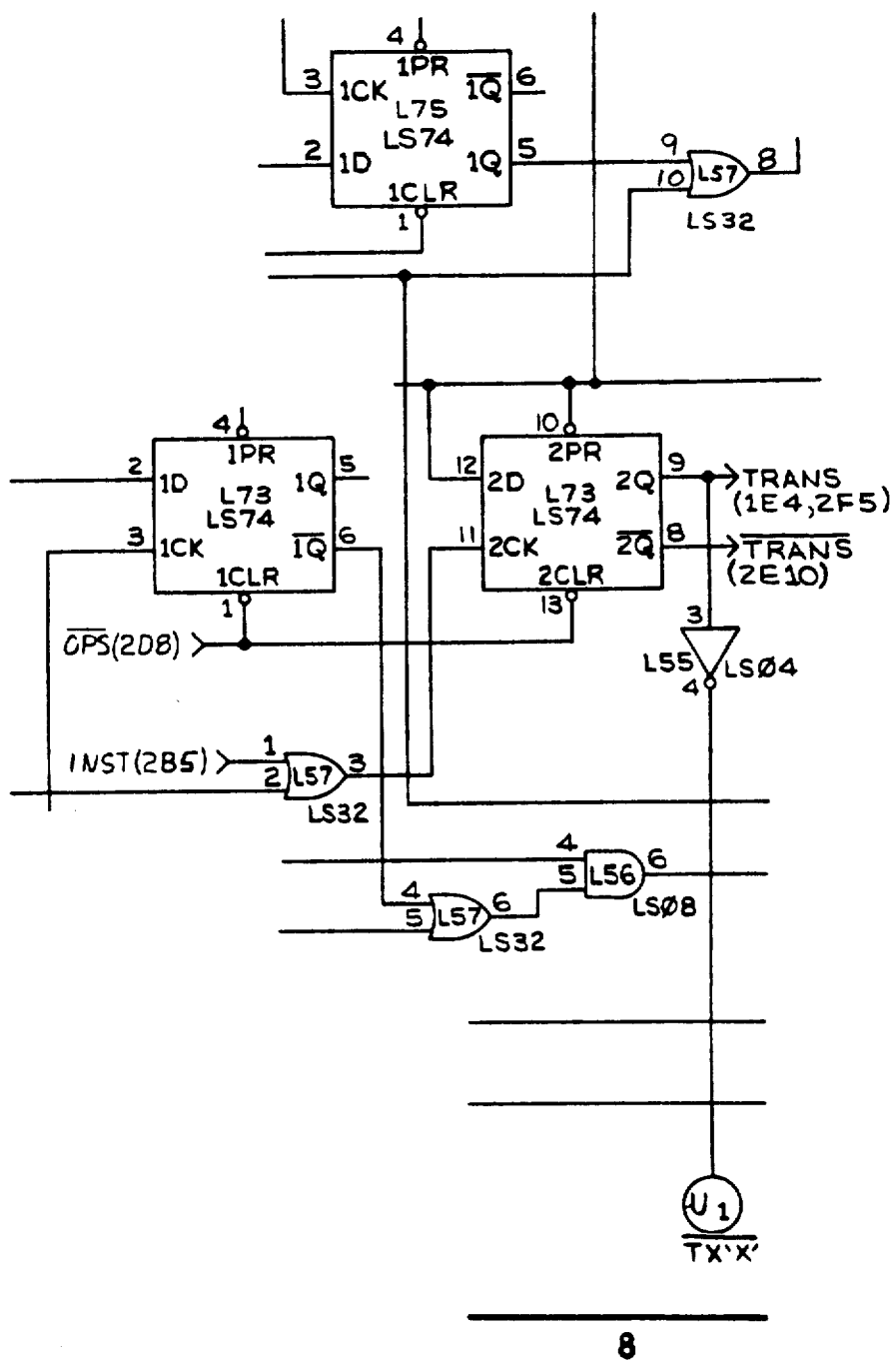
FIG. 8-3A4

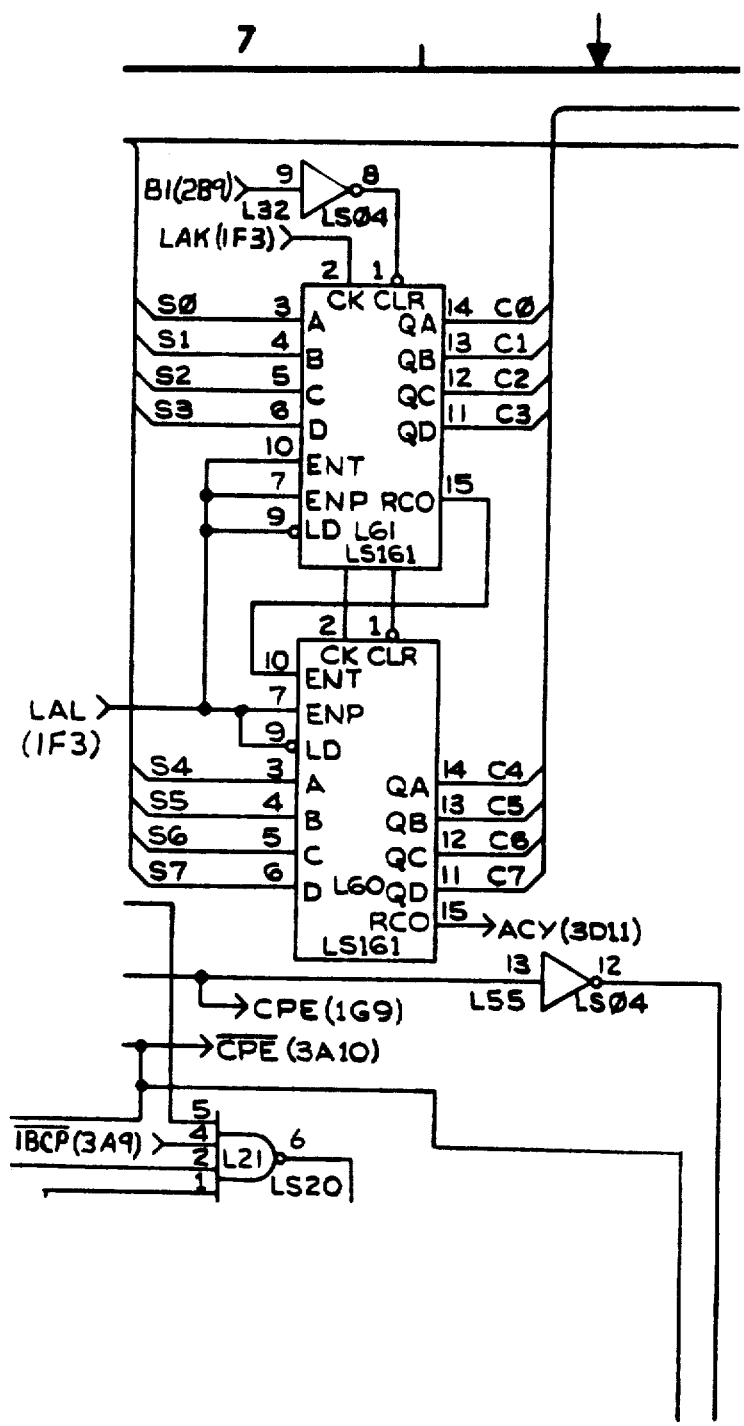
FIG. 8-3B1

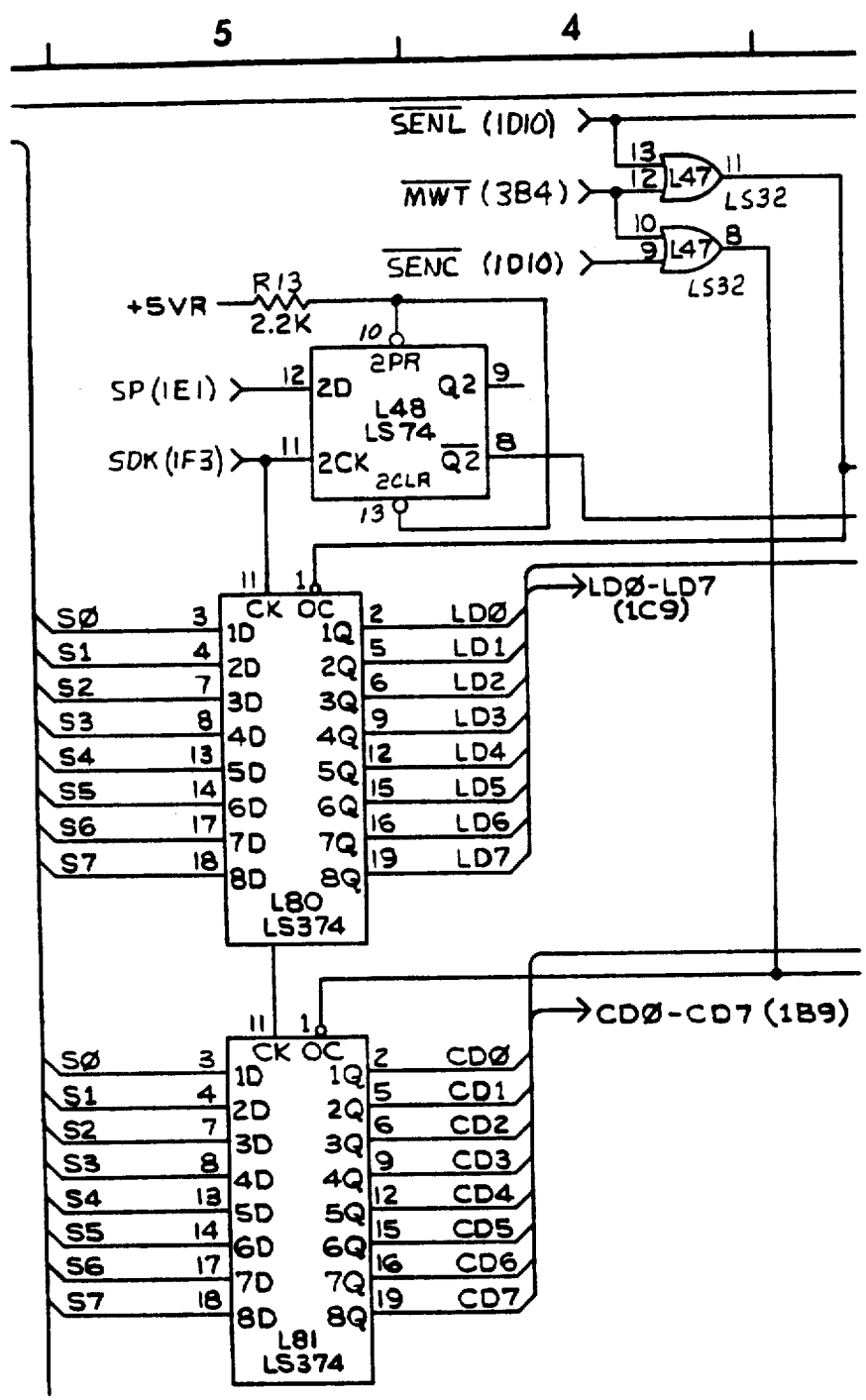
FIG. 8-3B2

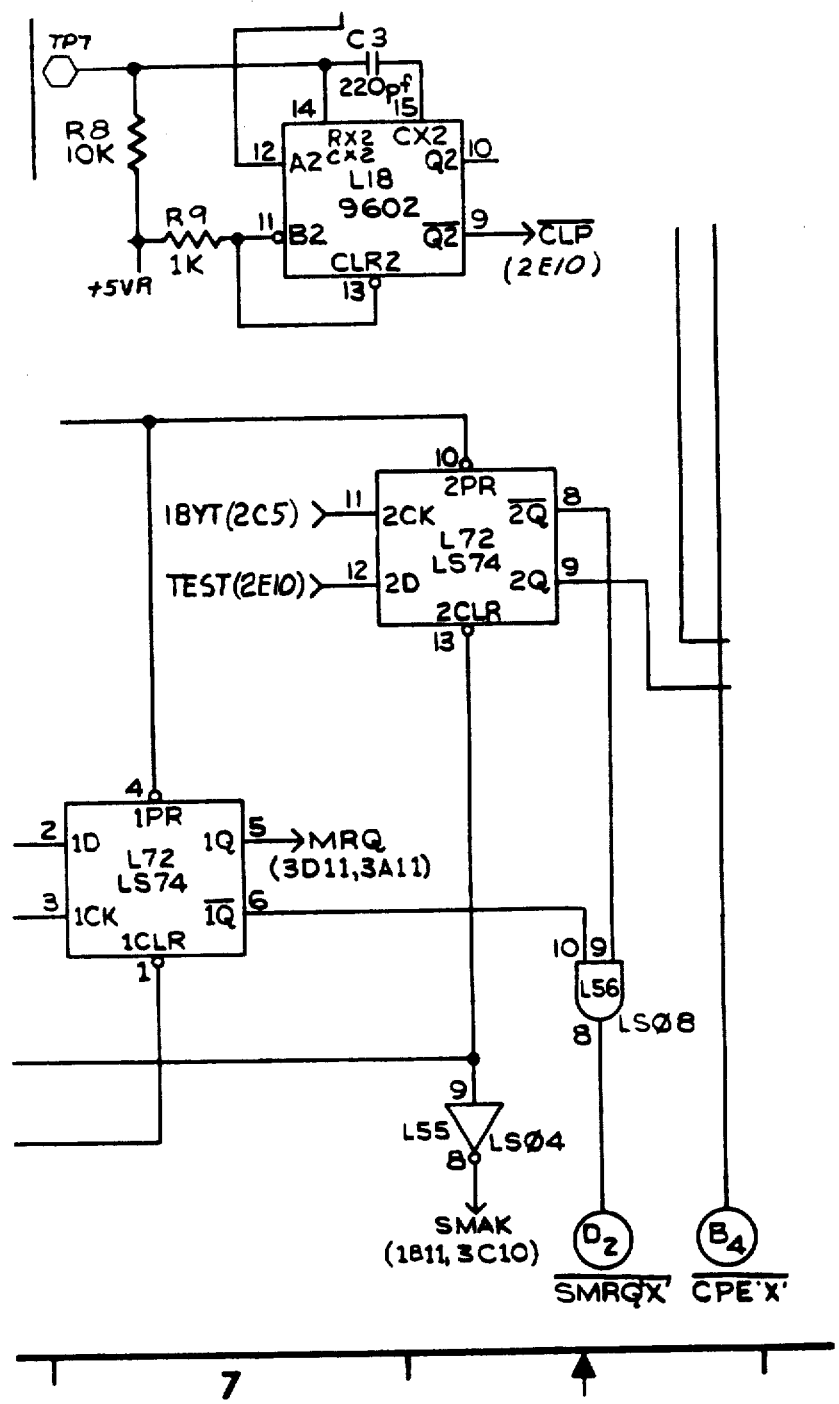
FIG. 8-3B3

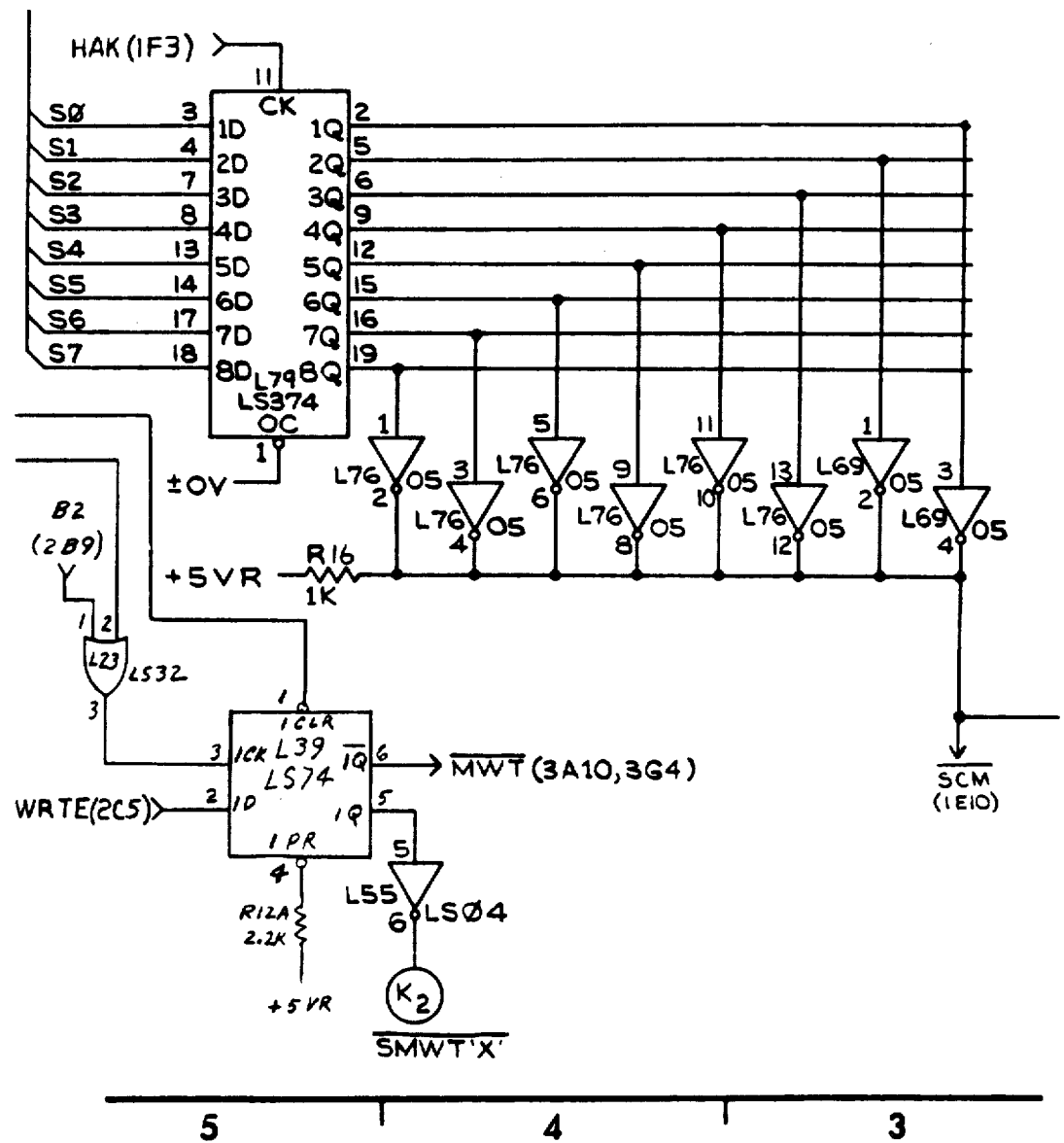
FIG. 8-3B4

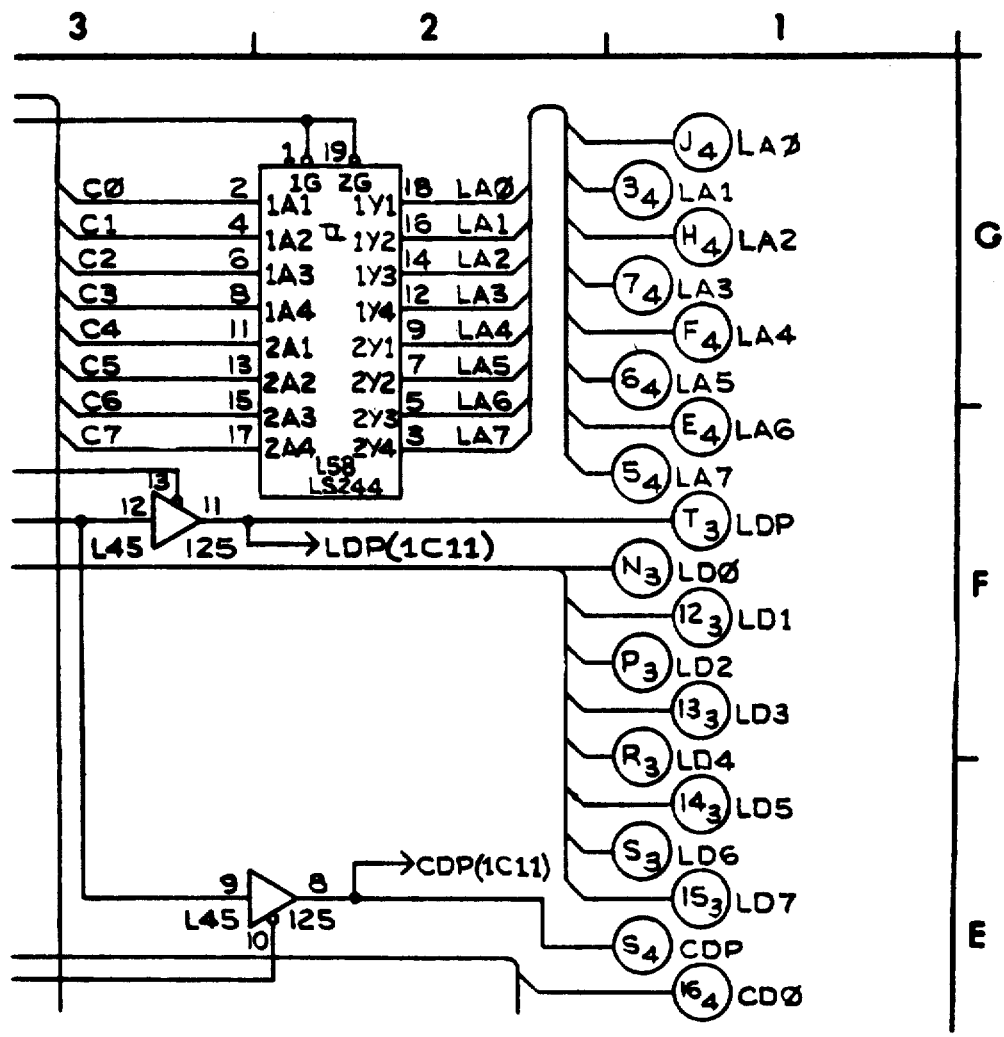
FIG. 8-3C1

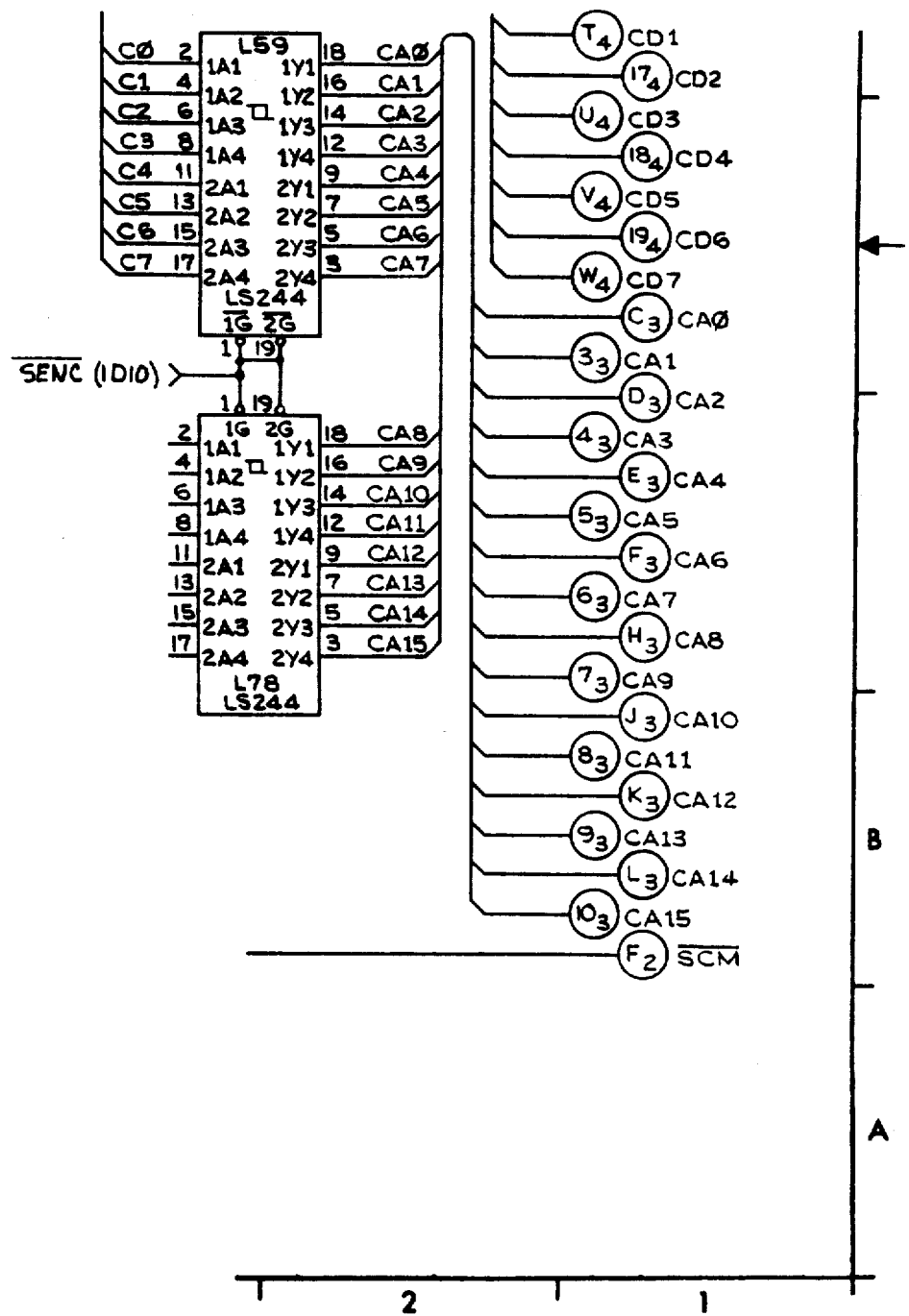
FIG. 8-3C2

{ }
DATA TRANSMITTING LINK

CROSS-REFERENCE TO RELATED APPLICATION

This is a continuation-in-part of Application Ser. No. 205,164, filed Nov. 10, 1980, now abandoned.

BACKGROUND OF THE INVENTION

This invention relates to information processing and more particularly to forwarding data from one station of a data processing network to another.

SUMMARY OF THE INVENTION

The invention features, in a communication link, a memory unit including a common section accessible to all ports of the link and a plurality of local sections each associated with one of the ports and accessible to its associated port, and no other port; interconnections including a dual memory bus with a common bus subsystem providing access to the common memory section and a local bus subsystem providing access to the plurality of local memory sections, the common and local subsystems being constructed to enable concurrent independent use; ports including decoding circuitry which receives signals from its associated station and in response thereto emits signals distinctively indicating the need for access to the memory common section or its associated memory local section, which emitted signals are transmitted to said memory priority circuitry; memory priority circuitry supplying timed signals which designate for each memory operating cycle the one of the ports which may have access to the memory, access being made available to the several ports in cyclic order, and futher designating for each memory cycle one of the ports for current service and responding to request signals indicating needs for memory access, and if the currently designated port requests memory access, enabling the currently designated port to use the common bus subsystem or the local memory bus subsystem in accordance with the signaled needs of the currently designated port while concurrently enabling other elements of the link to use the bus subsystems not requested by the currently designated port.

The invention may additionally feature circuitry for processing access requests for a succeeding memory operation while a current memory operation is in progress and for effecting a memory operation rate such that a time interval expressed by $(n+1)T+L$ is less than the minimum time required to transmit one byte of data to one of said ports, n being the number of ports, T being the memory operating cycle period, and L being the overlap period during which memory requests are being processed for a succeeding memory operation while a current operation is in progress.

BRIEF DESCRIPTION OF THE DRAWING

FIGS. 6-1A, 6-1B, 6-1C, 6-2A, 6-2B, 6-2C, 6-3A, 6-3B, and 6-3C are in the aggregate the schematic wiring diagram of the processor of FIG. 3.

FIGS. 7-1A, 7-1B, 7-1C, 7-2A, 7-2B, and 7-2C are in the aggregate the schematic wiring diagram of the memory unit of FIG. 4.

FIGS. 8-1A, 8-1B, 8-1C, 8-2A, 8-2B, 8-2C, 8-3A, 8-3B, and 8-3C, are in the aggregate the schematic wiring diagram of the data port of FIG. 5.

Figure 1:
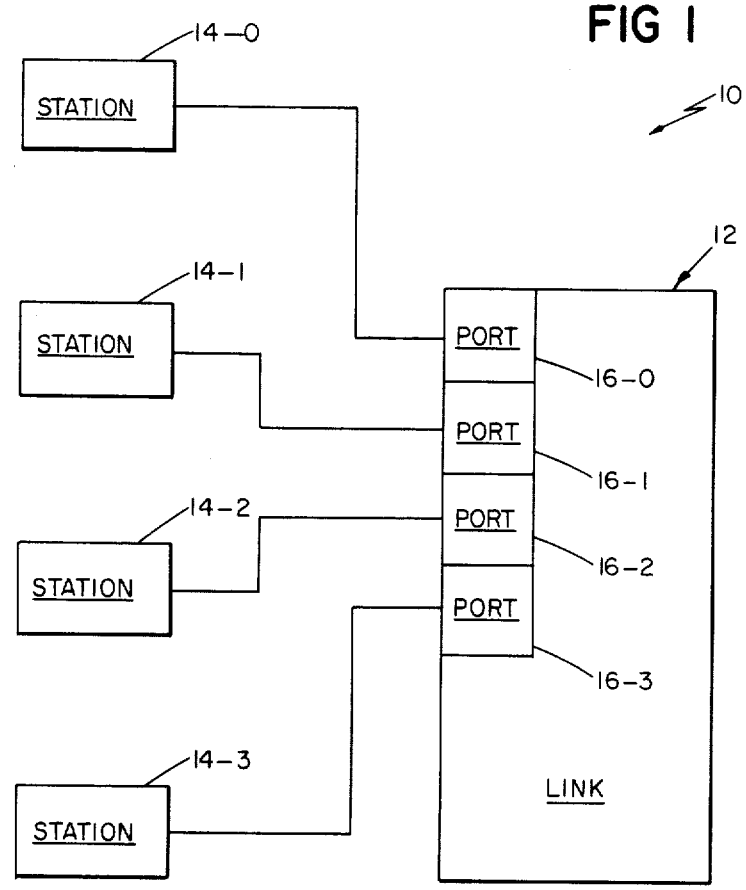
FIG. 1 shows in block diagram a data processing network in which a communication link according to the invention is used.

Each of multipart FIGS. 6-1 through 3, 7-1 through 2 and 8-1 through 3 should be considered as reconstituted by placing the -A, -B, and -C parts side by side to form a single figure. Further, in order to avoid a clutter of lines a number of connecting leads are not shown in full but are terminated with an arrowhead and a notation identifying the lead and the location on the drawing where it goes, the location being given by a first number, a letter, and a second number all in parenthesis. The first number indicates the drawing part, the letter and the second number indicates, by reference to the edge marking, the place on the sheet. At the designated place will be found a lead starting with an arrowtail and a notation identifying the lead and an indication in parenthesis of the origin of the lead. The arrowhead and arrowtail thus coupled are to be considered as connected.

DESCRIPTION OF THE EMBODIMENT

As shown in FIG. 1, data processing network 10 includes a communication link 12, according to the invention, linking four work stations 14-0, 14-1, 14-2, and 14-3, the work stations being connected to data ports 16-0, 16-1, 16-2, 16-3, respectively which are part of link 12.

Figure 2:
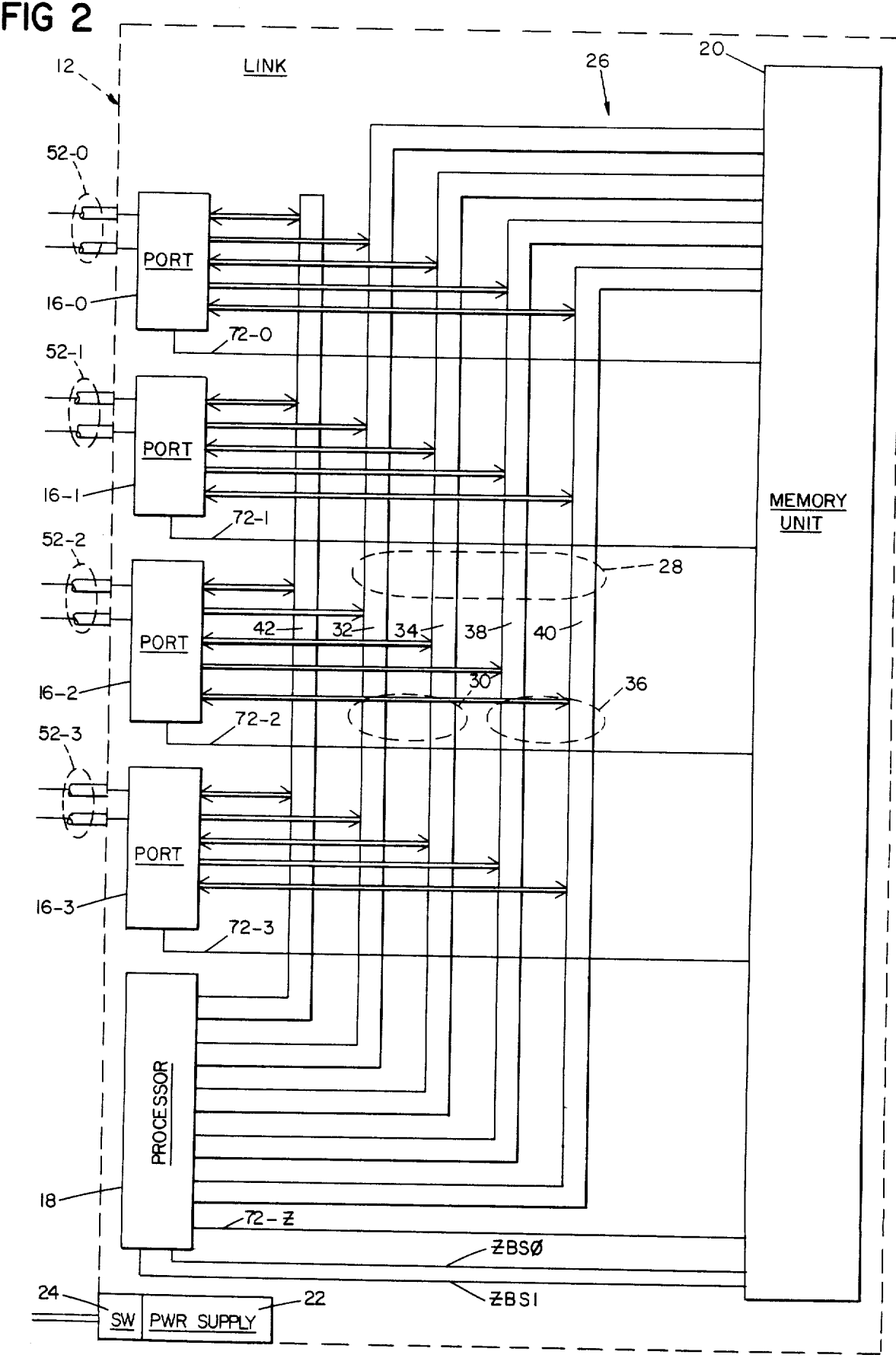
FIG. 2 shows in block diagram form the communication link of FIG. 1.
Figure 3:
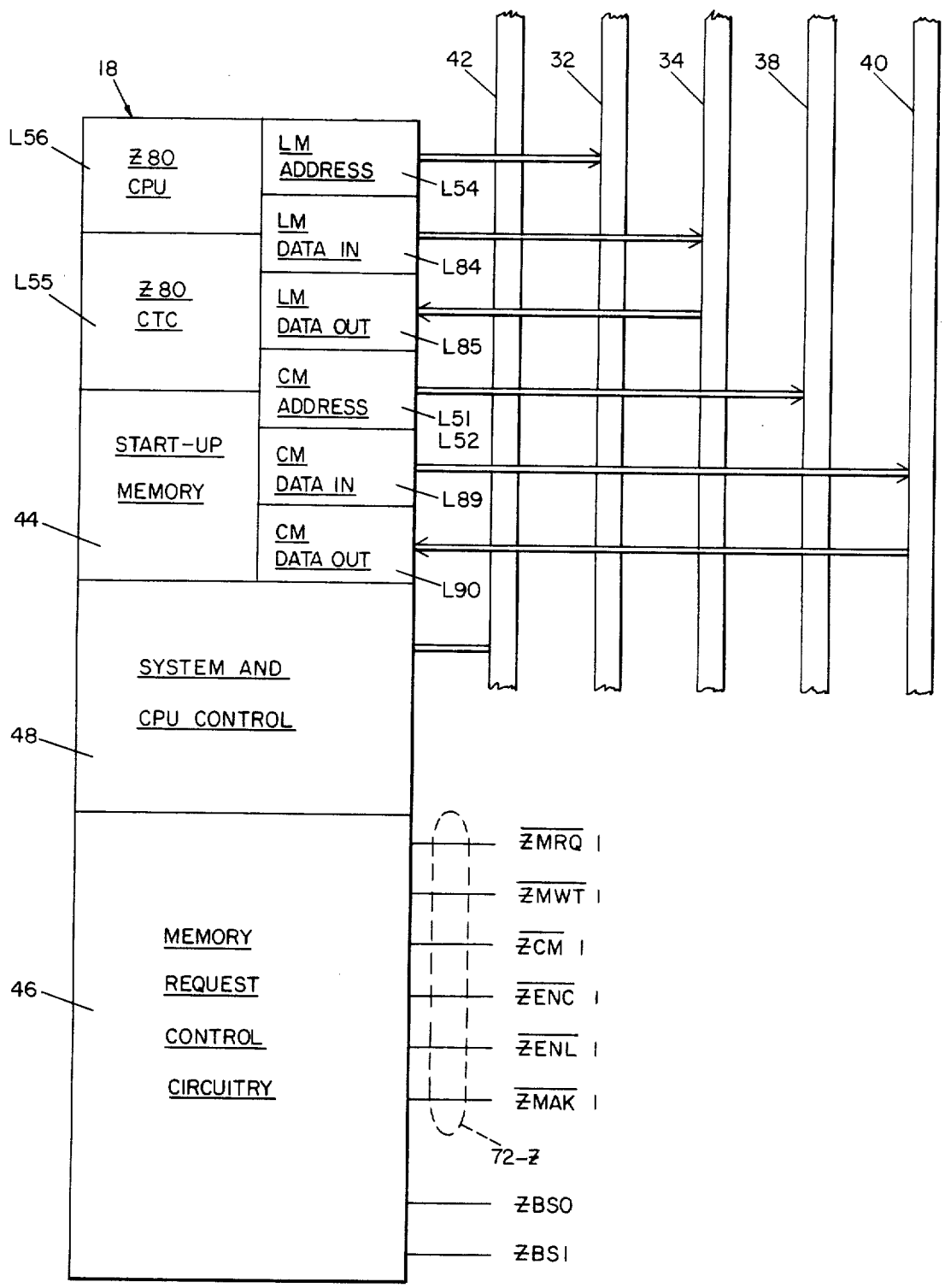
FIG. 3 shows in block diagram form the processor which is a part of the link of FIG. 2.
Figure 4:
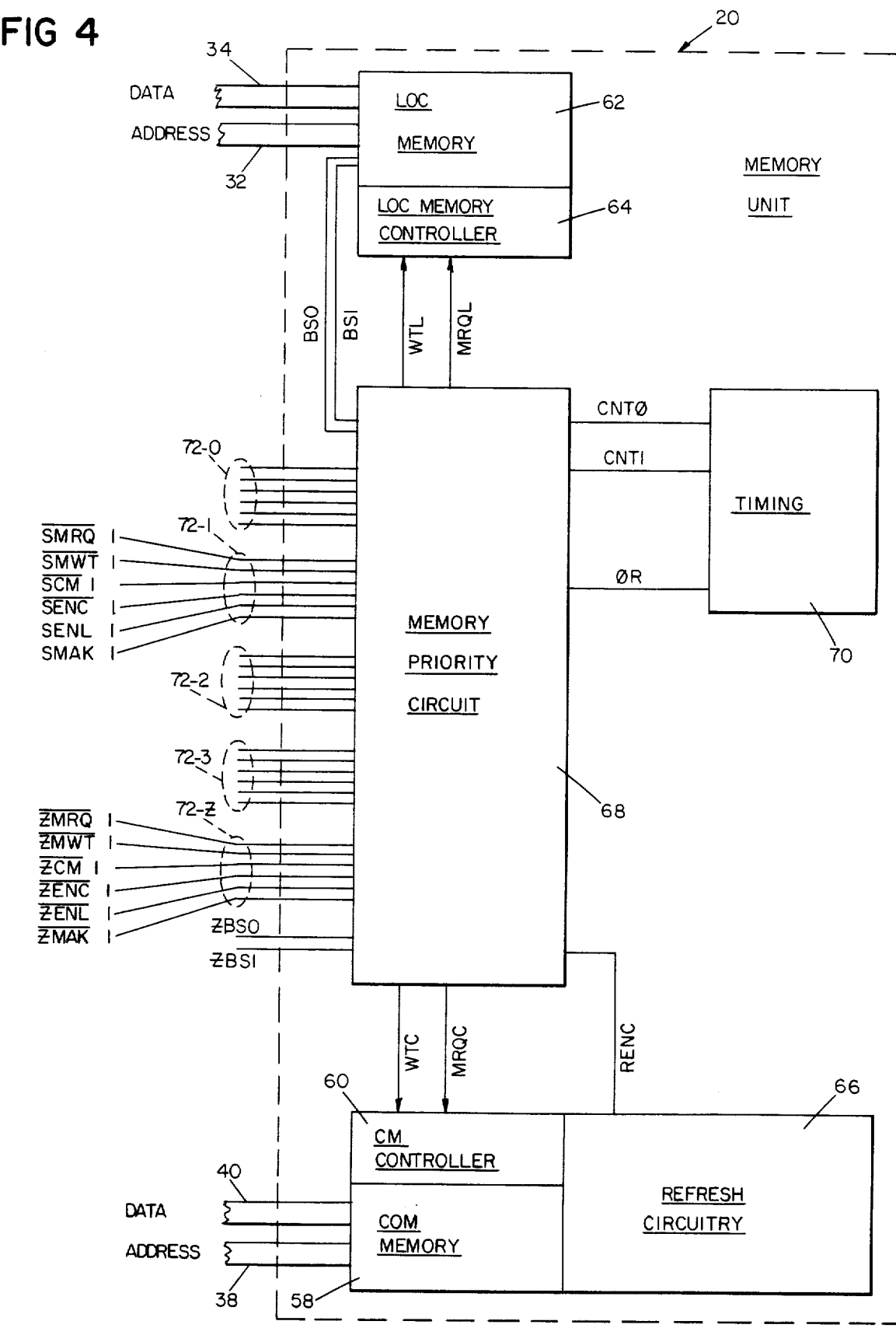
FIG. 4 shows in block diagram form the memory unit which is a part of the link of FIG. 2.
Figure 5:
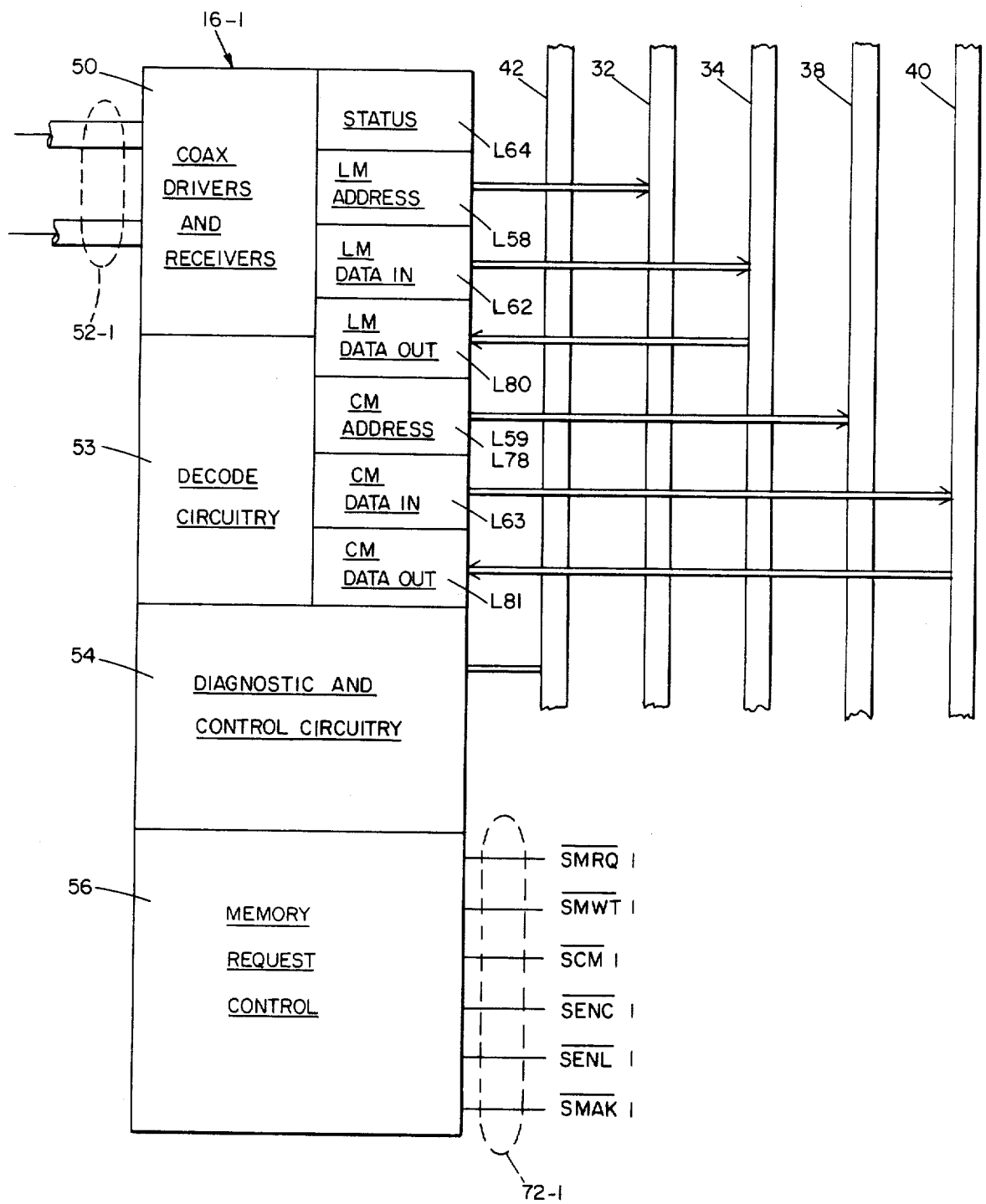
FIG. 5 shows in block diagram form one of the data ports of the link of FIG. 2.

Link 12, as shown in FIG. 2, includes data ports 16-0, 16-1, 16-2, 16-3, processor 18, memory unit 20, and power supply 22, with switch 24. Interconnections 26 connect together the ports, processor, memory unit, and power supply, and include a dual memory bus system 28 with a local memory bus subsystem 30 having a local address bus 32 and a local data bus 34, and a common memory bus subsystem 36 having a common address bus 38 and a common data bus 40. Interconnections 26 also include diagnostic bus 42 and other control leads.

Referring now to FIG. 3, 6-1, 6-2, and 6-3, processor unit 18, includes a Z80 CPU L56 and a Z80 CTC L55, a local memory address buffer L54 connected to the local memory address bus 32, a local memory data-in buffer L84, and a local memory data-out buffer L85, both connected to local memory data bus 34, a common memory address buffer L51 and L52 connected to the common memory address bus 38 and a common data in buffer L89 and common data out buffer L90 both connected to the common data bus 40. The processor unit 18 additionally includes a start up memory 44 of elements L11 through L15 and L25 through L28, wherein there are 7K of programmable read only memory and 1K of random access memory. The processor also includes memory request/control circuitry 46 connecting through leads $\overline{ZMRQ}$, $\overline{ZMWT}$, $\overline{ZCM}$, $\overline{ZENC}$, $\overline{ZENL}$, ZBS0, ZBS1 to memory unit 20. The processor unit includes circuitry 48 of conventional design dealing with diagnostic operations for detecting errors and other control functions which are shown in detail in FIGS. 6-1, 6-2, 6-3 but are not directly related to the subject invention and need not be discussed further.

Referring now to FIGS. 5, 8-1, 8-2, 8-3 data port 16-1 is shown as representative of the four identical ports 16-0, 16-1, 16-2, 16-3. The data port includes coax driver and receiver circuitry 50, which is connected by dual coax transmission lines 52-1 to an associated remote station, and decoding circuitry 53 which includes IC components L40, L41, L42, and L25. The data port also includes diagnostic and control circuitry 54 and memory request-control circuitry 56 connecting through leads $\overline{SMRQ1}$, $\overline{SMWT1}$, $\overline{SCM1}$, $\overline{SENC1}$, $\overline{SENL1}$, and $\overline{SMAK1}$ to memory unit 20. The data port additionally includes status buffer L64, local memory address buffer L58 connecting with local address bus 32, local memory data-in buffer L62 and local memory data-out buffer L80, both connecting with local data bus 34, common memory address buffer L59, L78 connecting with common address bus 38, and common memory data-in buffer L63 and common memory data-out buffer L81 both connecting with common memory data bus 40.

Referring now to FIGS. 4, 7-1, 7-2, memory unit 20 includes a common section 58 with a memory controller 60, and refresh circuitry 66, local memory sections 62 with local memory controller 64, memory priority circuitry 68 and timing circuitry 70. Common memory 58 has a 9 bit by 64K capacity and its 16 address bits connect to common address bus 38, and its 8 data bits and one parity bit to common data bus 40. Local memory 62 has a 9 bit by 1K capacity and its data bits connect to local memory bus 54. Of the 10 addressing bits of the local memory 62 eight (LA0-LA7) connect to local address bus 32. The remaining 2 addressing bits are connected through leads BS0 and BS1 to memory priority circuitry 68. Local memory 62 is thus effectively divided into 4 sections with data entering from local data bus 34 entered into a memory section in accordance with the signals on leads BS0 and BS1 from memory priority circuitry 68. Timing circuitry 70 includes a crystal oscillator operating with a period 58 ns from which are derived various timing signals for synchronizing the system. Among these are signals emitted on lead CNT0 with period 936 ns and on lead CNT1 with period 1872 ns which are used to control the time sharing of the four ports. Memory priority circuitry 68 connects through control leads 72-0, 72-1, 72-2, 72-3, to ports 16-0, 16-1, 16-2, 16-3, and to processor 18, through leads 72-Z, ZBS0 and ZBS1. It also connects with the local and common memories, the refresh circuitry and the timing circuitry.

All chips used in the link are standard commercially available items described in published documents well known in the field. Their standard commercial designations are indicated on each in the detailed drawings.

In operation, each port of the link transfers serial data to or from its corresponding station at a rate of 4.27 megabits per second over the double coaxial cable 52-1 (using port 16-1 as exemplary). The transmission character consists of 11 bits: a start bit (one) eight data bits (transmitted most significant bit first), an odd parity bit, and a stop bit (zero). When the transmission cable is idle the port is in its receive state and the signal state is zero. The protocol between the link and the stations calls for the station to initiate all transmissions. When such a signal is transmitted to the port it is stripped of its start and stop bits, parallelized and parity checked. The protocol admits of six commands:

(1) write one byte to memory (code 1010 0011). The first following transmission character will contain the 8-bit high order address of the memory site, the second following character will contain the 8-bit lower address, and the third following character will contain the 8-bit data byte.

(2) write 256 bytes to memory (code 1010 0101). The next transmission characters will contain the high order address, the lower order address for the first byte and then the data bytes successively to be written to memory.

(3) read one byte from memory (code 1010 0010). The first following transmission character will contain the high order address and the second following character the low order address of the byte to be read.

(4) read 256 bytes from memory (code 1010 0100). The first following transmission character will contain the high order address and the second following will contain the low order address of the first of the 256 bytes to be read.

(5) reset (code 1010 1000)

(6) report hardware status (code 1011 0000) Commands 5 and 6 will be discussed in connection with start up and diagnostics.

The parallelized byte is entered into decoding buffer L41, into memory-out buffers L80, L81 and address buffers L58, L59, L62. Decode circuitry decodes the command, counts successive bytes as required to interpret whether a byte is a high order address, a low order address, a data byte, or a command and decodes the address to distinguish whether the address is in local or common memory. (The lowest 256 addresses are assigned to local memory). The decode circuitry outputs on leads $\overline{SMRQ1}$, $\overline{SMWT1}$, and $\overline{SCM1}$ signals indicating respectively whether memory is needed or not, whether read or write is required, and whether common or local memory is required.

Concurrently with the transmission flowing between each of the ports and its associated station, the CPU is engaged in activities for management of the link and its data space under control of the program in a portion of the common memory and these activities generate requirements to have access to the common and to each of the local memory sections. Memory request control circuitry 46 in the CPU unit indicates its needs for memory access by signals on lead $\overline{ZMRQ}$, $\overline{ZMWT}$, $\overline{ZCM}$ in a manner directly analogous to similar signals from the ports as described above. In addition the memory request circuitry generates signals on leads ZBS0 and ZBS1 which indicate which of the four sections of local memory are needed.

The signals indicating memory access needs from all ports and from the CPU pass to the memory priority circuitry 68 in the memory unit. The priority circuitry also receives signals from the timing circuitry 70 on lead ΦR indicating a need to refresh the dynamic common memory and signals on CNT0 and CTN1 which designate the particular one of the ports to have its turn to be served. The logic of the priority circuits designate the access to the memory buses for the next memory cycle in response to input signals according to the following priorities:

1. To the port designated by CNT0 and CNT1 for either the local or common memory buses in accordance with its request.

2. To the refresh circuitry for the common memory buses if these are not used at higher priority.

3. To the CPU if the bus it requests is not assigned by higher priority. The memory priority circuitry emits signals on leads $\overline{\text{SENC-1}}$, $\overline{\text{SENL-1}}$, and $\overline{\text{SMAK-1}}$ to port 16-1 and analogous ones to other ports and the CPU unit to effect the switching to the buses in accordance with the priority decision as described above. In addition the priority circuitry generates signals which designate the particular section of the local memory to be addressed by generating address bits emitted on leads BS0 and BS1. When a particular port is given access to the local memory, these two bits are derived from the signals on CNT0 and CNT1 which indicate the port on turn. When the CPU is given access to the local memory the two address bits are derived from the signals emitted by the CPU on leads ZBS0 and ZBS1.

A single operation of the memory includes a period of 117 ns for resolving the bus priorities followed by a period of 468 ns for actual memory access. To speed up memory operation, the successive operations are overlapped, with priority resolution for a succeeding cycle going forward while memory entry is in progress, so that the memory cyclic period is 468 ns. In the event a particular port had signaled its need for memory just after the memory requests had been sampled there would be a wait of 4 cycles or 1872 ns as the priority circuitry serviced the other ports and returned to the request of the particular port. Then there would be the intervals of 117 ns and 468 ns while its memory operation was processed—a total of 2457 ns. This may be compared with the maximum rate of data flow. With a transmission rate of 4.27 Mbits/sec and 11 bits per character, the period from one byte to the next is 2576 ns, showing that no data can be lost. The maximum rate at which a port needs memory access is however, 389 MHz or 1.566 MHz for the aggregate of the 4 ports. The memory access requirements for the refresh logic is 0.064 MHz so that even with maximum port activity 0.52 MHz of memory access is available for the CPU, and in practice more than this because of the dual memory system.

The start up of the link is not directly related to the invention and needs only cursory description. It is effected by turning on switch 24 of power supply 22. The application of power supplies to the equipment set gates in initial states and starts the CPU on a program at address 0000 in start-up memory 44. The program may go through various system test of if desired but in any case selects a station as a master station for implementation and sets a flag in the status register L64 of corresponding port indicating that the link is ready to be programmed. The master station has been periodically requesting a status report from the link and now for the first time receives a report that the link is ready for programming. The master station then enters the operating program into the common memory using the procedure as described above for entering data. After the program is entered the master station transmits the reset command and this transfers the CPU to the program just entered in the common memory. The system then begins its normal operations.

What is claimed is:

1. A communications link for receiving data from one station of a data processing network having a plurality of asynchronous stations and forwarding such data to another station of the data processing network, said link including a plurality of data ports each constructed to receive data from and dispatch data to an associated station when connected thereto, a memory unit having operating cycles for storing data, computer elements other than said ports requiring memory access, memory priority circuitry, and interconnections connecting together said ports, memory unit, computer elements, and memory priority circuitry, said memory unit including a common section accessable to all of said ports and a plurality of local sections each associated with one of said plurality of ports and accessable to its associated port and no other port, each of said ports including decoding circuitry for receiving signals from its associated station and in response thereto emitting signals distinctively indicating the need for access to said common or local memory sections, said computer elements requiring memory access including a processor for effecting manipulations of data in accordance with a program, said interconnections including a dual memory bus system with a common memory bus subsystem providing direct access between said memory common section and any of said ports or said processor, and a local memory bus subsystem providing direct access between each of said ports and its corresponding local memory section and between said processor and any of said memory local sections, said common and local subsystems being constructed and connected to enable concurrent independent use, said memory priority circuitry including
means for supplying timed signals which for each memory unit operating cycle designate the one of said plurality of ports which may have access to said memory unit, the several ports being designated in cyclic order, means for receiving said signals emitted by said ports distinctively indicating the need for access to said common or local memory sections and signals from said computer elements requiring memory access indicating need for access to said common or local memory sections and responsive thereto emitting signals enabling said currently designated port to use the common bus subsystem or the local bus subsystem in accordance with its signaled needs, and concurrently enabling said computing elements other than ports to use the memory bus systems not enabled to the currently designated port.

2. Apparatus as claimed in claim 1, said memory priority circuitry including means for processing memory access requests for a succeeding memory operation while a current memory operation is in progress.

3. Apparatus as claimed in claim 1, including memory refresh circuitry, wherein said memory priority circuitry gives memory access to said refresh circuitry at a priority level below said designated port but ahead of said processor.

4. A communication link as claimed in claim 2, including means for effecting a memory operation rate such that a time interval expressed by $(n+1)T+L$ is less than a minimum time required to transmit one byte of data to one of said ports, n being the number of ports, T being memory unit operating cycle time, and L being the overlap period during which memory requests are being processed for a succeeding operation while a current operation is in progress.

* * * * *